(12) United States Patent
Ma et al.

(10) Patent No.: US 12,417,452 B2
(45) Date of Patent: Sep. 16, 2025

(54) SMART CHIP PAYMENT ACCEPTANCE

(71) Applicant: MASTERCARD ASIA/PACIFIC PTE. LTD., Singapore (SG)

(72) Inventors: Weiming Ma, Singapore (SG); Teck Yong Tan, Singapore (SG); Donghao Huang, Singapore (SG); Rasika Chandana Karunapala, Queenstown (SG); Arie Ganapathi, Singapore (SG); Dendy Liuswanto Gunawan, Singapore (SG); Srinath Ravinathan, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 35 days.

(21) Appl. No.: 18/055,599

(22) Filed: Nov. 15, 2022

(65) Prior Publication Data

US 2023/0153807 A1    May 18, 2023

Related U.S. Application Data

(60) Provisional application No. 63/279,905, filed on Nov. 16, 2021.

(51) Int. Cl.
  *G06Q 20/38* (2012.01)
  *G06Q 20/20* (2012.01)
  (Continued)

(52) U.S. Cl.
  CPC ......... *G06Q 20/3829* (2013.01); *G06Q 20/20* (2013.01); *G06Q 20/322* (2013.01); *G06Q 20/36* (2013.01); *G06Q 20/40145* (2013.01)

(58) Field of Classification Search
  None
  See application file for complete search history.

(56) References Cited

U.S. PATENT DOCUMENTS 10,366,378 B1  7/2019  Han et al.
10,423,949 B2  9/2019  Lyons et al.
(Continued)

OTHER PUBLICATIONS

El Madhoun, M., et al. "New Security Protocols for Offline Point-of-Sale Machines", The 36th International Conference on Advanced Information Networking and Applications, Apr. 2022, 19 pages.

*Primary Examiner* — Matthew S Gart
*Assistant Examiner* — Amit Patel
(74) *Attorney, Agent, or Firm* — Barta Jones, PLLC

(57) ABSTRACT

A system and method for processing digital payments using a smart chip payment acceptance module associated with an Internet of Things (IoT) or vending device via a virtual EMV terminal process for cloud-based digital payment transactions. A short-range communication channel is provided between a mobile user device and the payment acceptance module. The mobile user device includes a wallet application with an integrated merchant application used to create a payment transaction. An unlock device enables digital secure remote payments (DSRP). A smart chip server connected to a payment gateway can generate an encrypted proof of payment (POP) message indicating completion of the payment transaction. The user can complete the payment transaction using the integrated wallet application within the user device in an online or offline mode of the vend device for seamless interaction with the system by a new user as well as improved flexibility for merchants and consumers.

20 Claims, 40 Drawing Sheets

(51) Int. Cl.
  *G06Q 20/32* (2012.01)
  *G06Q 20/36* (2012.01)
  *G06Q 20/40* (2012.01)

(56) References Cited

U.S. PATENT DOCUMENTS

| | | |
|---|---|---|
| 11,240,219 B2 | 2/2022 | Smirnoff et al. |
| 2015/0278795 A1 | 10/2015 | Jiang et al. |
| 2019/0385160 A1 | 12/2019 | Safak et al. |
| 2021/0042753 A1 | 2/2021 | Wong et al. |
| 2021/0201297 A1* | 7/2021 | Chen .................. G06Q 20/352 |
| 2021/0279346 A1 | 9/2021 | Lopez |

* cited by examiner

SMART CHIP PAYMENT ACCEPTANCE

CROSS-REFERENCE TO RELATED APPLICATION

This application claims priority to U.S. Provisional Application No. 63/279,905 filed Nov. 16, 2021, entitled "Smart Chip Payment Acceptance", the entirety of which is incorporated herein by reference.

BACKGROUND

It is frequently desirable for original equipment manufacturers (OEMs) to provide solutions for contactless payment acceptance. OEMs currently use proprietary mobile applications and protocols to provide indirect Internet connectivity to their hardware and dongles via a consumer's mobile device. This creates a fragmented ecosystem with a lack of interoperability between the IoT hardware, the consumer mobile device and/or other hardware devices involved in the transaction. The OEM hardware also needs to undergo certification for meeting payment industry standards, increasing the cost of deployment and maintenance. This can be inefficient, unreliable and/or burdensome for users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some examples provide a system for digital payment acceptance. A payment acceptance module associated with a vend device is communicatively coupled to a mobile user device hosting a digital wallet application via a near-field communications device providing a short-range communication channel. The short-range communication channel enables communications between the mobile user device and the payment acceptance module in an online mode or an offline mode. A payment transaction is created based on transaction data obtained from an integrated merchant vending application associated with the digital wallet application on the mobile user device. The payment transaction is a transaction to unlock an item or service associated with the vend device, and wherein the user creates the payment transaction via a portion of the integrated merchant vending application accessible within the digital wallet application in an absence of a downloaded version of a merchant vending application. An unlock code is transmitted to the mobile user device or a merchant server upon receiving a signed receipt generated by an unlock service indicating completion of the payment transaction, the unlock code triggers the vend device to release the item or unlock an automated service associated with the vend device when provided to the vend device.

Other examples provide a system for digital payment acceptance using a smart chip device. A payment acceptance module of a vend device includes a reader mode and a writer mode. In reader mode, the payment acceptance module reads payment data from a wallet application associated with a mobile user device communicatively coupled to the payment acceptance module. In writer mode, a smart chip associated with the payment acceptance module generates transaction data associated with a payment transaction for vending of at least one item or initiating at least one automated service from the vend device. The payment acceptance module in the writer mode sends the generated transaction data to a vending application on a mobile user device acting as a cloud-based point-of-sale (POS) terminal. A near-field communications device provides a short-range communication channel. The payment acceptance module transmits the transaction data from the payment acceptance module to the mobile user device and receives encrypted response data generated by a smart chip server associated with a cloud POS. The response data is forwarded to the payment acceptance module by the vending application on the mobile user device. The response data includes an outcome of a cloud POS payment transaction. If the data is encrypted, it is decrypted at the vend device to determine the outcome. A vend signal is sent by a vend controller to release the selected item or initiate selected automated service if the outcome indicates the payment transaction completed successfully.

BRIEF DESCRIPTION OF THE DRAWINGS

Corresponding reference characters indicate corresponding parts throughout the drawings.

DETAILED DESCRIPTION

Figure 1:
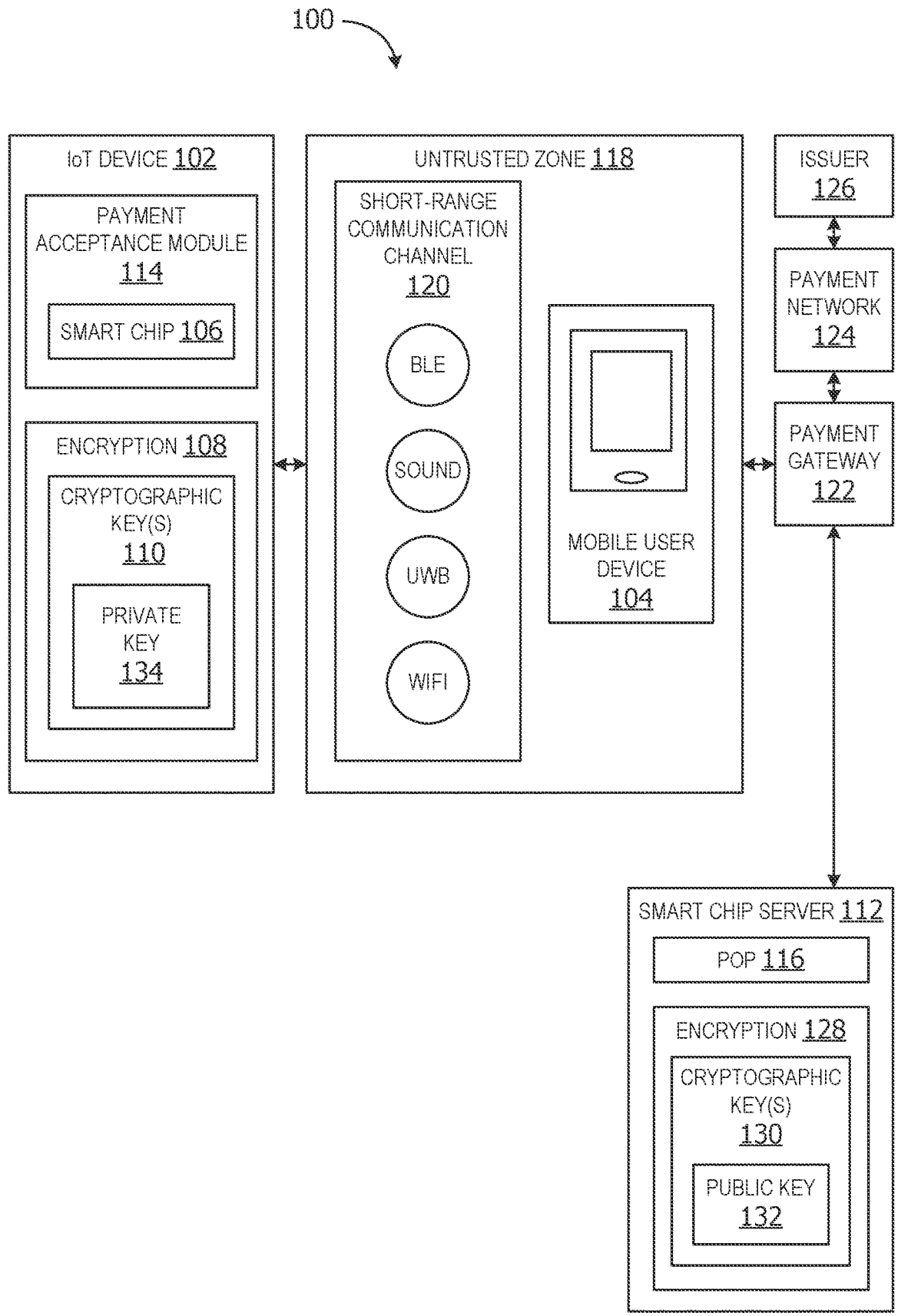
FIG. 1 is an exemplary block diagram illustrating a system 100 for smart chip payment acceptance by a vend device, such as an Internet of Things (IoT) device, using a short-range communication channel provided by a mobile user device.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated each time.

Micro-mobility and unattended retail, such as vending machines and unattended bicycle rentals, are growth areas that cannot afford the upfront costs of a EMV (Europay Mastercard Visa) compliant terminal for contactless payment systems in online and offline environments. This results in limitations on geographic areas and types of unattended retail and micro-mobility devices that can be deployed by merchants due to limitations of the EMV compliant terminals.

Referring to the figures, examples of the disclosure enable a digital payment acceptance system using a smart chip powered payment acceptance module in a device. In some examples, the system provides a method of utilizing existing contactless EMV (Europay, Mastercard, Visa) standards for payment transactions between digital payment wallet applications on mobile user devices and Internet-of-Things (IoT) devices. The IoT devices can be online, as well as offline IoT devices that are capable of short-range communications but not Internet communications, such as an IoT device lacking the capability to connect to the Internet or otherwise unable to access the Internet at that time. This enables digital payment acceptance by IoT devices in remote locations or other areas where Internet connectivity is poor or unavailable, or where the IoT devices lack operable hardware and/or software for accessing a server to complete a payment transaction. In this manner, the smart chip powered IoT devices can accept digital payment from a mobile user device without WI-FI or other Internet access on the IoT device, eliminating the need to provide cash payment acceptance devices, thus reducing costs associated with the IoT devices as well as improving customer convenience. This increases usability while providing low-cost digital payment acceptance processing.

In other examples, the system makes use of cloud-based EMV kernel (e.g., cloud point-of-sale (POS)) and companion mobile applications on mobile user devices for both short range as well as indirect Internet connectivity to the IoT devices. The cloud POS solution reduces the certification and/or compliance footprint required of original equipment manufacturers of IoT devices. The mobile user devices act as a proxy between cloud POS and the IoT device. The IoT devices, such as vending machines and bike rental devices, can be deployed in remote locations, where there is limited or no Internet connectivity, to serve customers by accepting non-cash payments. The mobile user device, such as a smartphone, enables connectivity between the IoT device and the cloud-based payment network, regardless of whether the IoT device is online or offline. In this manner, the IoT devices can be deployed in rural areas, military environments, construction areas, industrial estates, mountainous regions, or areas where retail commerce is not readily accessible.

The smart chip payment acceptance module enables non-EMV contactless payment transactions where an IoT device (vending machine/bike rental device) is online or offline. This provides greater flexibility to merchants and consumers.

Still other aspects provide a wallet application and unlock service which enable the wallet application to work with multiple merchants. The system facilitates a wallet application from an issuer used for making payments to multiple different merchants without downloading the merchants' vending applications onto the user's mobile device. This reduces memory resource usage on the user device while improving the user interaction via the UI.

Moreover, the user is able to access the merchant's webpage via a pop-up within the merchant application displayed to the user via the mobile user device UI.

For example, a rental bike with smart chip capability allows consumers with an issuer wallet application installed on the mobile user device to use the service without going through the onboarding process via downloading the merchant application. This gives new customers a frictionless experience. It expands the reach of the service to non-returning consumers that have issuer application/wallet installed on their device. The risk profile of the transaction is reduced by the use of Digital Secure Remote Payments (DSRP) and biometric consumer device (CD) cardholder verification method (CVM) CDCVM on the consumer's device.

The mobile user device, in other examples, operates in an unconventional manner by enabling secure virtual EMV terminal payment processing and communications between an IoT device and a payment network via a short-range communication channel connecting the mobile user device to the IoT device. In this manner, the mobile user device is used in an unconventional way, creating a virtual POS terminal to allow the IoT device to perform secure EMV-like digital payment acceptance for a user in an absence of a physical EMV terminal. This reduces computing resource usage and lowers costs associated with installing and maintaining EMV terminals while improving functionality and security for consumers.

Referring again to FIG. 1, an exemplary block diagram illustrates a system 100 for smart chip payment acceptance by an IoT device 102 using a short-range communication channel provided by a mobile user device 104. The IoT device 102 is an automated device for vending an item, releasing an item for utilization by a user or otherwise making an item available to a user for consumption, permanent possession, or temporary use, such as in a rental. Non-limiting examples of an IoT device 102 include a vending machine, a bike rental device, an automated locker rental system, a ticket dispensing kiosk, a movie rental kiosk, an automated parking meter, an electric car charging station, etc.

A ticket dispensing kiosk can include, without limitation, a kiosk for dispensing transit tickets, such as train tickets, bus tickets, etc. A ticket dispensing kiosk also includes other types of tickets, such as, parking tickets, admissions tickets, etc. An admissions ticket is a ticket for admissions to an entertainment facility, sports complex, or other venue, such as, but not limited to, amusement park admission pass, movie theater tickets, etc. The IoT device 102, in other examples, includes automated service-providing devices such as, but not limited to, an automated car wash, tool and/or equipment rentals, vehicle rentals, a weighing device (e.g., scales), laundry (e.g., washer and/or dryer) machine, an amusement park ride, etc.

The mobile user device 104, in the example of FIG. 1, represents any mobile computing device executing computer-executable instructions (e.g., as application programs, operating system functionality, or both) to implement the operations and functionality associated with the mobile user device 104. The mobile user device 104, in some examples, includes any portable computing device, for example but without limitation, a mobile telephone, laptop, tablet, computing pad, netbook, gaming device, portable media player, smart watch, etc. In some examples, the mobile user device 104 has at least one processor and a memory. The mobile user device 104, in other examples, includes a user interface component.

The IoT device 102 includes a smart chip 106. The smart chip 106 is a secure chip capable of performing encryption 108. In some examples, the smart chip 106 encrypts and/or decrypts data via the data encryption 108 with one or more payment cryptography key(s) 110 provisioned to the smart chip server 112. The payment encryption key(s) 110 can include a public key, a private key or both a public key and private key for encrypting and decrypting data.

Combined with its in-built computation power, the smart chip 106 can encrypt, decrypt, and verify payment related information received from the smart chip server 112 via a communication channel established between the IoT device 102 and the mobile user device 104. In an online mode, the IoT device 102 establishes a communication channel using any type of network connection with the mobile user device 104, as well as any other computing devices, data storage devices and/or cloud services. In an offline mode, the IoT device 102 establishes a short-range communication channel between the IoT device 102 and the mobile user device 104, such as, but not limited to, near-field communication (NFC).

In this example, the smart chip 106 powered low-cost payment acceptance module 114 is installed in the IoT device 102, such as, but not limited to, a vending machine, rental machine, locker device, bike rental device, or other IoT device that is capable of processing payments prior to dispensing an item, releasing an item for temporary utilization, activating a service, unlocking a rental bike, etc. The payment acceptance module 114 may also be referred to as a payment acceptance point.

The smart chip payment acceptance module 114 encrypts data for initiating payment transactions, decrypts encrypted data received from the mobile user device 104 and verifies the proof of payment (POP) 116 message from the smart chip server 112. The POP 116 message(s) are passed from the smart chip server 112 to the IoT device 102 through the untrusted zone 118 via the short-range communication channel 120 in the offline mode. The offline mode is the situation in which the IoT device is unable to connect to the Internet.

The short-range communication channel 120 is a communication channel established by the mobile user device 104 in the offline scenario, such as where connectivity to a cellular network is permanently or temporarily unavailable. The short-range communication channel 120, in some examples, includes near-field communication (NFC) in which the POP 116 message(s) are sent to the IoT device 102 via Bluetooth® low energy (BLE), True Sound, and/or ultra-wide band (UWB).

In an online scenario, where the mobile user device 104 has access to a cellular network, the POP 116 message is passed to the IoT device 102 using a WI-FI connection via the mobile network, such as, but not limited to, a third generation (3G), fourth generation (4G) or fifth generation (5G) cellular network.

The payment gateway 122 is a portal that connects the payment account to a payment network for payment processing. The payment network 124 is a network for facilitating digital payments and transactions associated with a credit card, debit card or other financial institution. The payment network 124 provides secure transfer of transaction data between the mobile user device 104 and the issuer 126.

The issuer 126 is a computing device or computer system associated with one or more payment accounts of a user provided by an issuer of the payment account. The issuer 126 provides a payment method for the user associated with the mobile user device. The payment method is used for purchasing or renting the item or service provided by the IoT device 102. In some non-limiting examples, the issuer 126 provides a payment card and/or payment account for utilization during the non-cash digital payment process. The payment card and/or payment account typically includes a personal identification number (PIN), payment account number (PAN) or other account number associated with the user's payment account. The payment account can include a credit card account, debit card account, rewards account, cryptocurrency account, or any other type of payment account. In some examples, the issuer 126 is a bank or other financial services-related entity.

In this example, an inquiry is sent through the payment network 124 to the issuer 126 to determine if the requested transaction amount is available for use in completing the payment transaction. If sufficient funds are available, the smart chip server generates the POP 116 message 112 indicating that the requested funds have been transferred from the user's account associated with the issuer 126 to a payment account associated with a merchant providing the goods and/or services provided by the IoT device 102.

The smart chip server 112 encrypts the POP 116 message using data encryption 128, such as, but not limited to, one or more cryptographic key(s) 130. In this non-limiting example, the smart chip server 112 encrypts the POP 116 message using a public key infrastructure (PKI) public cryptographic key. The IoT device 102 uses a corresponding PKI private key 134 to decrypt the POP 116 message. In some examples, the smart chip server interfaces with the smart chip payment acceptance module prior to the transaction, such as during an on-boarding process, to provide the private key(s) to the IoT device.

In some non-limiting examples, a single payment transaction can be split into partial payments in which two or more users associated with two or more user devices each perform a payment transaction using a different wallet application to complete part of the payment total. For example, if two users want to purchase two train tickets for seats next to each other but each user wants to pay for their own ticket separately, the payment acceptance module splits the total transaction amount into two partial payments. Each user utilizes a different mobile device having a different wallet application payment account to complete each partial payment with the payment acceptance module. The two tickets are dispensed after both partial payments are successfully completed. Thus, two users can share partial payments in a single transaction, or approximately within the same timeframe at the same kiosk, for purchase or rental of one or more items and/or services.

In another example, a single user may perform two consecutive partial payments for a single transaction of one or more item(s) or services. In this example, the payment acceptance module splits a single transaction amount into two or more partial payments so that the user can pay for a portion of the transaction total using a first payment account and complete payment of the second portion of the payment total using a different, second payment account. Each payment account can be associated with the same digital wallet application, or each payment account can be associated with a different digital wallet. Thus, a user can pay for an item or service using one or more payment accounts or wallet applications.

In other examples, machine learning (ML) may be implemented by the smart chip to detect fraudulent payments (e.g., fraud detection). The ML is incorporated on the mobile user device to detect fraud. In other examples, the ML may be used to make recommendations of locations, destinations of potential interest to the user based on the user's current location, activities, etc. The ML can also push information determined to be of potential interest to the user, such as recommendations of items to purchase, geographical information, points of interest along a route, etc. These can be displayed to the user at the vend device.

In this example, the IoT device is described as including both a public key(s) and private key(s) stored on the IoT device for use in encrypting and decrypting data. In other examples, where the IoT device is in an online mode, the IoT device only includes the public key(s) but does not necessarily store the private key(s) on the IoT device as the public key(s) can be accessed via the network.

Figure 7:
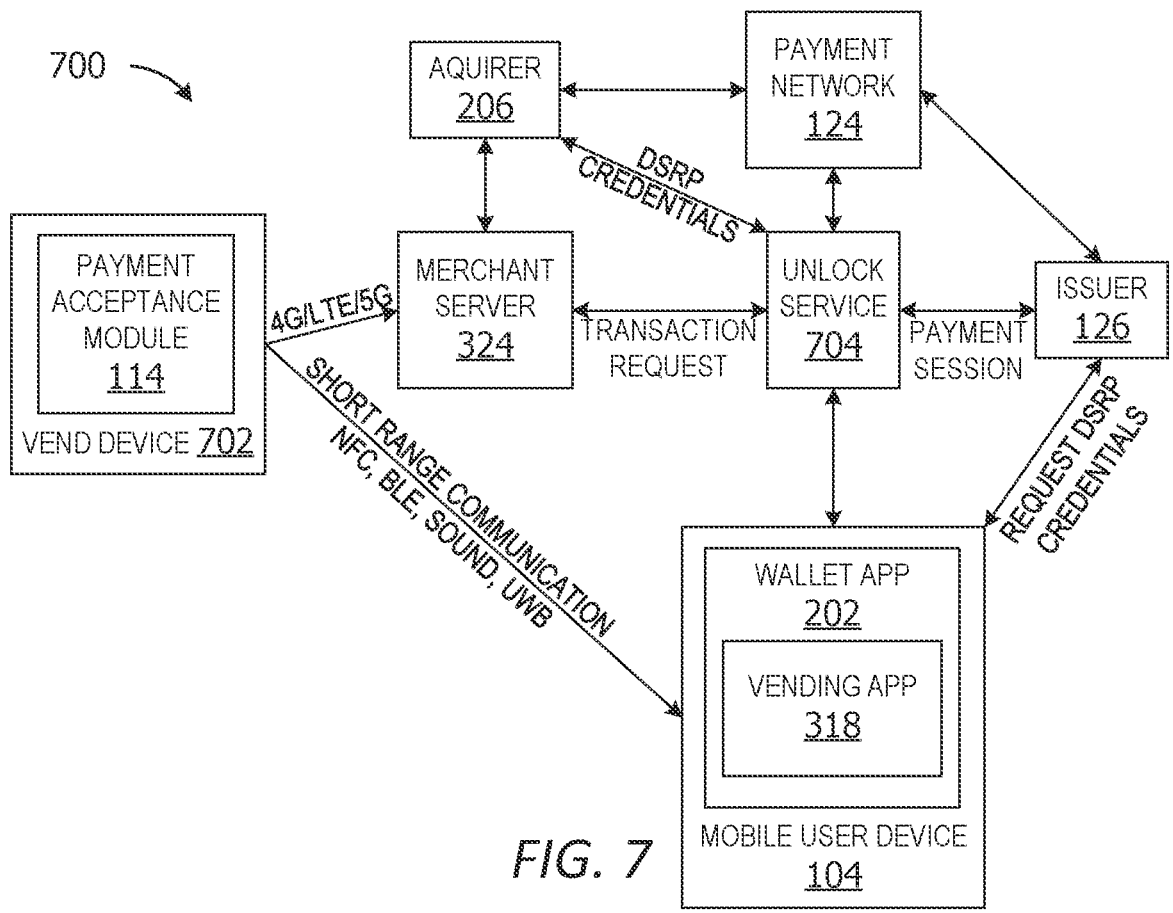
FIG. 7 is an exemplary block diagram illustrating a system 700 including a payment acceptance module and unlock service for unlocking a vend device.
Figure 9:
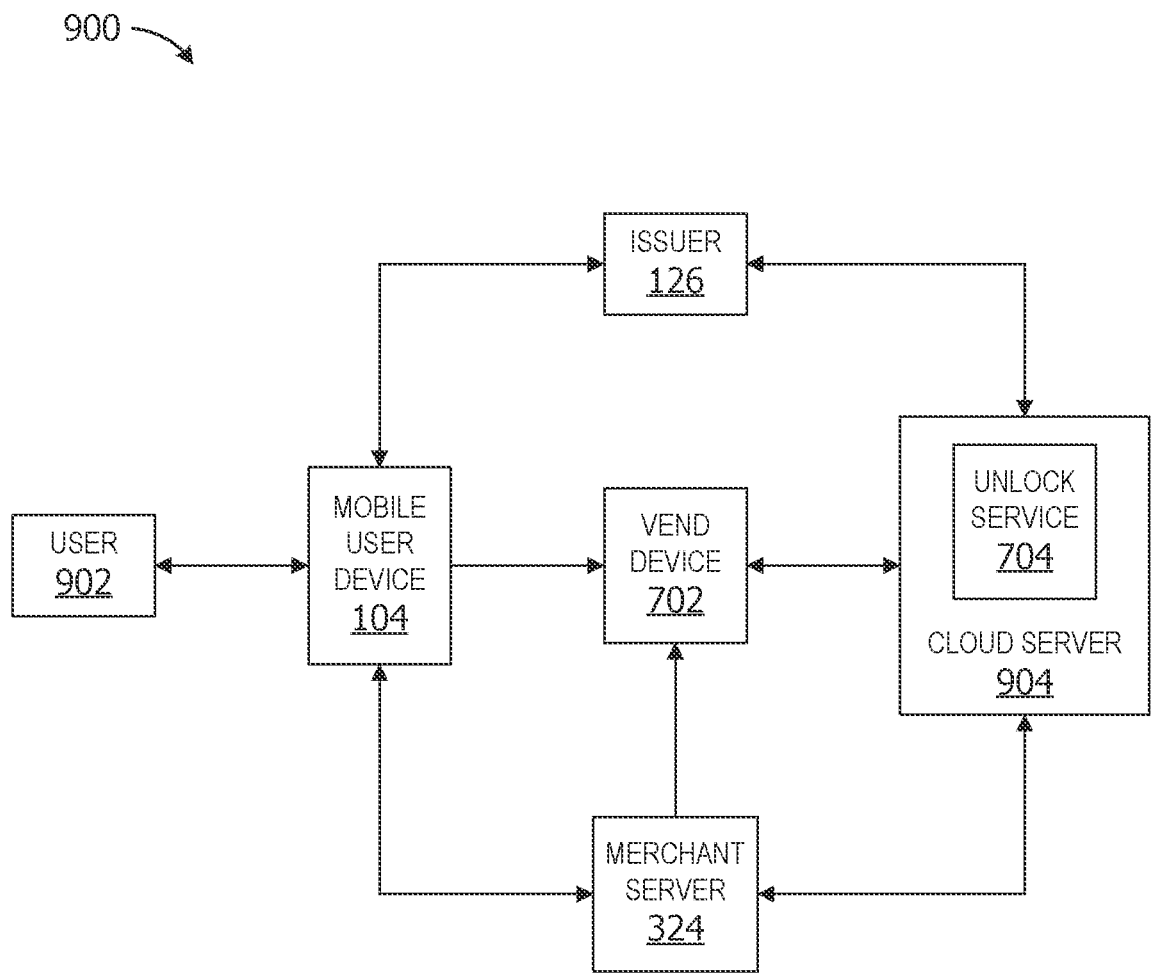
FIG. 9 is an exemplary block diagram of a system 900 for pre-authorization of contactless payment to unlock a vend device using an unlock service.

In other examples, the IoT device is a lockable vend device, such as, but not limited to, a bike rental device. In these examples, the system 100 optionally includes an unlock service, as shown in FIG. 7 and FIG. 9 below.

Figure 2:
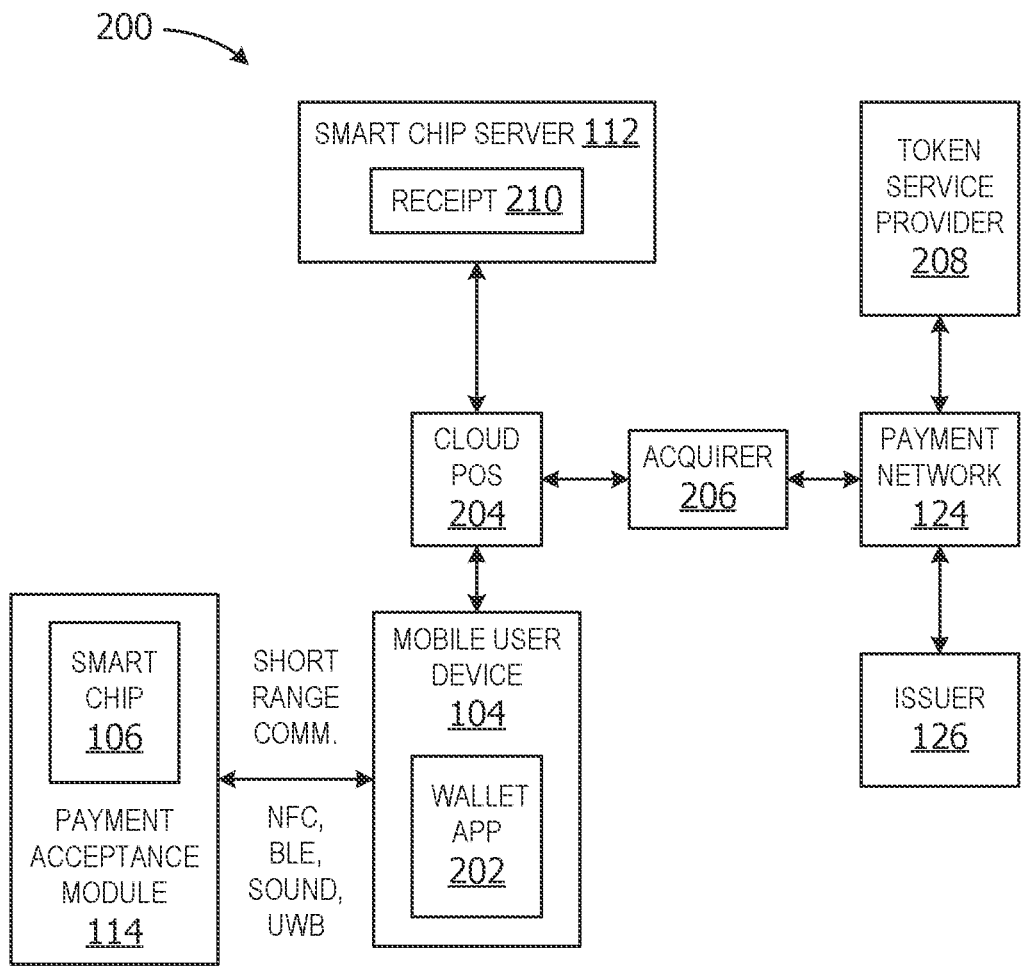
FIG. 2 is an exemplary block diagram illustrating a system 200 including a smart chip payment acceptance module for digital payments.

Turning now to FIG. 2, an exemplary block diagram illustrating a system 200 including a smart chip 106 payment acceptance module 114 for digital payments is shown. The system 200, in some examples, includes a smart chip 106 for payment acceptance, such as, but not limited to, the system 100 in FIG. 1 above. In this example, the payment acceptance module 114 is a physical hardware device that enables secure and seamless digital payment transactions between the payment acceptance module 114 and digital wallets through NFC and/or other short-range communications, e.g., sound, BLE & UWB. However, the examples are not limited to an offline mode using short-range communications. In other non-limiting examples, the payment acceptance module 114 is optionally capable of communicating with the mobile user device and/or other computing devices and systems via long-range networks, such as the Internet, via an online IoT device.

A digital wallet application includes software for storing payment account information, passwords, and other payment related information for one or more payment methods associated with the issuer 126, such as, but not limited to, the digital application 202. In some examples, the issuer 126 provisions payment credentials on the digital wallet application 202 prior to a transaction between the user associated with the mobile user device 104 and the IoT device associated with the payment acceptance module 114. The user associated with the mobile user device 104 may also be referred to as a customer or consumer.

The smart chip 106 within the payment acceptance module 114 is installed on an IoT device, such as, but not limited to, the IoT device 102 in FIG. 1. The IoT device can be any type of automated device for vending an item, releasing an item for use and/or providing a service in response to completion of a transaction. The IoT device can include, for example but without limitation, a vending machine, a bike rental device and/or charging station for an electric car and/or autonomous vehicle.

In this example, the smart chip 106 interfaces with the mobile user device 104. The mobile user device 104 is any type of mobile computing device, such as, but not limited to, a smart phone. The mobile user device 104 communicates with the IoT device and other devices within the payment network without an Internet connection by using a short-range communication channel, such as, but not limited to, BLE, UWB and True Sound, to communicate data to the devices.

In some examples, the IoT device 102 is on-boarded to cloud POS 204 by a provisioning process performed by the OEM. An OEM administration mobile device is used, in some non-limiting examples, to provision new terminals onto cloud POS 204. The cloud POS 204, in this example, is an EMV kernel hosted on a cloud server. A cloud server is a logical server providing services to one or more computing devices, virtual machines and/or other servers, such as, but not limited to, the cloud server 904 in FIG. 9 below. The cloud server communicates with computing devices and systems, such as, but not limited to, the mobile user device 104, the smart chip server 112, acquirer 206, the issuer 126, the payment network and/or the token service provider 208. The cloud server, in some examples, is hosted and/or delivered via a network. In some non-limiting examples, the cloud POS 204 is associated with one or more physical servers in one or more data centers. In other examples, the cloud POS 204 is associated with a distributed network of servers.

In this example, the system 200 leverages the cloud POS 204 resources to permit the payment acceptance module 114 to perform EMV payment transactions from the mobile user device 104 over the payment network 124. The mobile user device 104 accepts consumer card information to perform payment transaction. The transaction data exchanged between the payment acceptance module 114 and the mobile user device 104 transmitted over the cloud POS 204 goes to the payment network 124 and the issuer gets data from acquirer 206.

In some examples, the acquirer 206 is a computing device or computer system associated with one or more payment accounts of a merchant providing the good(s) and/or service(s) provided by the automated IoT device. The payment transaction, in this example, is between the acquirer and the issuer. The data exchange, in this example, is an EMV-type payment transaction. If the issuer and acquirer complete the payment transaction, where funds are successfully transferred from an issuer-associated payment account to an acquirer associated payment account sufficient to cover the payment amount of the item(s) and/or services selected by the user at the IoT device, the smart chip server 112 generates a receipt 210.

The smart chip server 112 passes the receipt 210 back to the mobile user device (e.g., client). In some examples, the receipt 210 is a signed receipt or payment receipt sent to the mobile user device 104 in a message, such as, but not limited to, the POP message 116 in FIG. 1. The mobile user device 104, in this example, acts like a POS terminal to perform EMV transactions over the cloud.

In some examples, the cloud POS 204 signs the payment receipt 210 against the smart chip server. The smart chip server 112 stores private keys and public keys for one or more devices, such as, but not limited to, the IoT devices. In one example, a consumer uses the digital wallet application 202 to communicate with the IoT device and perform payment over the mobile user device 104 mobile network. The smart chip server 112 signs the payment receipt 210 to verify the transaction and passing the payment receipt 210 to the mobile user device 104. The mobile user device 104 passes the receipt 210 to the IoT device. The IoT device decrypts the POP message, including the receipt 210 to verify the user has made the transaction payment successfully prior to vending the item selected by the user, releasing/unlocking a rented item and/or initiating an automated service.

Figure 3:
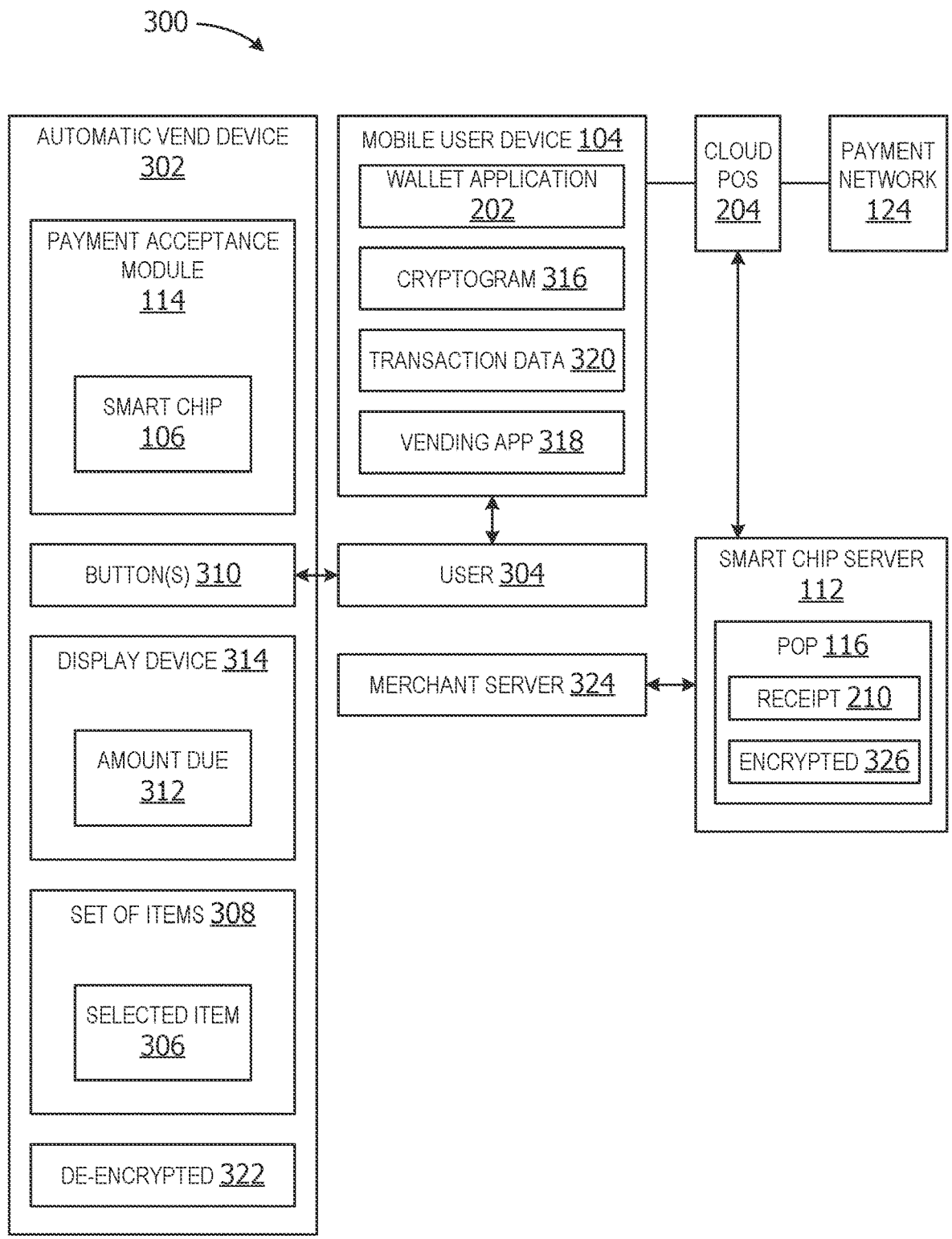
FIG. 3 is an exemplary block diagram illustrating a system 300 including an automatic vend device having a smart chip payment acceptance module.

FIG. 3 is an exemplary block diagram illustrating a system 300 including an automatic vend device 302 having a smart chip 106 payment acceptance module 114. The system 300 is a system including an IoT device having a smart chip payment acceptance module, such as, but not limited to, the system 100 in FIG. 1 and/or the system 200 in FIG. 2. The automatic vend device 302 is an IoT device for automatic vending of items to users, such as, but not limited to, the IoT device 102 in FIG. 1 above. The automatic vend device 302, in a non-limiting example, includes a vending machine for vending items, renting items for temporary usage and/or providing a service. In this non-limiting example, the automatic vend device 302 is a vending machine for dispensing an item to a user, such as, but not limited to, comestible items, beverages, water, ice, movies, stamps, transit tickets, toys, or any other type of item. In other examples, the automatic vend device 302 optionally includes a bike rental device for locking or unlocking a bike, scooter, or other mobility device for temporary usage by a renter, such as user 304.

In some examples, the process begins when the user 304 selects an item 306 from a set of one or more items 308. In this example, the user 304 chooses a selected item 306 by selecting one or more button(s) 310 on the automatic vend device 302 corresponding to the selected item 306. The automatic vend device 302 optionally presents an amount due 312 identifying a purchase price of the selected item 306 to the user 304. In this example, the amount due is displayed on a display device 314. The display device is implemented as any type of display device, such as, but not limited to, a liquid crystal display (LCD).

The user opens the wallet application 202 to initiate a digital payment transaction using the wallet application 202. The wallet application 202 is an application associated with a digital wallet linked to a user payment account provided by an issuer, such as, but not limited to, the digital wallet application 202 associated with the issuer 126 in FIG. 2. The wallet application 202 is a downloadable application downloaded onto the mobile user device by a user. The wallet application 202 is associated with a digital wallet platform associated with an online payment system for contactless purchases on mobile devices, such as, but not limited to, XPay Wallet, Apple® Pay, Google® Pay or any other type of wallet application or mobile payment application.

The mobile user device 104 connects to the offline automatic vend device 302 via a short-range communication channel, such as, but not limited to, the channel 120 in FIG. 1. The mobile user device 104 goes through the smart chip 106 powered acceptance module 114. The user who wants to obtain an item or use a service provided by the automatic vend device 302 performs an NFC tap using the wallet application 202 on the mobile user device 104. The payment acceptance module 114 has a service identifier (ID), terminal ID and/or an alternate ID, which is provisioned by the smart chip server 112. The mobile user device 104 captures that data associated with the automatic vend device 302.

In this example, a single tap is used to initiate and complete the payment transaction. In other examples, a first tap is used to initiate the payment transaction and a second tap is used to trigger sending the POP message and/or the signed receipt to the IoT device and complete the payment transaction. In still other examples, no taps on the user interface (UI) are necessary where Bluetooth® is used for transmission of transaction data between the IoT device and the mobile user device.

In some examples, the wallet application 202 of the mobile user device 104 generates a cryptogram 316. The cryptogram, in this example, is an online card or application authentication cryptogram. The cryptogram is a unique, one-time use cryptogram for authentication of the payment transaction. In this example, the cryptogram 316 is generated by the wallet application on the mobile user device.

In other examples, the mobile user device 104 utilizes a merchant vending application (vending app) 318 to facilitate the payment transaction. The merchant vending application 318 uses cloud POS 204 to interface with the payment network 124 via the mobile network.

The vending application 318, in some non-limiting examples, is developed by the merchant and available for download from a merchant server, an application (app) store, or other application source onto the mobile user device. The vending application 318 is integrated with cloud POS software development kit (SDK) to make connections to a cloud POS server.

In this example, the vending application 318 and the wallet application are separate applications downloaded separately onto the mobile user device. However, in other examples, the vending application 318 is an integrated application associated with the wallet application, as shown in FIG. 7 below. In these examples, the user does not have to download the vending application 318 as a separate downloaded application. Instead, the vending application 318 or a website of the merchant hosting the vending application 318 or providing vending application 318 services via the website is accessed or accessible by the wallet application via a network connection. The wallet application in these examples connects to the merchant server to access the merchant website or other server hosting the vending application. The merchant application or vending application content is provided within a popup window inside the wallet application, enabling the user to interact with the merchant vending application or other merchant website content without downloading the application or directly navigating to the merchant website on the merchant server. The portion of the merchant website presented within the popup window can be referred to as a lightbox.

In this example, the vending application 318 turns on the NFC module and communicates through its interface. When a user opens the vending application 318 on the mobile user device, the NFC module is turned on, and the vending application 318 goes into card reader mode. When a payment request command is received, the vending application 318 uses the cloud POS and makes a connection to the merchant's cloud POS server. Any data coming from the cloud POS server is forwarded to the mobile user device operating system (OS) interface. The vending application 318 acts as a pass-through for application protocol data unit (APDU) commands passing from the cloud POS server to the native wallet application as an EMV terminal transaction. When the EMV transaction is done, the vending application 318 passes the payment outcome and all payment session data to the merchant's server over an application programming interface (API) call. The API call in some examples contains an encrypted payload bound for the vending machine. The vending application 318 forwards the encrypted data over NFC.

In this manner, the merchant vending application interfaces with the wallet application on the mobile user device 104 to generate the cryptogram 316. The cryptogram 316 and transaction data 320 are sent over the cloud POS 204 to the acquirer. This is an e-commerce-type transaction with the acquirer. The transaction data is data including details of the transaction, such as, but not limited to, the transaction amount. The transaction data is utilized to interface with merchant server 324. The smart chip server 112 interfaces with the merchant server 324 to generate the receipt 210 for the item(s) and/or service(s) provided by a merchant associated with the merchant server 324.

The merchant server, in this example, receives the payment outcome, and is free to validate such payment outcome with its acquirer to verify the payment transaction. Once verified, the merchant server encrypts payment data with the machine's public key. Only the machine with the corresponding private key may decrypt the data, validate its contents, and decide to vend the merchandise or not.

In other examples, the merchant server provisions a Rivest Shamir Adleman (RSA) key pair for encrypted communications between the vending machine and the merchant server. The merchant server generates its own RSA public and private key. The merchant server stores its own public key on the vending machine and tracks the vending machine's inventory. The server handles the vending machine's transaction payload, including item store keeping unit (SKU) and amount. Where the vending machine is offline (e.g., no Internet connection), the merchant server can track remotely the remaining inventory in the vending machine and plan for inventory replenishment and maximize sales.

The merchant server has connectivity with the acquirer payment gateway and is able to inquire with the acquirer for payment transactions. such as validating a payment outcome. The merchant server encrypts the vending machine's transaction payload. Only the vending machine is able to decrypt transaction data with its own private key in this example. The decrypted data elements can be validated to perform a vend or no vend decision.

The merchant server can perform audit trail and transaction reconciliation. The server can keep track of all payment transactions and vending machine's inventory levels. The merchant can use these records as an audit trail and to reconcile payments.

In some examples, the smart chip server encrypts the receipt 210 and/or the POP 116 message. The encrypted 326 POP 116 message is transmitted to the automatic vend device 302 via the mobile user device 104. In other words, the mobile user device 104 acts as a proxy to receive the POP 116 message from the smart chip server 112 and pass that POP message from the mobile user device 104 to the automatic vend device 302. The smart chip server deletes the transaction details for increased security upon transmitting the signed receipt to the mobile user device 104.

If the payment transaction between the acquirer and the issuer is approved, the smart chip server 112 signs a receipt 210. The receipt 210 is sent from the smart chip server 112 to the mobile user device 104 in an encrypted 326 POP 116.

In some examples, the encrypted POP 116 message is transmitted from the mobile user device 104 to the automatic vend device 302. When the automatic vend device 302 receives the POP message, the automatic vend device 302 decrypts the message. The de-encrypted message is used to approve the user request for the selected item 306 and dispense the selected item 306 to the user. In other examples, the de-crypted message is used to approve the user request to unlock a rental bike or otherwise release an item for use by the user.

In other examples, instead of an item, the transaction is for a service. In this example, the automatic vend device 302 provides the service or initiates the service upon receiving the signed receipt 210.

Figure 4:
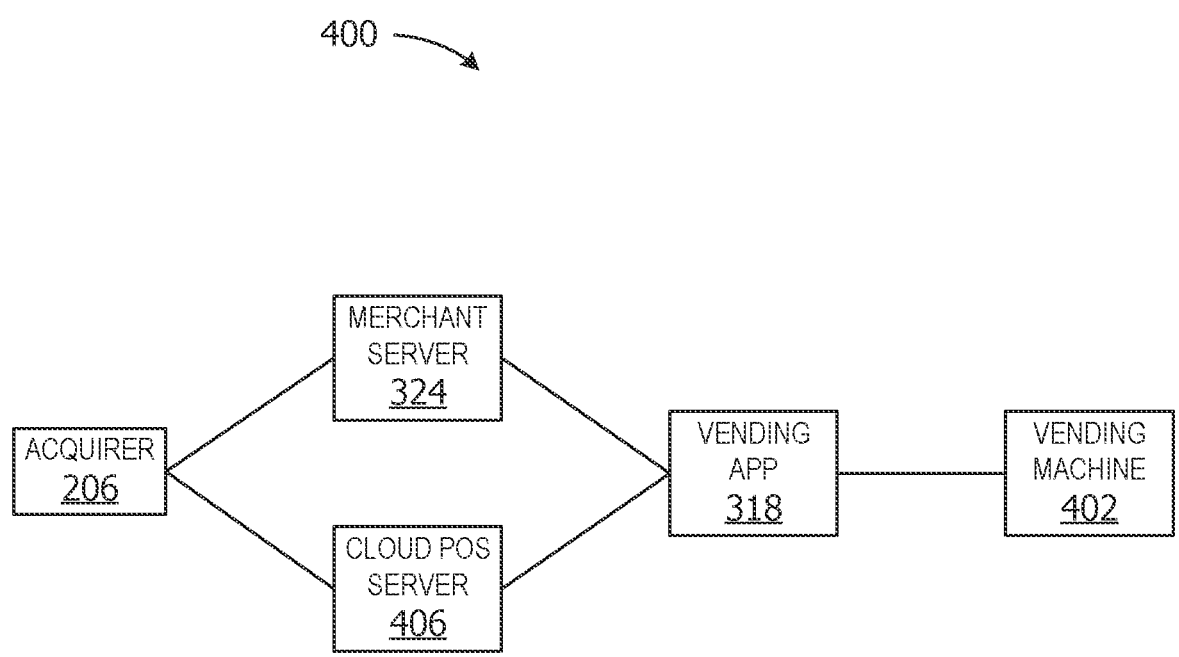
FIG. 4 is an exemplary block diagram illustrating a payment acceptance system 400 including a vending machine.

Turning now to FIG. 4, an exemplary block diagram illustrating a payment acceptance system including a vending machine 402 is depicted. The vending machine 402 is an IoT device including a smart chip payment acceptance module, such as, but not limited to, the IoT device 102 in FIG. 1 and/or the automated vend device 302 in FIG. 3. The vending machine is an automated device for dispensing one or more items to a user in response to receiving a payment transaction receipt from a smart chip server In this example, the cloud POS 204 and acquirer 206 set up is shown. A vending application (vending app) 318 is associated with a merchant providing one or more of the item(s) and/or service(s) provided by the vending machine 402. When the payment acceptance module is in writer mode, the vending application acts as a cloud-based POS terminal. The vending app 318 passes transaction data from the IoT device through the vending app 318 on the mobile user device to the payment network and/or the smart chip server.

In some examples, the vending app's cloud POS SDK exchanges encrypted APDU data with the cloud POS server 406 as a regular EMV transaction flow. The cloud POS is directly connected to the acquirer payment gateway for transactions. Once the payment transaction is performed, the payment outcome is returned to the acquirer. This payment outcome may be forwarded to the merchant for transaction reconciliation.

Figure 5:
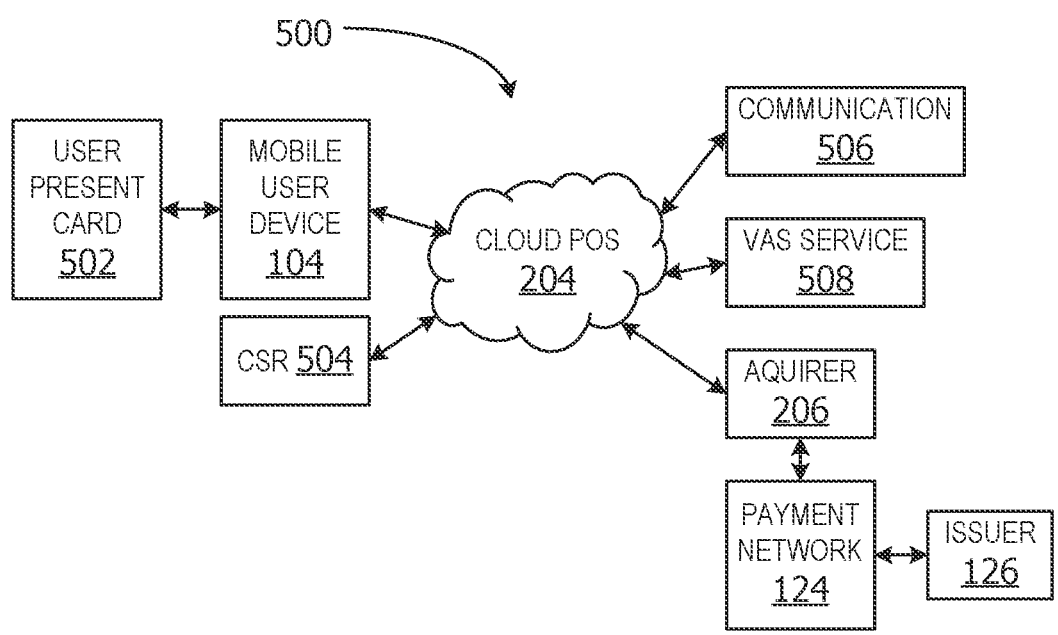
FIG. 5 is an exemplary block diagram illustrating a system 500 for payment acceptance including a cloud point-of-sale (POS).

FIG. 5 is an exemplary block diagram illustrating a system 500 for payment acceptance including a cloud POS. The system 500 includes a mobile user device enabling cloud-based payment acceptance, such as, but not limited to, the system 100 in FIG. 1, the system 200 in FIG. 2, the system 300 in FIG. 3 and/or the system 400 in FIG. 4. The payment acceptance process begins when a user selects an item or service and presents a payment card at 502. In this example, the payment card is a digital payment card associated with a digital wallet on the mobile user device 104. A customer service representative (CSR) 504 may be available to assist the user if the user has difficulty completing the selection or payment presentation. The mobile user device 104 connects to the payment gateway via the cloud POS 204.

In some examples, the cloud POS includes a plurality of APIs, such as, but not limited to, functional API, EMV kernel API, Administrative (Admin) API and/or business-to-business (B2B) API. The cloud POS 204 optionally also includes cryptographic (crypto) service(s), batch processing and/or a report engine. The cloud POS 204 performs payment processing tasks on one or more cloud servers.

The cloud POS 204 in other examples provides communications between clients and servers within the payment network 124. For example, the cloud POS 204, in one example, is used to forward transaction data and/or a cryptogram associated with a payment transaction for a selected transaction between the user and the vending machine to the acquirer 206 and/or the issuer 126. The acquirer 206 and issuer 126 process the payment transaction to determine whether to complete the transaction based on the transaction data. Completing the transaction refers to transferring funds from the issuer to the acquirer.

In still other examples, the cloud POS 204 provides one or more value added service(s) 508. A value-added service 508 is any add-on to basic services which is provided to a customer. A value-added service includes, for example but without limitation, online gaming, live streaming, location-based services, etc.

Figure 6:
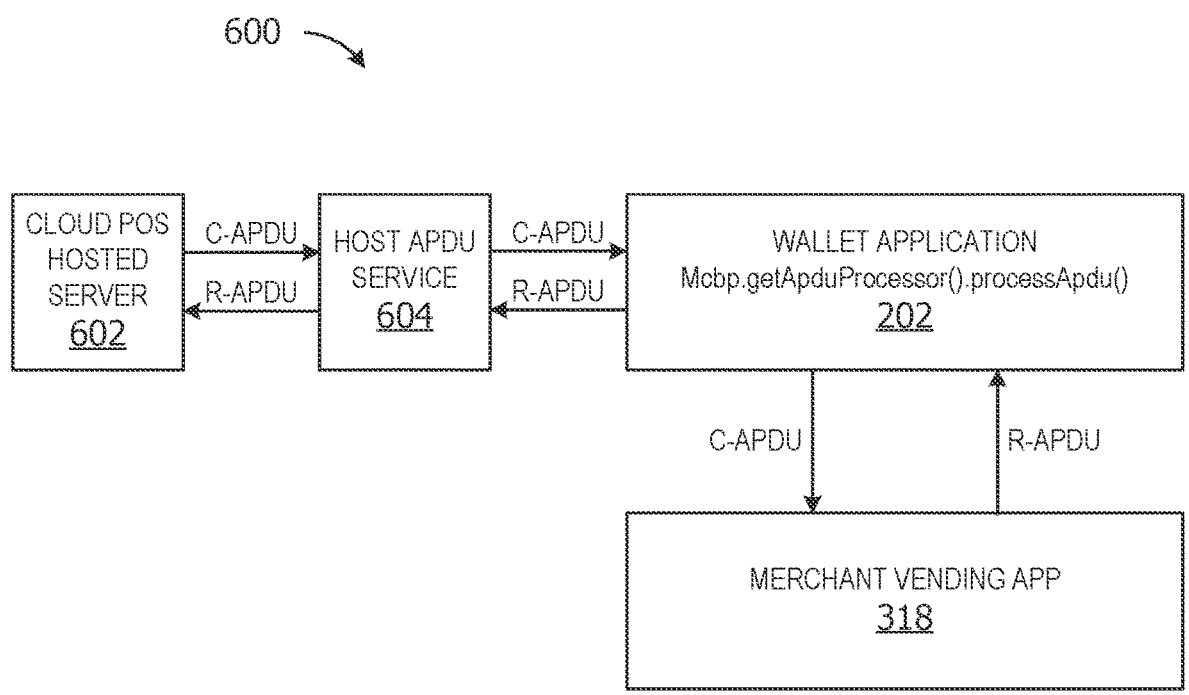
FIG. 6 is an exemplary block diagram illustrating a system 600 for handling of application protocol data unit (APDU) messages.

Referring now to FIG. 6, an exemplary block diagram illustrating handling of APDU messages is shown. In this example, the POS terminal is a cloud POS hosted server 602 exchanging APDU commands with the wallet application 202 via a host APDU service 604. The wallet application 202 is located at the wallet usability layer (WUL). In this example, wallet application interface with the WUL against a virtual POS terminal provided by the cloud POS. The C-APDU and R-APDU messages are sent over the mobile user device operating system inter-process communication (IPC) to the merchant's vending app 318.

Micro-mobility and unattended retail are two segments of industry that cannot afford the upfront certification cost, as well as real-time connectivity cost, of an EMV terminal in IoT devices, such as vending machines and bike rental devices. The smart chip powered acceptance module and unlock service enables alternate, low-cost acceptance solution for offline devices using NFC and secure element (smart chip), as well as more secure solution for online devices without being an EMV compliant terminal. The inability of contactless EMV terminals in growth areas of micro-mobility and unattended retail are frequently due to the costs and effort involved in EMV certification. Some examples provide a terminal standard that can provide similar transaction risk profile as contactless without requiring full EMV terminals using the smart chip enclave or hardware keystore.

Online devices, in some examples, accept payment with direct connectivity, for example, rental bikes using 4G connectivity for merchant to automatically lock/unlock the bike and other micro-mobility device. Offline devices, in other examples, accept payment without connectivity to the merchant, such as, vending machines, offline bike rentals and other offline vend devices. In an offline state, the smart chip acceptance device stores encryption keys securely on the smart chip device. The smart chip acceptance device enables the mobile user device to act like a terminal. In this example, the user's smartphone or other mobile device communicates with the cloud-based token to initiate the DSRP transaction.

FIG. 7 is an exemplary block diagram illustrating a system 700 including a payment acceptance module and unlock service for unlocking a vend device 702. The vend device 702 is a device, such as, but not limited to, the IoT device 102 in FIG. 1, the automatic vend device 302 in FIG. 3 and/or the vending machine 402 in FIG. 4. In this example, the vend device 702 is a device such as, for a vending machine or a rental bike locking device for unlocking or releasing a rental bike for use by a customer.

In this example, the payment acceptance module 114 is associated with an online vend device capable of connecting via the Internet, cellular network, or other long-range network communications, such as, but not limited to, 4G, LTE and/or 5G. In this example, the smart chip payment acceptance module 114 connects with an issuer wallet application 202 hosted on a mobile user device 104 via short-range communication, such as NFC, BLE, sound, UWB, 5G D2D or other type of short-range communication. In this example, the smart chip acceptance module 114 transmits an acceptance and service information associated with a product or service provided by the vend device 702. For example, the acceptance and service information associated with renting a bike or other micro-mobility device. A micro-mobility device is a lightweight vehicle, such as a bicycle, e-bike, scooter, etc.

A merchant vending application 318 is integrated into the wallet application 202 such that the user is able to view terms of service, service options, pricing, and other available features and services provided by the merchant via the wallet application 202. In other words, the user accesses the merchant vending application in conjunction with the wallet application 202, where the wallet application redirects the device to connect to the merchant webpage and displays or otherwise accesses portions of the merchant vending application within the wallet application rather than downloading the merchant vending application 318 as a separate application. However, the examples are not limited to an integrated merchant vending application. In other examples, the merchant vending application is downloaded as a separate application onto the mobile user device which interacts with the issuer wallet application 318. Once the user has selected desired service options and agreed to terms of service, the issuer wallet 202 requests digital secure remote payment (DSRP) credentials from the issuer 126.

DSRP, in some examples, enables secure e-commerce transactions from the merchant vending application using EMV-based cryptography to secure an e-commerce transaction. All DSRP transactions are routed to the payment network 124. DSRP provides cardholder authentication for every transaction that is verified via the mobile user device's cardholder verification method (CVM). The CVM can include, for example, biometrics, PIN, or other verification. The biometrics can include facial recognition, fingerprint, voice recognition, or any other type of biometric.

In this example, the issuer initiates a payment session via an unlock service 704. The unlock service 704 is a software as a service (SaaS) hosted on a computing device or cloud server, such as the cloud server 904 in FIG. 4 below. The unlock service performs the transaction request with the merchant 324. An acquirer payment service provider (PSP) provides DSRP credentials to the unlock service. Once payment is approved, a payment confirmation with unlock code is transmitted to the vend device 702. The vend device uses the unlock code to unlock the micro-mobility device for utilization by the user.

Figure 8:
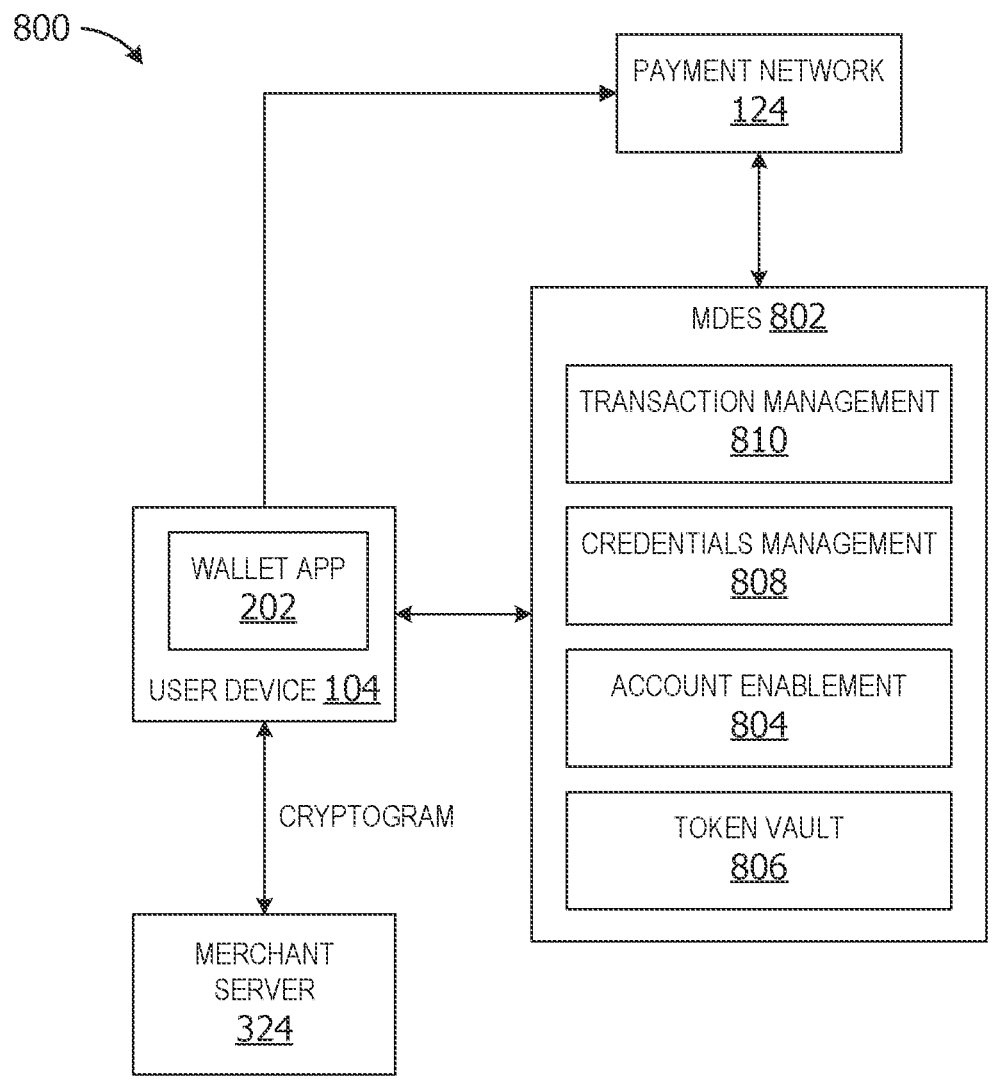
FIG. 8 is an exemplary block diagram illustrating a system 800 for contactless payment acceptance using tokenized payment credentials.

FIG. 8 is an exemplary block diagram illustrating a system 800 for contactless payment acceptance using tokenized payment credentials. In this example, the cloud-based POS enables secure transactions using a mobile user device 104 with a payment application, such as an issuer wallet application 202, without a secure element in the mobile user device via NFC, in-app DSRP or scanning a quick response (QR) code. The process begins by tokenizing the payment card and credentials for account enablement 804 via digital enablement service (MDES) 802. The token(s) are stored in a token vault 806. The token can be a native token and not necessarily an issuer token. The digitized card and credentials are delivered to the wallet application 202. A transaction is performed using the digitized card and credentials associated with the wallet application 202 via a payment network 124. Fraud detection associated with credentials management 808 is performed. Transaction management 810 de-tokenizes the token(s) in the token vault during transaction processing prior to transaction authorization.

FIG. 9 is an exemplary block diagram of a system 900 for pre-authorization of contactless payment to unlock a vend device using an unlock service 704. In this example, the merchant provides an on-board smart chip acceptance point for a rental bike or other micro-mobility device for rental via an automated vending device in an absence of human personnel. Smart chip credentials are generated by the unlock service 704 and provided to the merchant. The merchant provisions the micro-mobility device with the smart chip credentials.

In one example, a user 902 performs an NFC tap of the vend device 702 by bringing the mobile user device 104 within proximity of the payment acceptance point. The mobile user device transmits service details associated with obtaining a service provided by the vend device 702 to the issuer 126. The unlock service 704 validates the smart chip and creates a session with consumer information, such as name, phone number, etc. The wallet application displays the merchant webpage in a lightbox (pop-up) window within the issuer wallet application enabling the user 902 to interact with the merchant application without downloading the merchant vending application. The unlock service 704 validates the session with the merchant server 324 associated with the vend device. The unlock service 704 gets the consumer information from the merchant. The merchant obtains the consumer information via the merchant application or webpage linked or otherwise integrated into the wallet application. The user 902 selects a service and initiates payment via the merchant webpage or application. The unlock service 704 receives a request to generate DSRP transaction credentials from the merchant server 324 hosting the merchant webpage. The unlock service performs CDCVM and submits DSRP credentials to the merchant server 324. The merchant server 324 unlocks the vend device 702 on successful pre-authorization transaction.

Figure 10:
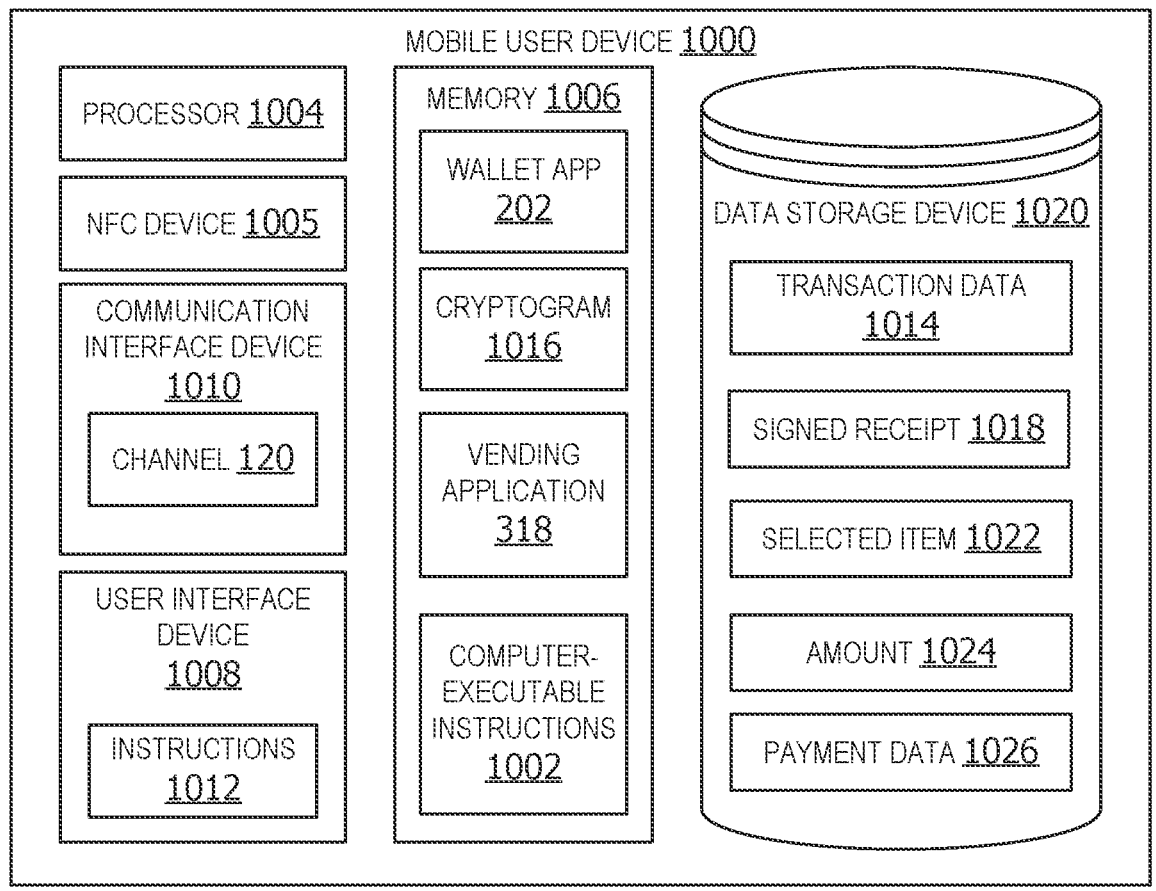
FIG. 10 is an exemplary block diagram illustrating a mobile user device 1000.

FIG. 10 is an exemplary block diagram illustrating a mobile user device 1000. The mobile user device 1000 is a portable or mobile computing device, such as, but not limited to, the mobile user device 104 shown in FIG. 1, FIG. 2, FIG. 3, FIG. 5, FIG. 7, FIG. 8, and FIG. 9 shown above. The mobile user device 1000 represents any mobile device executing computer-executable instructions 1002 (e.g., as application programs, operating system functionality, or both) to implement the operations and functionality associated with the mobile user device 1000. In some examples, the mobile user device 104 has at least one processor 1004 and a memory 1006. The mobile user device 1000, in this example, also includes a user interface device 1008.

The processor 1004 includes any quantity of processing units and is programmed to execute the computer-executable instructions 1002. The computer-executable instructions 1002 are performed by the processor 1004, performed by multiple processors within the mobile user device 1000 or performed by a processor external to the mobile user device 1000. In some examples, the processor 1004 is programmed to execute instructions such as those illustrated in the figures (e.g., FIG. 12, FIG. 13, FIG. 14, FIG. 15, FIG. 16, FIG. 17, FIG. 18. FIG. 19, FIG. 20, FIG. 21, FIG. 22, FIG. 23, and FIG. 24) shown herein.

The mobile user device 1000 further has one or more computer-readable media, such as the memory 1006. The memory 1006 includes any quantity of media associated with or accessible by the mobile user device 1000. The memory 1006, in this non-limiting example, is internal to the mobile user device 1000 (as shown in FIG. 10). In other examples, the memory 1006 is external to the mobile user device 1000 (not shown) or both (not shown).

The memory 1006 stores data, such as one or more applications. The applications, when executed by the processor 1004, operate to perform functionality on the mobile user device 1000. The applications can communicate with counterpart applications or services such as web services accessible via a network. In an example, the applications represent downloaded client-side applications that correspond to server-side services executing in a cloud.

In other examples, the user interface device 1008 includes a graphics card for displaying data to the user and receiving data from the user. The user interface device 1008 can also include computer-executable instructions (e.g., a driver) for operating the graphics card. Further, the user interface device 1008 can include a display (e.g., a touch screen display or natural user interface) and/or computer-executable instructions (e.g., a driver) for operating the display. The user interface device 1008 can also include one or more of the following to provide data to the user or receive data from the user: speakers, a sound card, a camera, a microphone, a vibration motor, one or more accelerometers, a Bluetooth® brand communication module, global positioning system (GPS) hardware, and a photoreceptive light sensor. In some non-limiting examples, the user interface device 1008 outputs instructions to the user for completing the payment transaction using the wallet application 202 via a display screen.

In other examples, an NFC device 1005 on the mobile user device 1000 is capable of generating and/or detecting data transmitted via NFC. The NFC device 1005, in this example, is shown as a separate component from the communications interface device. However, in other examples, the NFC device can be integrated within the communications interface device.

The mobile user device 1000 optionally includes a communications interface device 1010. The communications interface device 1010 includes a network interface card and/or computer-executable instructions (e.g., a driver) for operating the network interface card. Communication between the mobile user device 1000 and other devices, such as but not limited to, the IoT device, can occur using any protocol or mechanism over any wireless connection. In some examples, the communications interface device 1010 is operable with short range communication technologies, such as by using NFC tags.

In some examples, the wallet application 202 interacts with the IoT device via the short-range communication channel 120 to obtain transaction data 1014 used to generate a cryptogram 1016. The mobile user device 1000 forwards the cryptogram and transaction data to a payment network for use by an issuer and/or acquirer in completing the payment transaction. The smart chip server creates a signed receipt 1018. The signed receipt 1018, in this example, is encrypted. The encrypted signed receipt 1018 is sent from the smart chip server back to the mobile user device 1000 via the communication interface device 1010.

The system 100 can optionally include a data storage device 1020 for storing data, such as, but not limited to, the transaction data 1014 associated with a given transaction for purchase or rental of an item or service. An item can include any type of item that is purchased or vended to the user, such as, but not limited to, a selected item 1022. The transaction data 1014 includes data associated with the transaction, such as, but not limited to, a terminal ID, an item ID, an amount 1024 due for the purchase, etc. The data storage device can also optionally include payment data 1026 associated with one or more payment accounts provisioned to the wallet application 202.

The data storage device 1020 includes one or more different types of data storage devices, such as, for example, one or more rotating disks drives, one or more solid state drives (SSDs), and/or any other type of data storage device. The data storage device 1020, in some non-limiting examples, includes a redundant array of independent disks (RAID) array. In other examples, the data storage device 1020 includes a database for storing and organizing data.

The data storage device 1020, in this example, is included within the mobile user device 1000, attached to the mobile user device 1000, plugged into the mobile user device 1000 or otherwise associated with the mobile user device 1000. In other examples, the data storage device 720 includes a remote data storage accessed by the computing device via the network, such as, but not limited to, data storage in a data center or a cloud storage.

In an example scenario, the user opens the vending merchant OEM vending application 318 and the cloud-based payment wallet application 202 installed on the mobile user device 1000. The vending application goes to the foreground and checks that the NFC module is enabled. The wallet application 202 is signed in and a default credit card added associated with a card ID. Alternatively, a selected digital wallet is set as default payment application with a default credit card assigned. The selected digital wallet can be implemented as any type of digital wallet, such as Google™ Pay.

The vending application, in this example, activates the NFC device 705 and goes into a card reader mode and listens to incoming data over the NFC. The NFC acts as a passive device in card emulator mode. The user taps the mobile user device user interface indicating a desire to proceed with digital payment to purchase the selected items or requested service while the mobile user device is near an NFC reader on the IoT device. The NFC field between the mobile user device and IoT device NFC reader is activated. The IoT device processor begins the transaction process.

In this example, the vending application on the mobile user device detects a payment card and interacts with the card for data. For example, a hex C-APDU command of "01" can be sent to the IoT device processor (CPU). On "01" command received, the IoT device processor initiates a new payment transaction. The vending applications requests the IoT device transmit the transaction data by sending "01" command to the IoT device. Some or all of the transaction elements may be encrypted by the IoT device using a set of PKI keys or any other type of cryptography. The IoT device processor responds to the vending application 318 request by generating the transaction elements. The IoT device processor sends the transaction data to the vending application as APDU response commands (R-APDU) over NFC. In some examples, the IoT device processor responds to the vending application commands over APDU in EMV TLV format.

The vending application 318 becomes a virtual POS terminal, with cloud POS SDK connecting to cloud POS server. All the cloud POS communications are forwarded to the mobile user device wallet application 202 using the mobile user device OS level IPC to extract EMV transaction data, like a regular POS terminal. The vending application activates cloud POS SDK. The vending application initiates communications with the cloud POS server with the transaction amount. The system calls upon the wallet application 202 using OS-level interface. Any necessary authentication is performed beforehand.

The cloud POS transactions are performed with the wallet application 202 using the vending application as a pass through. The cloud POS sends the EMV APDU commands (C-APDU) and gets the APDU commands (R-ADPU) back from the wallet application 202. The vending application 318 forwards all C-APDU commands to the wallet application 202. The vending application forwards all R-APDU commands from the wallet application 318 to the cloud POS server. The wallet application 202 performs EMV terminal transaction over inter-process communications with the OS by responding with APDU commands. The standard EMV transaction commands are issued from the cloud POS to select a payment card and a user the wallet application cryptogram. The cryptogram and transaction data is sent to the acquirer in order to obtain a payment outcome from the acquirer. The transaction data sent with the cryptogram, in this non-limiting example, includes the transaction amount, PAN, Expiry Date, automatic timing, and control (ATC) data, and payment cryptogram.

The cloud POS performs the transacting processing and gets an outcome. The cloud POS forwards transaction elements, including the cryptogram, to the acquirer over the payment network. The issuer receives the cryptogram, approves the transaction, and generates a response with the transaction outcome. The system forwards all C-APDU commands to the digital (MCBP) wallet. The transaction processing is completed with the cloud POS. The cloud POS obtains the TVR result or payment transaction result from the acquirer. The cloud POS closes the connection with the acquirer and forwards the outcome to the vending application. In this example, the cloud POS returns the IoT device's public key encrypted data elements to the vending application, as well.

When the vending application 318 receives the transaction outcome from the wallet application, the vending application forwards the transaction outcome, machine ID and encrypted machine data elements to the merchant API server. The data elements sent to the merchant server can include, for example but without limitation, the transaction outcome, machine ID, amount, and other encrypted secret payload transaction-related data elements. The transaction-related data elements that are encrypted, include data such as, but without limitation, merchant ID, random value amount, slot number and payment time ATC.

The merchant server stores the transaction outcome. The merchant server may use the transaction outcome to validate payment with the acquirer. The merchant server decrypts the transaction-related data elements (e.g., secret payload) with the merchant private key to get the random generated hex value and transaction data for storage and transaction history reconciliation. The merchant server looks up the public key of the given IoT device. The look-up can be performed using the machine ID associated with the IoT device (e.g., vending machine). The merchant server encrypts the actual secret value and machine data and machine data elements and returns them as a response to the mobile user device.

The vending application forwards the encrypted data, including the cryptogram, from the merchant server to the IoT device over NFC using NFC APDU commands. The vending application closes the merchant internet connection and responds with a payment success message to the user.

The response payment success message is displayed via a UI on the mobile user device. A reply from the IoT device may also be received and/or displayed to the user indicating that vending is success and/or instructing the user to pick up merchandise, such as vended item(s), from the machine.

In some examples, by interfacing with the smartchip payment acceptance module on the IoT device, the mobile user device gathers transaction data, such as, but not limited to, total transaction amount (e.g., payment amount), location of transaction, distance travelled between stations and/or trips, as well as other services or products provided to the user by the merchant. From these data, the system can generate offers and/or push information associated with offers from nearby advertisers and/or merchants, recommendations and/or offers based on past trips and/or other information to assist users. The data can also be used to help merchants better estimate demand of their products and services, and allocate their resources more effectively and maximize revenue, such as, but not limited to, detecting low inventory levels and/or estimating repair and replacement part costs for IoT devices.

Figure 11:
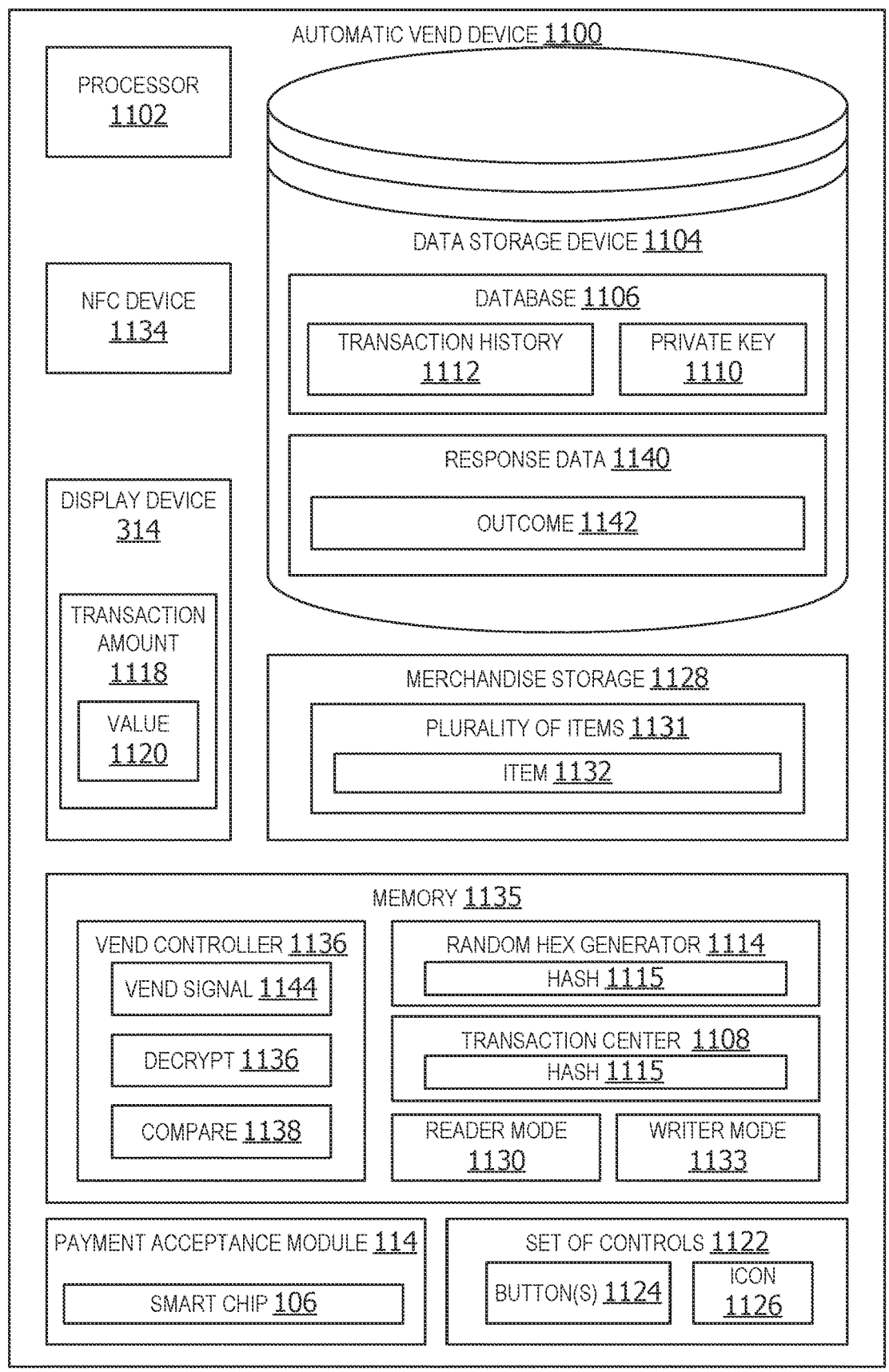
FIG. 11 is an exemplary block diagram illustrating an automatic vend device 1100.

FIG. 11 is an exemplary block diagram illustrating an automatic vend device 1100. The automatic vend device 1100 is an example of an IoT device for vending items, such as, but not limited to, the IoT device 102 in FIG. 1, automatic vend device 302 in FIG. 3, the vending machine 402 in FIG. 4, the vend device 702 in FIG. 7, and/or the vend device 702 in FIG. 9.

The automatic vend device 1100, in some examples, includes a smart chip 106 payment acceptance module 114. The payment acceptance module 114 has a reader mode 1130 and a writer mode 1133. In reader mode 1130, the payment acceptance module 114 acts like a POS terminal to transfer data obtained from a user payment card or digital wallet to the smart chip 106. In writer mode 1133, the smart chip 106 acts as a payment card and the mobile user device acts as the POS terminal forwarding transaction data and other details to the payment network for EMV-like processing. The transaction data includes data associated with the POS terminal and the transaction, such as, but not limited to, the terminal ID and the payment amount.

In some examples, the automatic vend device 1100 includes one or more processors, such as, but not limited to, the processor 1102. The processor 1102 may be referred to as a central processing unit (CPU). In writer mode, the processor 1102 determines what data goes to the smart chip for transfer to the mobile user device. In other words, the processor 1102 identifies the transaction data to be provided to the mobile user device for transfer to the payment network and/or the smart chip server.

The processor 1102 controls one or more functions on the automatic vend device. For example, the processor 1102 can send electrical signals to a motor relay board for dispensing merchandise and read sensors placed within the machine to detect whether merchandise has been properly vended or not. The processor, in other examples, sends electrical signals to an LCD display screen to inform users of the cost of the selected merchandise, and reads electrical signals from a button keypad used by users when selecting merchandise.

In other examples, a data storage device 1104 associated with the automatic vend device 1100 include a database 1106 for storing data, such as, but not limited to, the transaction data. The database 1106 is implemented as any type of database for storing data. In this example, the database 1106 is a relational database. However, the examples are not limited to relational databases.

The data storage device 1104, in other examples, also includes a device private key 1110 and/or transaction history 1112. The device private key 1110 is a key used to decrypt the encrypted POP messages and/or encrypted signed receipts received from the smart chip server. The private key 1110 is provisioned prior to the beginning of the payment transaction. In some examples, the private key is provisioned to the automatic vend device 1100 during a registration or initialization process. The private key 1110, in this non-limiting example, is a PKI private key corresponding to a public key held by the smart chip server. The smart chip server encrypts the POP message using the public key and the automatic vend device (e.g., IoT device) decrypts the POP message using the corresponding private key.

The automatic vend device 1100, in other examples, includes a display device 314. The display device, in an example, is implemented as an LCD or touchscreen display. The display device displays transaction-related information to the user, such as, but not limited to, a transaction amount 1118 value 1120 indicating an amount of funds or cost of one or more items or services requested by the user.

A set of one or more controls 1122 is provided to enable the user to select item(s) and/or service(s). In some examples, the set of controls includes one or more physical button(s) 1124 and/or one or more graphical icon(s) 1126 presented on a user interface on the display device. In this example, the user presses a control button to select an item to be vended to the user from the vending machine.

A merchandise storage 1128 is a physical compartment, item display area or storage space within the automatic vend device 1100 for storing a plurality of items 1131, including the vended item 1132. The plurality of items 1131 includes one or more different types of items for rent or purchase by the user. The plurality of items 1131 can include any type of items, such as, but not limited to, food, drinks, snacks, toys, candy, video disks, key chains, gift card, dog tags, etc. The vend device is not limited to dispensing physical items. The vend device can also provide automated services, such as, but not limited to, playing music, turning on air at an air pump, turning on water or a soap dispenser at a car wash, counting change, playing a video on a screen, releasing a lock on a bicycle, opening a gate, unlocking a locker storing item(s) for user retrieval, etc.

In this example, the vended item 1132 is the item which is dispensed or released to the user upon verification that the payment transaction for the vended item is complete. The automatic vend device 1100 in this non-limiting example includes the storage area for storing merchandise or other items. However, other IoT devices may not include a merchandise storage or a plurality of items for vending. For example, if the IoT device is a bicycle lock, the IoT device does not include a merchandise storage 1128.

A memory 1135, in other examples, includes a software vend controller 836. The vend controller controls one or more physical devices on the automatic vend device 1100 to dispense or release the vended item 1132 to the user.

The transaction counter 1108, in this example, is a software counter that increments 1109 for each transaction to reflect a number of transactions completed within a given time period. In other examples, the transaction counter 1108 is implemented as a hardware device and/or as a partially hardware and partially software device.

The random hex generator 1114 is a software component for generating random hash 1115 values. In some examples, the random hex generator 1114 is used to generate a random number which is used in place of a user payment account number, hashed message authorization codes (hmacs), or other hash values for increased security. The automatic vend device 1100 uses these components to generate the payment details sent to the server. The payment details are used by the mobile user device to validate the payment receipt received from the server.

In an exemplary scenario, a user selects merchandise from the plurality of items 1131 by selecting one or more of the buttons on the set of controls 1122. The transaction amount 1118 due for the purchase of the selected item(s) is displayed on the display device 1116. The transaction amount 1118 indicates a purchase price (e.g., amount to be paid) for the user to obtain the selected items from the automatic vend device 1100. The user opens a merchant wallet application associated with a digital wallet payment account to pay the transaction amount.

In this non-limiting example, the user taps the wallet application to initiate payment at the smart chip payment acceptance module. To initiate the payment transaction, the user taps an icon or appropriate portion of the UI on the mobile user device while the mobile user device is near an NFC reader on the IoT device. The NFC field between the mobile user device and IoT device NFC reader device is activated. The IoT device processor begins the transaction process.

In some examples, when the vending application on the mobile user device detects a payment card and interacts with the card for data, a hex C-APDU command of "01" is sent to the automatic vend device processor 1102. On "01" command received, the processor 1102 initiates a new payment transaction and generates transaction data elements. A random hex number is generated by the random hex generator 1114 and stored in the database 1106. The internal vending session transaction counter 1108 is incremented. These values are stored in database 1106 and mapped to the vending session ID.

In the above example scenario, the transaction elements stored in the database can include, for example and without limitation, C-APDU command flag ("01"), transaction amount ($1.00), machine ID (MACHINE123), slot number (A1), machine ATC counter incremented (e.g., integer value, to prevent replay attack on duplicate vending sessions), session creation timestamp (e.g., UNIX format, integer value, to prevent replay attack on duplicate payment transactions). Some or all of the transaction data elements are encrypted using the merchant's public key stored in the automatic vend device. In this example, the encrypted data elements include the random hex number as a secret value only known to the machine and merchant and the ATC counter session creation timestamp. For example, the random hex value can be: 0 000FFFF1234. The merchant server decrypts the data, obtain the value, re-encrypt the data with the machine's public key and then return a response. The vending application requests the automatic vend device processor transmit the transaction data by sending a "01" command.

In some examples, the automatic vend device 1100 responds to the vending application command as an APDU response over NFC. The APDU response in hex format represent the encrypted data elements. The data elements may be represented as data string in TLV format and sent over to the mobile user device from the automatic vend device.

In one example, data elements may be represented by a string of digits representing the transaction data. For example, the transaction amount for a given transaction to purchase an item having a purchase price of one dollar, can be represented in a string of digits representing the transaction data as: 021012345678 900302A10405 00100. In this example, the tag 04 corresponds to the transaction amount. The tag 05 is an expected data length 00100, which is the 5-character long data representing the transaction amount. In this example, the digits "00100" are the transaction amount in five digits indicating a one-dollar transaction amount (e.g., purchase price) for the selected item.

Once the transaction processing has begun with the mobile user device acting as a cloud POS terminal, the automatic vend device waits to receive an incoming encrypted response back from the mobile user device. The automatic vend device receives the encrypted data, in some examples, over NFC. The automatic vend device processor 1102 utilizes cryptographic key(s) to decrypt the data. The processor 1102 compares the decrypted data, including the cryptogram, against generated transaction data elements and validates the embedded data elements against the current vending session. The decrypted data includes an outcome indicating whether the payment transaction for purchase of the item or service completed successfully.

The processor 1102 uses a stored private key to decrypt the data elements. The random value, ATC, payment amount, slot number are compared to determine if the values match with the values stored in the current vending session. The payment time must be greater than the starting vending session. The encrypted data elements can include, for example, the merchant ID, random value amount, slot number, and/or payment time. Once the vending session is validated and approved, the vend controller 1136 sends one or more vend signals to the vending machine's motor relays to release the merchandise.

In the example scenario above, the vend controller informs the motor to vend the item at location "A1" in the vending machine to the user. The processor responds to the mobile user device vending application with APDU data that the item vend is successful (or failure if motor fails to run). In some examples, sensors within the machine detects the item is dropped off successfully. A reply can be sent to the vending application indicating that vending is successful and/or instructing the user to pick up the selected merchandise from the vending machine.

The vend controller 1136 reduces one item from inventory at slot A1. In one example, an inventory count is decremented by one to reduce the item inventory at slot A1. The current vending session is closed. The data exchange from the vending machine to the vending application can be represented as: 040101, where the data has a length of 1 byte. The value of the data is "01", indicating vend success or 040100 where the value of the data is "00", indicating vend failure.

The smart chip payment acceptance module, in this example, includes a smart chip terminal. The smart chip payment acceptance module 114 generates transaction data, including the transaction amount (e.g., amount due). The smart chip terminal in reader mode reads the transaction amount. Once payment is read, the merchant vending application becomes a cloud POS terminal. The mobile user device digital wallet transmits the transaction data obtained from the smart chip 106 to cloud POS.

The cloud POS, in this non-limiting example, sends the transaction data to the payment network. An outcome is received from the payment network indicating whether payment from the issuer to acquirer is approved and/or completed. In this example, this is an MVE transaction.

After receiving the payment outcome, the data is passed from the cloud POS to the smart chip server. The smart chip server creates a signed receipt and utilizes a public key corresponding to the private key 1110 on the automatic vend device 1100 to encrypt the receipt. The encrypted receipt is passed back to the mobile user device. The mobile user device passes the encrypted receipt to the smart chip 106. The smart chip payment acceptance module 114 decrypts the receipt and uses the receipt for the smart chip terminal corresponding to the user's requested transaction. The automatic vend device 1100 approves the transaction and dispenses the item 1132. The vended item 1132 is released to the user associated with the mobile user device.

In another non-limiting example, the payment acceptance module reads payment data from a payment card read at a physical POS terminal on the automatic vend device 1100 or obtains payment data from a digital wallet application associated with a mobile user device communicatively coupled to the payment acceptance module via an NFC device 1134. The NFC device 1134 is a device capable of establishing a near-field or short-range communication channel for exchange of payment data between the mobile user device and the IoT device, such as, the automatic vend device 1100. In some examples, the NFC device is an NFC reader or any hardware communications device (such as microphone, speakers, or camera) that is capable of exchanging data with a smartphone.

The NFC device 1134 provides a short-range communication channel, such as BLE, UWB or True Sound. In some examples, if NFC is unavailable, the user can present a quick response (QR) code on the mobile user device phone for scanning by the POS terminal.

The NFC device 1134 serves as a medium of communications for data exchange between the mobile user device and the vending machine NFC reader device. The NFC reader installed on the vending machine is used to exchange bytes data using the smart card APDU (application protocol data unit). A different medium of communications can also be used, such as, but not limited to, NFC contactless near-field communications and/or Bluetooth® technology which enables wireless transfer of data within a short range.

In one example, wireless transfer of data occurs within a range of 0 centimeters (cm) to 5 cm. The NFC communications can also include chirp technology using microphone and speakers to listen and process data within an audible range. In other examples, optical technology using light waves and camera can also be used to process data within a visible range in a line of sight.

The smart chip 106, in this example, generates transaction data associated with a payment transaction for vending of at least one item or at least one automated service from an IoT device. The transaction data includes data associated with the transaction, such as, but not limited to, the transaction amount 1118, an item ID of the selected item, a terminal ID of the POS terminal, etc. The payment acceptance module in the writer mode sends the generated transaction data to a vending application on the mobile user device. The vending application is an application associated with a merchant providing the selected item or service. The vending application is downloaded onto the mobile user device. The vending application acts as a cloud-based POS terminal when the payment acceptance module is in writer mode.

The payment acceptance module transmits the transaction data from the payment acceptance module to the mobile user device. The payment acceptance module receives encrypted response data generated by the smart chip server after the EMV-like transaction processing between the issuer and the acquirer is completed. The response data is forwarded by the vending application to the payment acceptance module. The response data 1140 in this example includes an outcome of a cloud POS payment transaction. In other examples, the response data 1140 includes a signed receipt in the form of a POP message.

The vend controller, in this example, causes the processor to decrypt the response data 1140 and uses the decrypted response data 1140 to determine the outcome of the EMV-like payment transaction processing. If the outcome indicates a successful payment transaction (e.g., transaction complete), the vend controller sends a vend signal 1144 to release the at least one item or initiate the at least one automated service.

Thus, the smart chip powered payment acceptance module enables a vending machine or other unattended (e.g., automated) retail devices to operate in remote environments with no internet connectivity, which is more convenient for consumers. Examples of remote environments include tourist attractions, mountainous and/or swampy regions, industrial areas, etc.

Automated (e.g., unattended) retail machines may operate in cashless mode which enables merchants to reduce maintenance for handling cash-based transaction such as notes and coins. Merchants can monitor automated IoT machine inventory levels remotely, and better plan for inventory replenishment and maximize sales. The system is built on top of existing strong EMV security standards. Payment transactions are performed by the user's existing mobile phone data connectivity. The cloud POS is PCI certified, enabling merchants to enjoy lesser PCI certification burden. The system supports multiple wallet players that support inter-process communications with vending applications.

The automatic vend device 1100 may also include an operating system capable of controlling the above electrical signals using input/output pins in a timely and controlled manner. The automatic vend device, in other examples, is able to read and write from a database and stored in a storage disk. It optionally includes a LAN or WI-FI module installed for Internet connectivity to communicate with devices for the web. The automatic vend device can optionally include a serial or USB interface port to communicate with external devices over electrical wires.

In some examples, before the vending machine is deployed on site, the automatic vend device is requested to generate an asymmetric RSA key pair. The RSA private key is stored securely on a non-volatile disk storage area readable by the machine's CPU. Similarly, the merchant API server also generates a separate RSA asymmetric key. The public keys are exchange between the API server and automatic vend device and stored in the database 1106. Details such as machine ID, inventory, selling price of merchandise and transaction history, are stored on the API server. The details may be referenced by a database row ID. The API server may be hosted by the cloud, and reachable by any smartphone application that has the merchant's vending application installed.

In an example scenario, a user selects merchandise by choosing corresponding buttons or controls in the set of controls 1122 on the automatic vend device (e.g., vending machine) or other IoT device corresponding to the selected item(s) the user wants to purchase. The term purchase can refer to purchasing an item or renting the item for temporary use.

The processor (e.g., CPU) looks up the memory location in the database to determine the payment amount (e.g., purchase price or rental fee) for the item at the chosen slot. The processor checks the inventory for the slot number. If the inventory value is a positive integer, one or more instances of the item is available.

The slot number is an item or item location identifier. The slot number can be represented as any alphanumeric, symbol, code, text, or other identifier. A non-limiting example of a slot number includes the value "A1." The processor creates a new vending session ID (e.g., universally unique ID (UUID) format). For example, if the user presses a button corresponding to the item slot location "A1", the system checks the inventory at the selected slot number, which indicates whether any instances of that item is available for purchase.

If the selected item is available, the automatic vend device 1100 displays the amount for purchase of the selected item. The automatic vend device 1100 determines the transaction amount for the session and instructs the display device 1116 to display the sale price of the selected item. For example, if the price for the selected item is one dollar, the transaction amount of $1.00 is displayed on the LCD or other display on the automatic vend device 1100.

Figure 12:
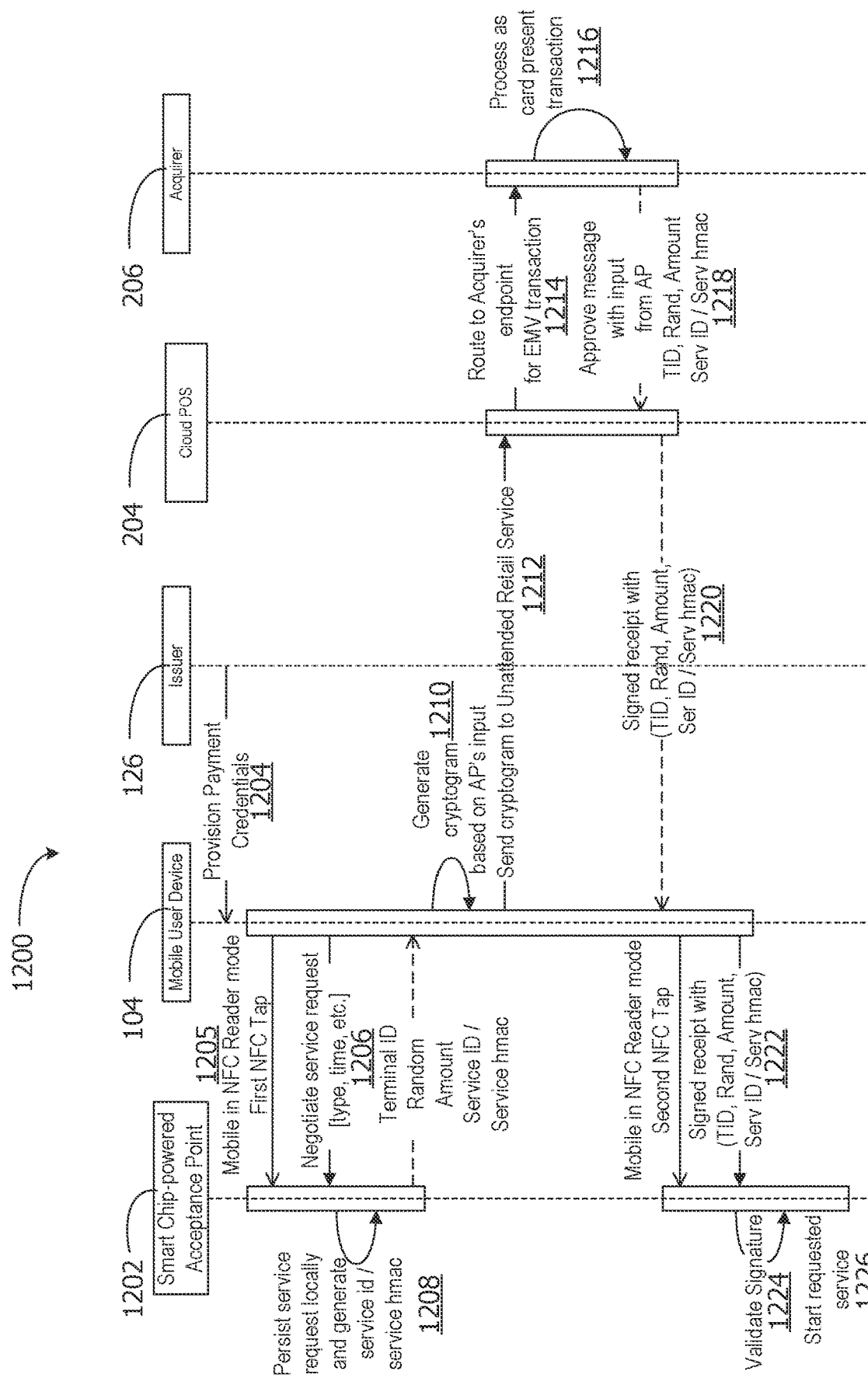
FIG. 12 is an exemplary process flow chart 1200 illustrating operation of the digital payment acceptance system utilizing a smart chip powered acceptance point to accept a digital wallet payment transaction.

FIG. 12 is an exemplary process flow chart 1200 illustrating operation of the digital payment acceptance system utilizing a smart chip powered acceptance point to accept a digital wallet payment transaction. The smart chip powered acceptance point 1202 is a payment acceptance module including a terminal and smart chip, such as, but not limited to, the smart chip payment acceptance module 114 in FIG. 1.

The process begins by provisioning the digital wallet at 1204. The digital wallet is an application on the mobile user device 104 by a digital wallet application issuer 126. The issuer 126 provisions a payment account associated with the digital wallet on the mobile user device by allocating funds to the account, designating a credit limit, assigning a number of credits and/or reward points, or otherwise assigning an amount of funds available for the user to utilize during one or more future payment transactions.

When the user is ready to make a payment at a vending machine or other IoT device, the user opens the wallet application and brings the mobile user device within an NFC range of the payment terminal associated with the smart chip powered acceptance point 114. The user makes a first tap at 1205. The user, in this example, taps on the UI associated with initiating a payment process when prompted by the wallet application associated with the issuer and/or the vending application associated with the merchant. The user negotiates a service request at 1206. The user negotiates for the service by using one or more controls on the vending machine to select one or more item(s) and/or service(s). The vending machine displays the transaction amount (e.g., amount due) for the selected item(s) and/or service(s). As used herein, the term service request includes a request to purchase or rent one or more items, as well as a request for an automated service provided in whole or in part by the IoT device.

The smart chip powered acceptance point 1202 persists the service request and generates a service ID and/or hmac associated with the transaction at 1208. In this example, the IoT device is in offline mode, therefore, the transaction data, including terminal ID, random amount, service ID and/or hmac is transmitted to the mobile user device via a short-range communication channel, such as, but not limited to, the short-range communication channel 120 in FIG. 1.

The mobile user device 104 generates a cryptogram based on the transaction data received from the smart chip powered acceptance point at 1202. The mobile user device 104 sends the transaction data at 122. The transaction data is sent to the cloud POS 204 for utilization in the EMV transaction between the issuer 126 and the acquirer 206. The transaction data is routed to the acquirer's endpoint for use in the EMV transaction at 1214. The payment transaction is processed as a digital e-commerce transaction at 1216. If the transaction is completed, an approve message is sent back to the cloud POS at 1218. The approve message is sent with input from the acceptance point 1202, including the terminal ID, random amount, service ID and/or service hmac.

The smart chip server generates a signed receipt. The signed receipt is sent at 1220 to the mobile user device 104. The mobile user device 104 forwards the signed receipt at 1222 to the smart chip powered acceptance point 1202. The smart chip powered acceptance point validates the signature at 1224. If the receipt is validated, the vending machine starts the requested service at 1226. The requested service can include vending an item from a vending machine or other IoT device and/or initiating an automated service. Vending an item can include dispensing a physical item, printing a ticket, releasing and/or unlocking a door or panel to grant a user access to the contents of a container, unlocking a micro-mobility device, or any other automated action which enables a user to access an item or service associated with the IoT device. The item vended can include a purchased or rented item. In some non-limiting examples, initiating a service can include starting a car charging service, starting an automated car wash, playing music, unlocking a door or turnstile to permit entry into a facility, unlocking a locker door, providing a code to unlock a door or locker, raising a barrier or arm to permit entry of a vehicle into a parking garage, unlocking a rental bicycle, or any other type of service. FIG. 12 is an exemplary process flow chart 1200 illustrating operation of the digital payment acceptance system utilizing a smart chip powered acceptance point to accept a digital wallet payment transaction.

Some online devices have connectivity using 4G to connect directly to the merchant. In an absence of connectivity, the user mobile device may be used to create a secure communications channel through consumer device. If a user wants to utilize the smart chip payment acceptance module to pay for services provided by an IoT device using a wallet application having merchant integration, the user, merchant, and issuer are onboarded onto the unlock service via an onboarding process. During the onboarding process, the parties register with the unlock service to unlock a bike or other IoT device to enable the user to access the device, utilize the device, or otherwise obtain goods or services from the IoT device.

Figure 13:
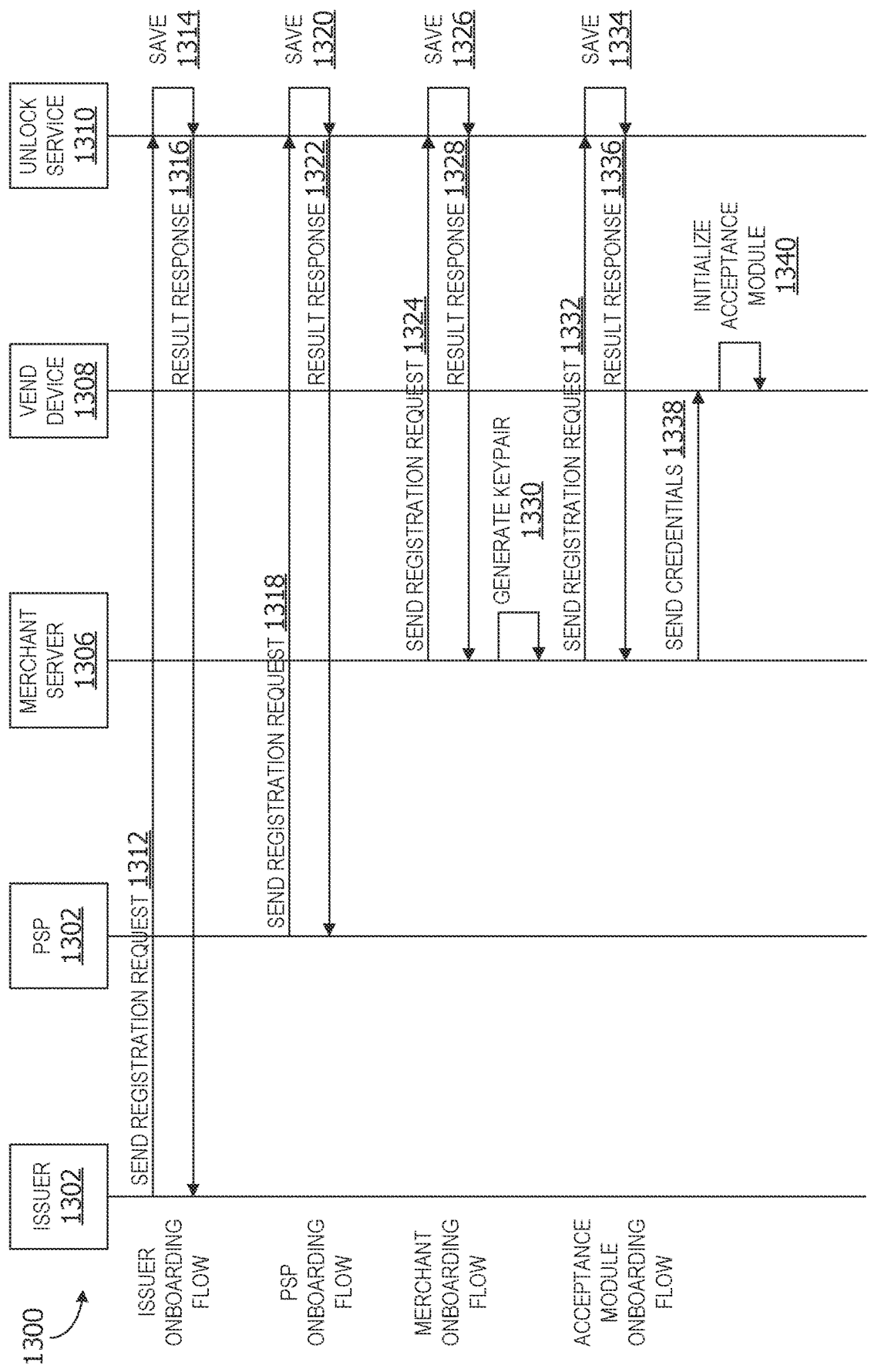
FIG. 13 is an exemplary process flow chart 1300 illustrating operation of an unlock service performing a contactless payment onboarding process.

Turning to FIG. 13, an exemplary process flow chart 1300 illustrating operation of an unlock service performing a contactless payment onboarding process is shown. During onboarding, an issuer 1302 associated with a user payment account sends a registration request 1312 to an unlock service 1310. In this example, the data passed with the request includes webhook URL. The unlock service 1310 is hosted on a server, such as a computing device or cloud server. In this example, the unlock service 1310 is hosted on a server, such as, but not limited to, the cloud server 904 in FIG. 9. The unlock server saves the issuer registration data 1314 and returns a response to the issuer 1316.

In other examples, the acquirer/PSP onboarding flow begins when the PSP 1304 sends a registration request 1318 to the unlock service 1310. In this example, the data passed includes webhook URL and PSP public key to encrypt DSRP transactions by the unlock service. The request is sent via a network, such as the Internet, a cellular network, or any other network. The unlock service 1310 saves the PSP registration data 1320. A response 1322 is returned to the PSP. In this example, the data passed in the response include the PSP ID (pspid). In some examples, the response indicates whether registration was successful. The response may also include registration data returned to the PSP in addition to the registration confirmation.

During onboarding, the merchant associated with a merchant server 1306 enrolls the smart chip acceptance device associated with the vend device 1308 and returns the public key to be stored securely within the vend device 1308. In this example, the merchant server 1306 sends a registration request 1324 to the unlock service 1310. The data passed includes the name, customer service contact, merchant public key to encrypt PII data by issuer, PSP IDs, user data required (userDataRequired [ ]), and/or the service URL. The unlock service 1310 saves the merchant registration data. The unlock service returns a response 1322.

In other examples, the acceptance module onboarding flow begins by the merchant server generating a keypair for the acceptance module 1330. The merchant server sends acceptance device registration request 1332 to the unlock service 1310. The data passed includes the device reference (deviceRef) and merchant device public key (optional). The unlock service generates smart chip credentials and saves the request data 1334. The unlock service returns the smart chip credentials to the merchant server 1336. The merchant server sends the smart chip credentials to the vend device 1308 to provision the vend device 1308. The smart chip acceptance module is initialized 1340.

In some examples, once the user completes user onboarding onto the unlock service, the user can register an account with the merchant via MDES token connect. Users are not required to install the merchant vending application. Everything can be done inside the issuer bank wallet application.

Figure 14:
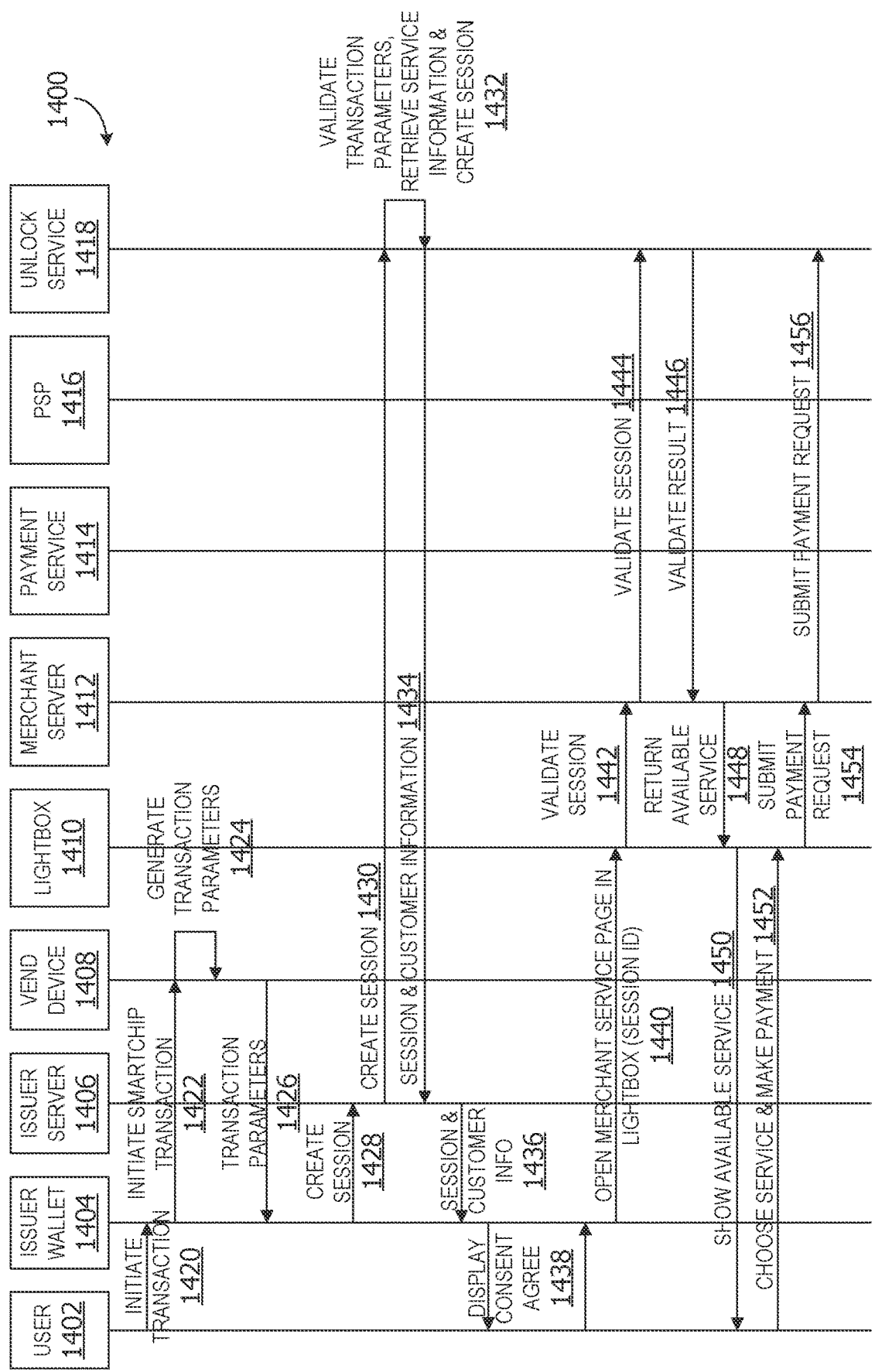
FIG. 14 is an exemplary process flow chart 1400 illustrating operation of the digital payment acceptance system utilizing a smart chip powered acceptance point and unlock service to unlock a vend device.

FIG. 14 is an exemplary process flow chart 1400 illustrating operation of the digital payment acceptance system utilizing a smart chip powered acceptance point and unlock service to unlock a vend device. In some examples, the user 1402 can open an issuer wallet 1404 and perform an NFC tap by bringing the user device near the vend device 1408 terminal to connect via UWB on the smart chip terminal. The wallet application uses the terminal ID to call the unlock service and create a payment session. The unlock service 1418 returns the session ID, as well as the merchant URI to be shown in light box within the issuer/wallet application. The URI only contains the session ID as reference to the payment session, which is validated by the merchant. Once the user/consumer has selected an item to be vended or service from the list of goods/services to consumer, the merchant shows a payment summary. On clicking checkout, the merchant calls the unlock service to initiate a DSRP credential request from the issuer wallet application. The issuer wallet application 1404 performs CDCVM via biometrics and returns the credentials to the merchant/merchant's payment processor (non-PCI compliant merchant), which can be used to perform an authorization transaction in the payment network. If successful, the merchant can unlock their service for the customer.

In this example, the user 1402 initiates a transaction 1420 at the vend device 1408 by using the issuer wallet 1404. The issuer wallet 1404 initiates a smart chip transaction 1422. The data passed includes masked PAN. The vend device generates transaction parameters 1424. The vend device transmits the transaction parameters to the issuer wallet. The parameters include unencrypted smart chip ID and merchant public key. The encrypted parameters includes nonce, transaction counter, and masked PAN. The vend device encrypts the data with the provisioned unlock public key provided during the onboarding, as shown in FIG. 13 above.

The issuer wallet creates a session with the issuer server using the transaction parameters 1430. The issuer server 1406 creates a session with the transaction parameters and consumer information 1434. The consumer information is encrypted with unlockPublicKey. The unlock service validates the transaction parameters, decrypts the consumer data payload, generates the consumer ID, encrypts the consumer data payload using the merchant public key, retrieves service information, and creates the session 1432.

In this example, the issuer server 1406 sends session information to the issuer server 1406. The session information data passed includes the session ID and merchant information, such as name and service URL. The issuer server sends the session information 1436 to the issuer wallet. The issuer wallet displays data share consent screen to the user 1438. If the user agrees to data share, the issuer wallet opens the merchant service page in lightbox (popup) using the session ID 1440.

In some examples, the merchant webpage is presented within the lightbox in the online scenario. If the device is offline, the merchant webpage is not available in the lightbox. Instead, the transaction can be completed using the merchant vending application downloaded onto the mobile user device.

In this example, the merchant server 1412 unlock service lightbox validates the session 1444. The unlock service validates the result, consumer ID and consumer information 1446. The merchant server 1412 returns available services 1448 to the lightbox 1410. The data passed includes the smart chip ID, consumer ID and consumer information encrypted with the merchant public key. The lightbox is the popup window associated with the issuer wallet linking to merchant webpage information associated with the vend device 1408. The lightbox shows available services 1450 and options via the user device of the user 1402. The services and other information may be displayed on a UI or other display. The user chooses a service and makes payment 1452. The lightbox submits payment request 1454. The data passed includes the session ID, PSP ID, amount, currency code, and country code of the merchant. The merchant server submits payment request 1456 to the unlock service 1418.

Figure 15:
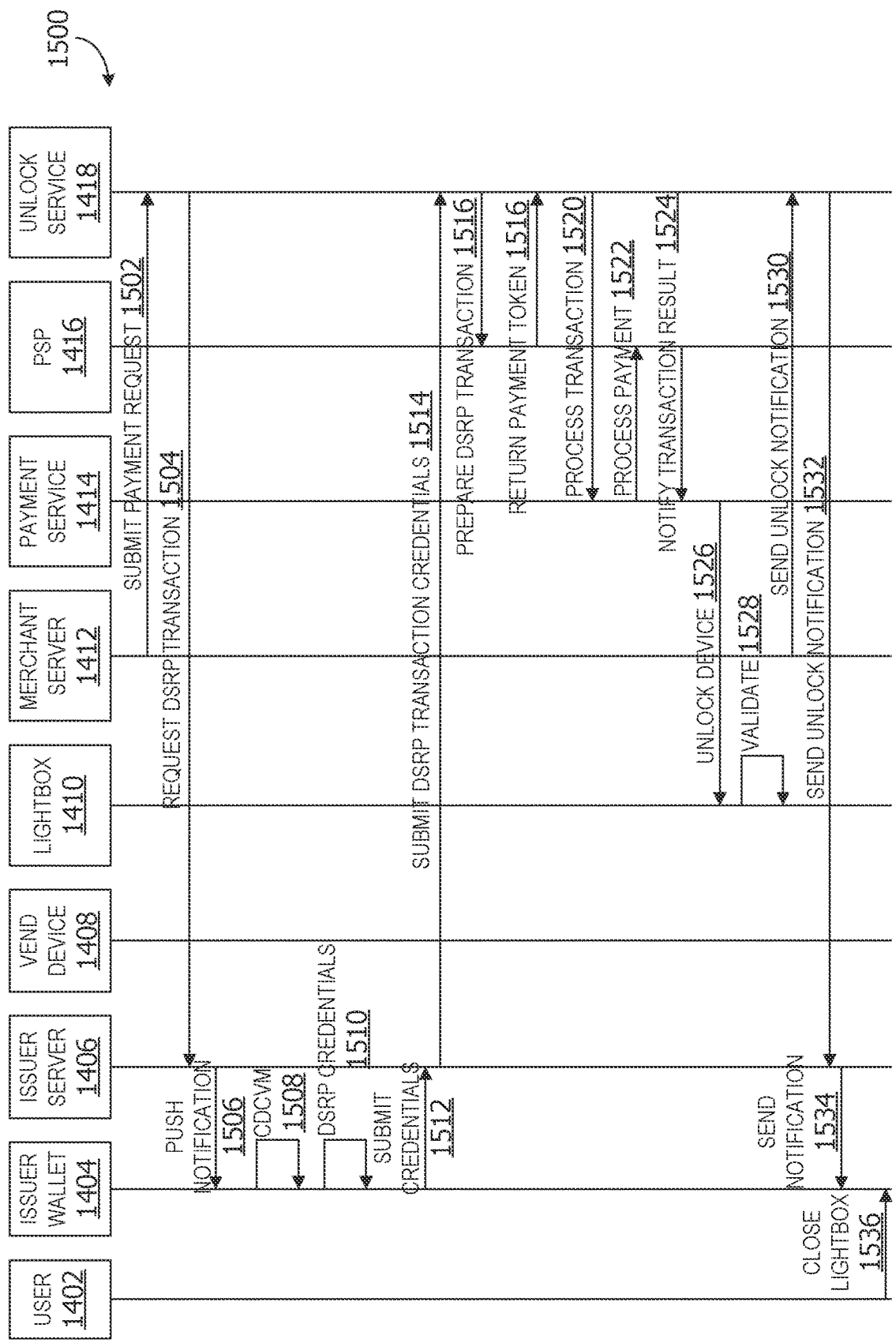
FIG. 15 is an exemplary process flow chart 1500 illustrating operation of the digital payment acceptance system utilizing a smart chip powered acceptance point and unlock service to complete unlocking of a vend device.

FIG. 15 is an exemplary process flow chart 1500 illustrating operation of the digital payment acceptance system utilizing a smart chip powered acceptance point and unlock service to complete unlocking of a vend device. In this example, the unlock service 1418 receives a submit payment request 1502 from a merchant server 1412. The unlock service sends a DSRP transaction request 1504 to the issuer server 1406. The data passed includes the session ID, amount, currency code, and country code. The issuer server 1406 performs a push notification 1506 to the issuer wallet 1404. The issuer wallet performs CDCVM 1508 to verify the user and generates DSRP transaction credentials 1510. The issuer wallet submits the credentials 1512 to the issuer server 1406. The DSPR transaction credentials data passed includes the cryptogram type, expiration date, PAN, PAN sequence number, transaction ID, and transaction cryptogram data. The issuer server submits the DSRP transaction credentials 1514 to the unlock service 1418. The data passed includes the session ID, DSRP transaction credentials. The DSRP transaction credentials are encrypted with the unlock public key.

In this example, the unlock service 1418 prepares the DSRP transactions 1516. The data passed includes cryptogram type, expiration date, PAN, PAN sequence number, transaction ID, and transaction cryptogram data. The data is encrypted with the PSP public key. The unlock service receives a return low-value payment token 1518 from the PSP 1416. The transaction is processed with the low-value token 1520. The data passed includes the session ID, the low value token and the unlock code. The payment service processes the payment 1522.

A transaction result notification 1524 is sent to the merchant server. The merchant server 1412 unlocks the vend device 1408. The data passed includes the BAU unlock data, unlock code, transaction counter, nonce, and unlock public key. The unlock code is signed and encrypted with a private key. The vend device 1408 validates the unlock code 1528. The unlocked notification is sent 1530 to the unlock service. The unlock service sends the unlock notification 1532 to the issuer server. The issuer server 1406 sends the unlocked notification to the issuer wallet 1404. The user 1402 closes the lightbox 1536.

Figure 16:
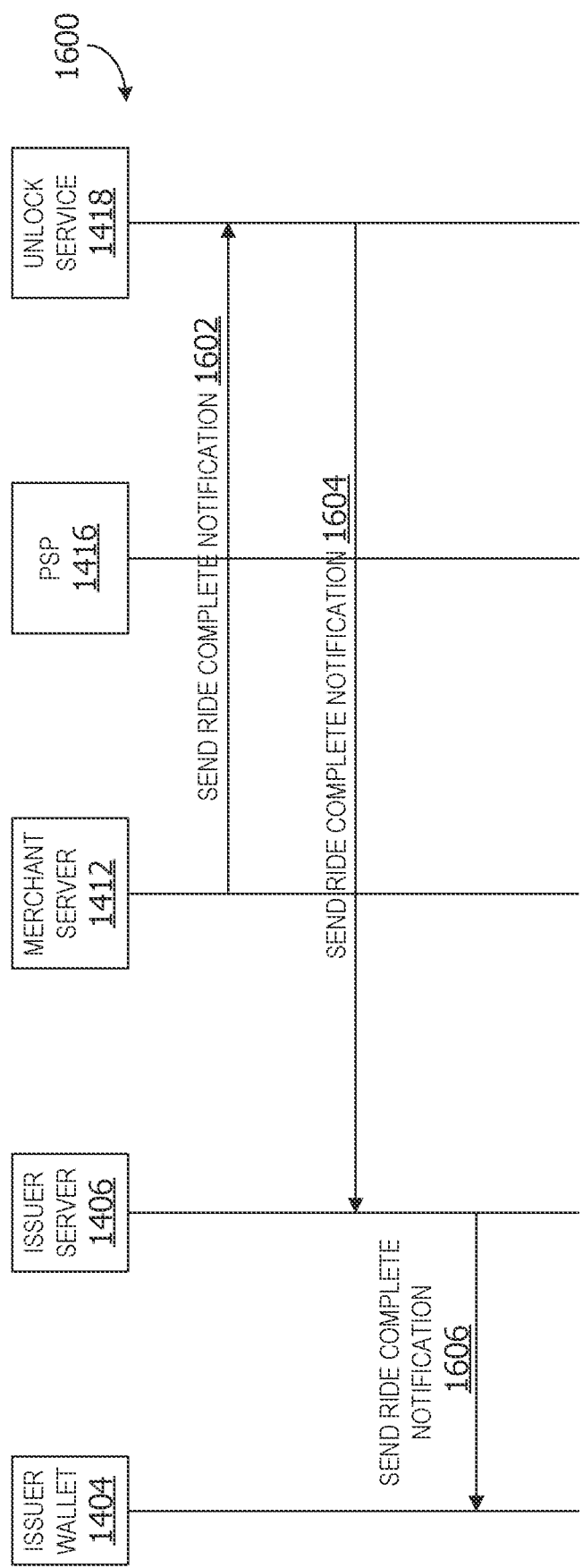
FIG. 16 is an exemplary process flow chart 1600 illustrating operation of an unlock service completing a transaction associated with a vend device.

FIG. 16 is an exemplary process flow chart 1600 illustrating operation of an unlock service completing a transaction associated with a vend device. In this example, a merchant server 1412 sends a ride complete notification 1602 to the unlock service when the user returns a rental bicycle to the merchant or merchant vend device. The data passed includes a session ID, final amount, and trip information URL. The unlock service 1418 sends the ride complete notification 1604 to the issuer server 1406. The issuer server sends the ride complete notification 1606 to the issuer wallet 1404.

Figure 17:
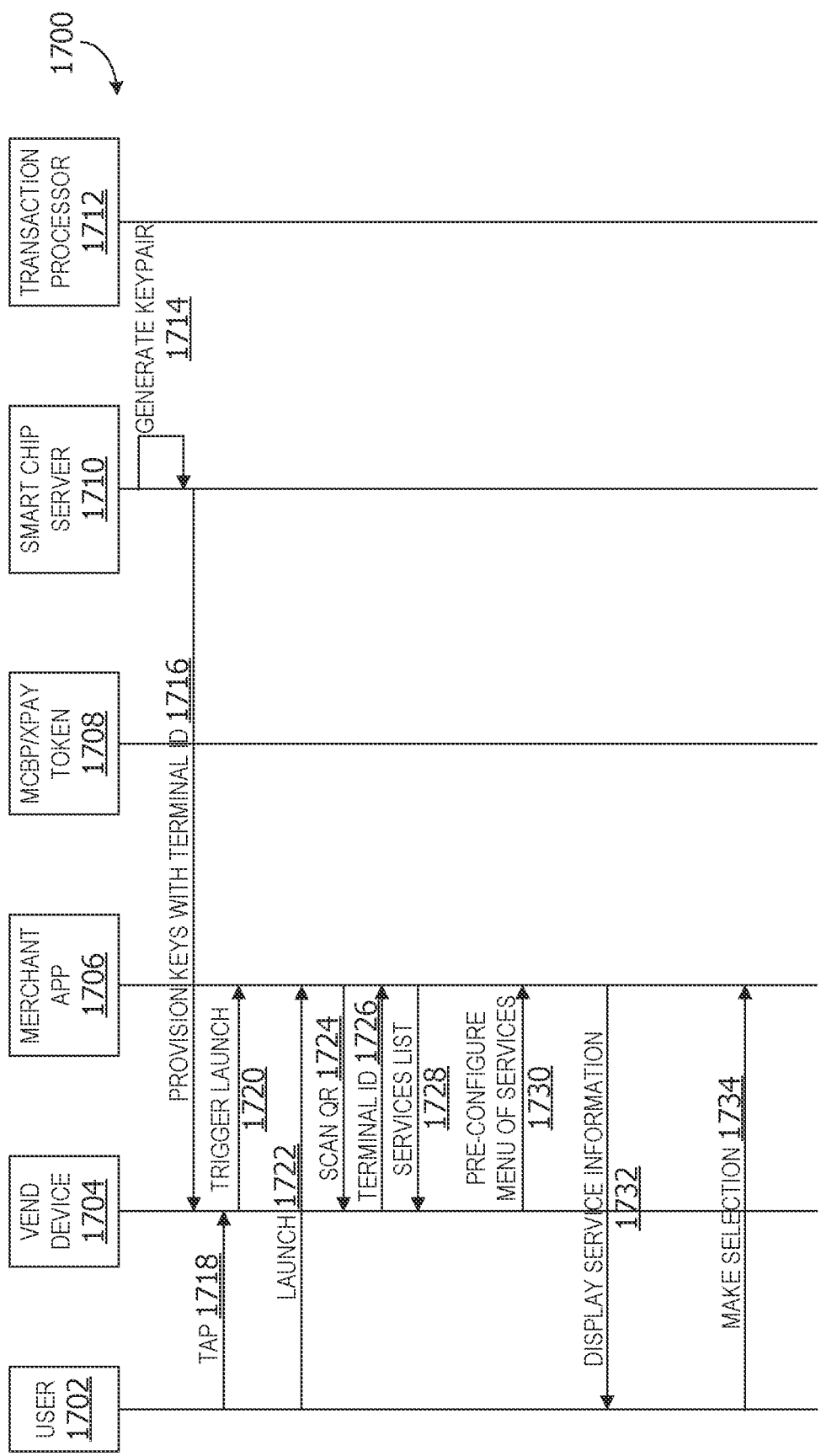
FIG. 17 is an exemplary process flow chart 1700 illustrating operation of a smart chip powered vend device discovery and service selection.

FIG. 17 is an exemplary process flow chart 1700 illustrating operation of a smart chip powered vend device discovery and service selection. In this example, the smart chip server 1710 generates a kay pair 1714. The keypair includes a public key and private key. The smart chip server provisions keys with a terminal ID to the vend device 1704. The user 1702 performs an NFC tap 1718 to initiate service selection at the vend device. The low-cost acceptance device with smart chip at the vend device acceptance point triggers launch by NFC tag containing the terminal ID 1720. The user launches 1722 the service via the user device. The vend device 1704 scans a QR code 1724 to obtain the terminal ID 1726. The merchant vending application 1706 provides a services list 1728 to the vend device 1704. The vend device returns pre-configured menu of services 1730 to the merchant vending application. The merchant vending application displays service information and optionally the price 1732 via a UI on the user device. The user 1702 makes a selection 1734.

Figure 18:
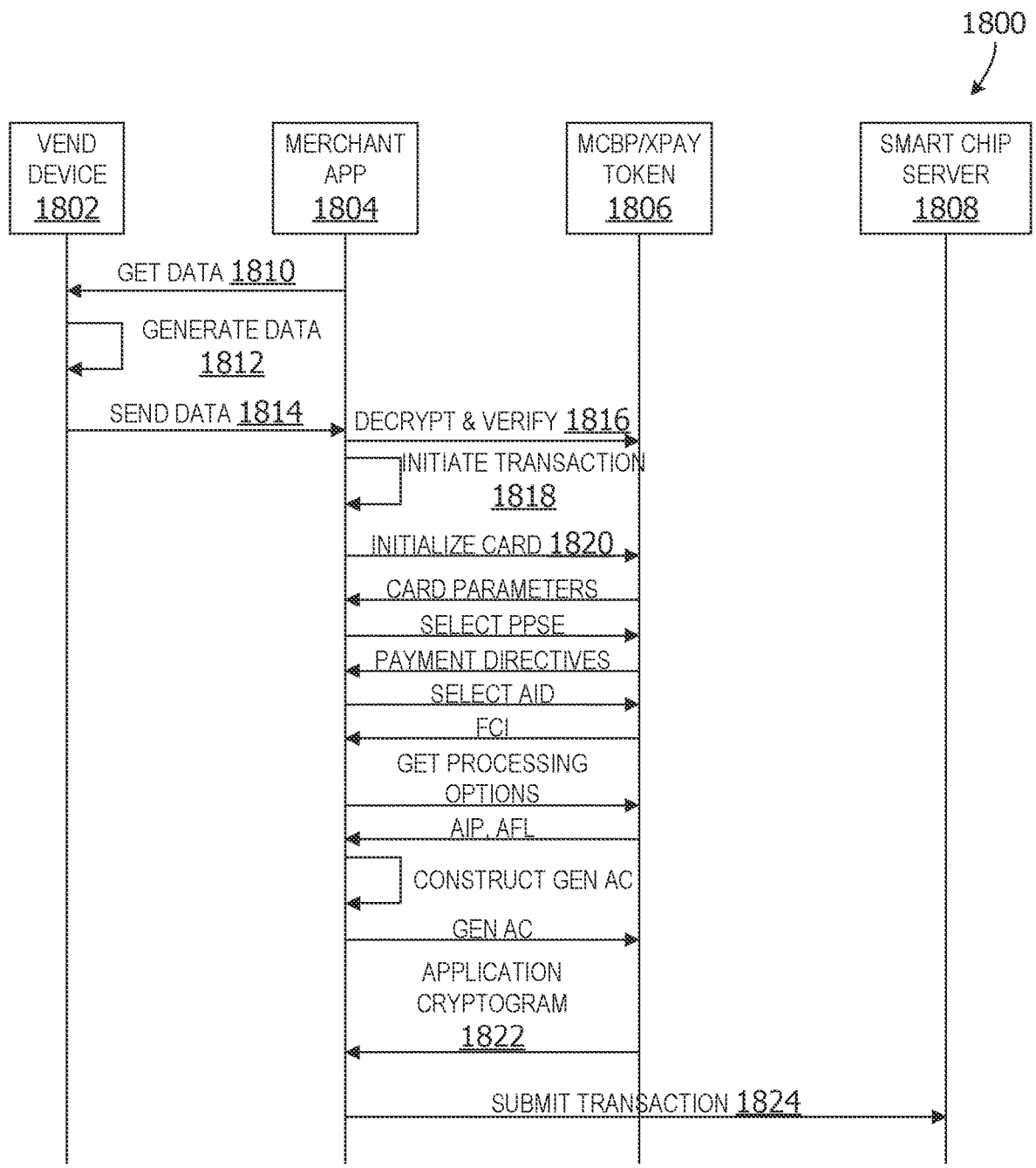
FIG. 18 is an exemplary process flow chart 1800 illustrating operation of a smart chip powered vend device transaction initialization.

FIG. 18 is an exemplary process flow chart 1800 illustrating operation of a smart chip powered vend device transaction initialization. In this example, the merchant vending application gets transaction data for acquiring 1810 from the vend device 1802. The vend device 1802 generates data 1812. The data is terminal data for the virtual terminal. The vend device 1802 sends the data back in encrypted and signed format 1814. The merchant vending application 1804 decrypts and verifies terminal data 1816 and initiates a transaction using the terminal data 1818. The payment card is initialized 1820. The payment card parameters are returned, such as select PPSE, payment directories, and select AID, FCI (AID, PDOL). The MCBP 1806 gets processing options, AIP, and AFL. The GEN AC is constructed based on terminal data. An application cryptogram is sent to the merchant vending app 1822. The transaction is submitted using merchant and terminal ID 1824.

Figure 19:
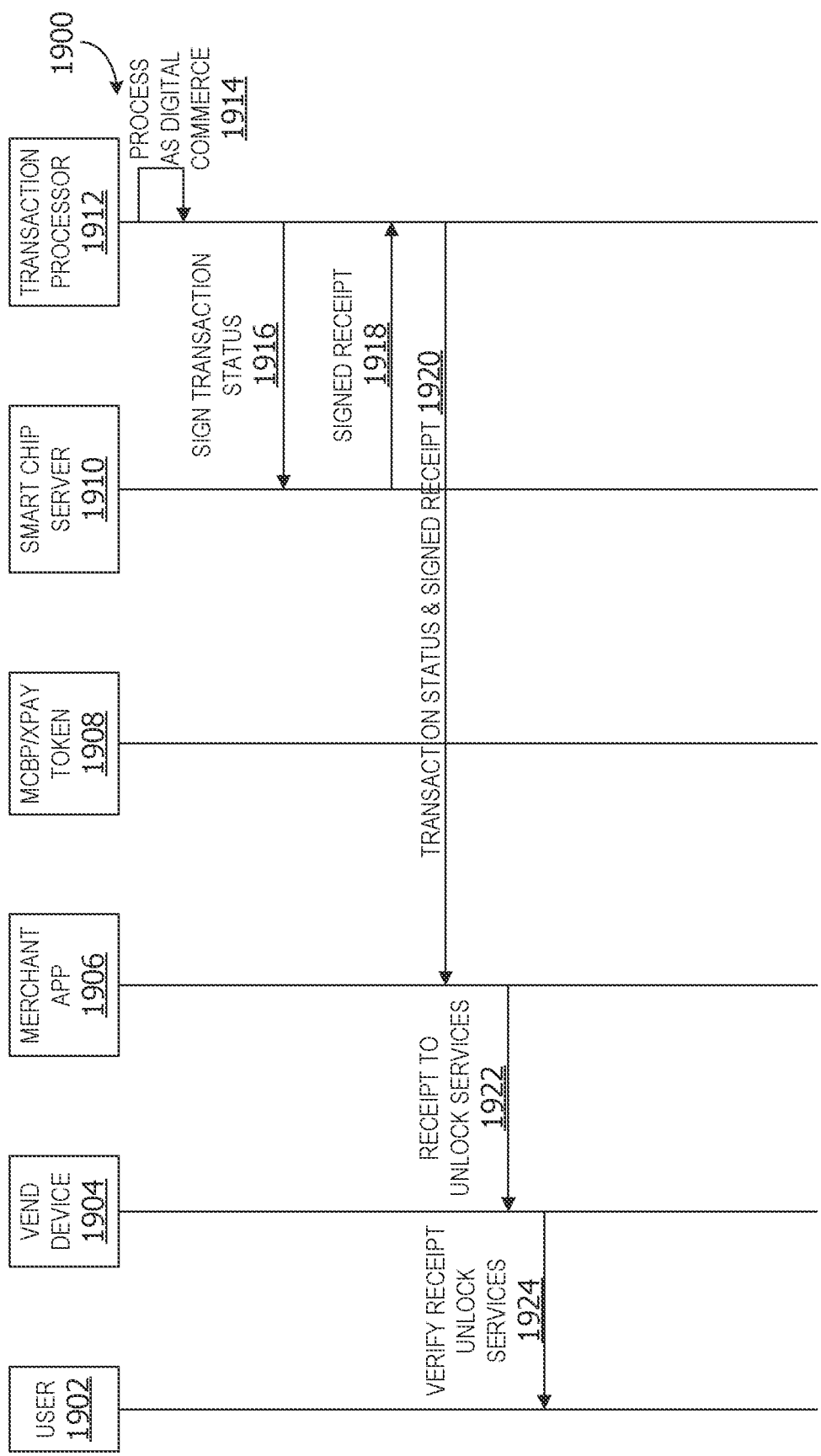
FIG. 19 is an exemplary process flow chart 1700 illustrating operation of a smart chip powered vend device transaction processing.

FIG. 19 is an exemplary process flow chart 1700 illustrating operation of a smart chip powered vend device transaction processing. In this example, the transaction processor 1912 performs transaction processing as digital commerce transaction 1914. The transaction processor signs transaction status 1916. The smart chip payment server 1910 sends the signed receipt to the transaction processor 1912. The transaction processor sends transaction status and signed receipt 1920 to the merchant vending application 1906. The receipt is sent 1922 to the vend device 1904. The vend device verifies receipt and unlock services 1924.

Figure 20:
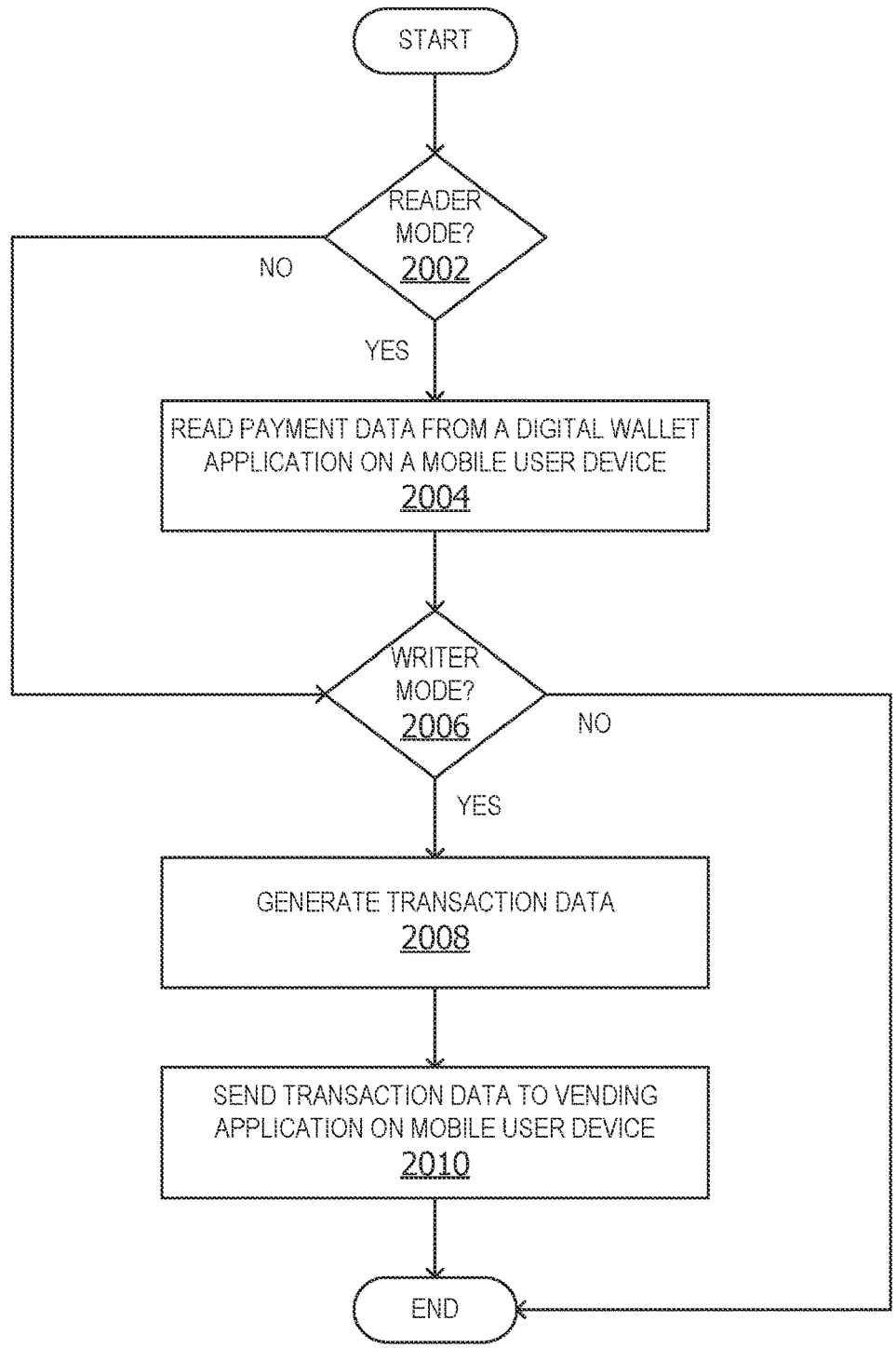
FIG. 20 is an exemplary flow chart 2000 illustrating operation of a smart chip payment acceptance module to operate in a reader mode or a writer mode.

FIG. 20 is an exemplary flow chart 2000 illustrating operation of a smart chip payment acceptance module able to operate in a reader mode or a writer mode. The smart chip payment acceptance module is a device including a smart chip, such as, but not limited to, the payment acceptance module 114 in FIG. 1.

If the payment acceptance module is in reader mode at 2002, the payment acceptance module reads payment data from a digital wallet application on a mobile user device at 2004. The mobile user device is a mobile computing device, such as, but not limited to, the mobile user device 104 in FIG. 1. The digital wallet application is an application associated with one or more payment cards or payment accounts, such as, but not limited to, the wallet application 202 shown in FIG. 2, FIG. 3, FIG. 6, and FIG. 7 above. The payment data is data including payment account information, such as, but not limited to, primary account number (PAN), expiration date, account holder information, issuer information, etc.

If the payment acceptance module is in writer mode at 2006, the payment acceptance module generates transaction data at 2008. The transaction data is data associated with a given transaction, such as, but not limited to, transaction amount, POS terminal ID, etc. The transaction data can include data, such as but without limitation, transaction data 714 in FIG. 7.

The payment acceptance module generates the transaction data at 2008. The transaction data is generated using the payment data obtained from the wallet application and data associated with the service request made by the user associated with the user device. The payment acceptance module sends the generated transaction data to the vending application on the mobile user device at 2010. The mobile user device is acting as a cloud-based POS terminal. The process terminates thereafter.

Figure 21:
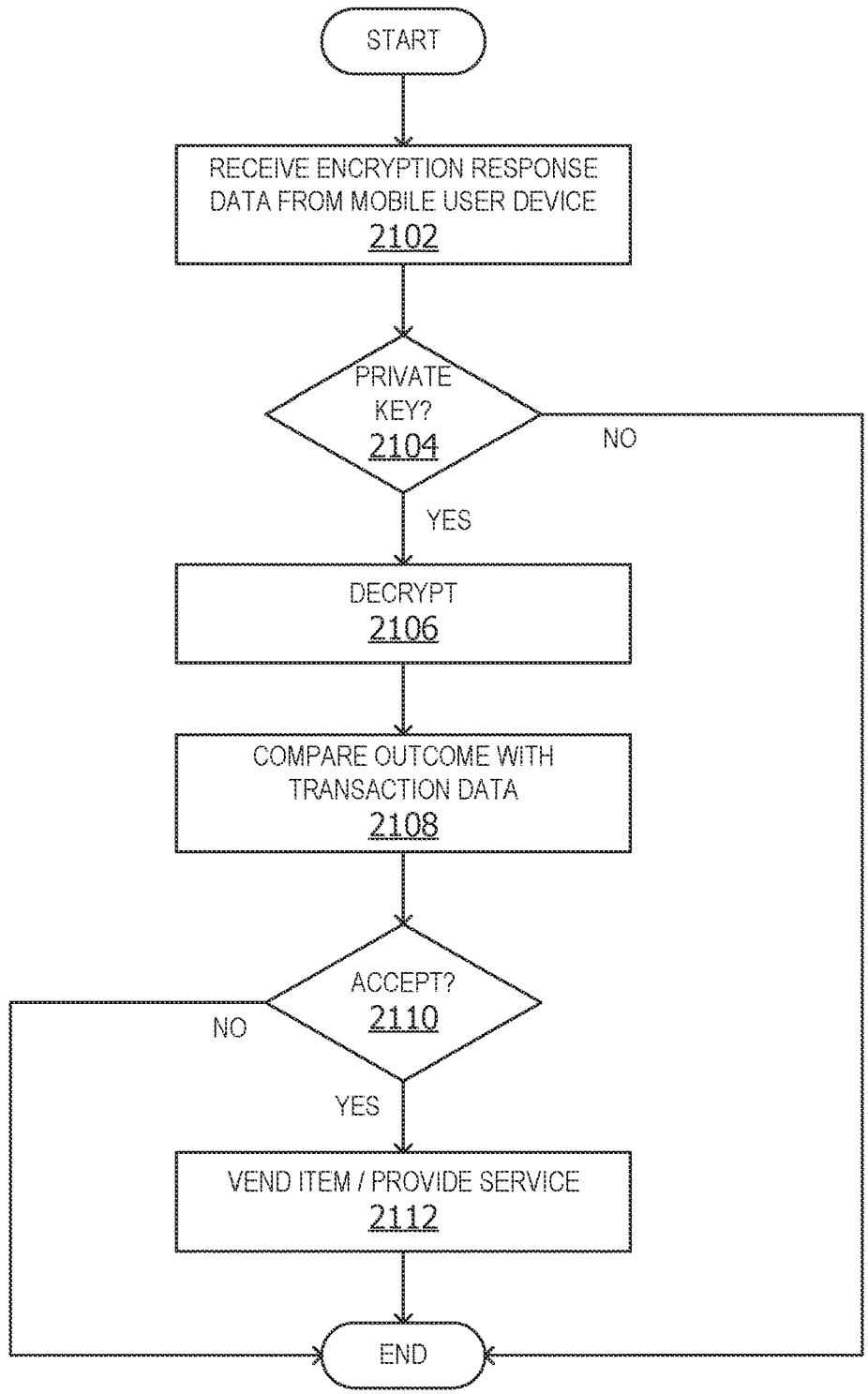
FIG. 21 is an exemplary flow chart 2100 illustrating operation of the smart chip payment acceptance module to determine whether to vend an item based on an encrypted response received from a smart chip server associated with a cloud POS.

Turning now to FIG. 21, an exemplary flow chart 2100 illustrating operation of the smart chip payment acceptance module to determine whether to vend an item based on an encrypted response received from a smart chip server associated with a cloud POS is shown. The process begins by receiving encrypted response data from a mobile user device at 2102. If the payment acceptance module has a corresponding private key at 2104, the payment acceptance module uses the key to decrypt the response data at 2106. The vend controller compares the outcome of the payment transaction obtained from the de-crypted response data with the previously generated transaction data at 2108. If the outcome indicates the transaction payment is accepted at 2110, the item is vended or the requested service is provided (e.g., initiated) at 2112. The process terminates thereafter.

In the example of FIG. 21, the vend controller compares the outcome with the transaction data to determine whether to vend the item. In other examples, the comparison is performed by the payment acceptance module.

Figure 22:
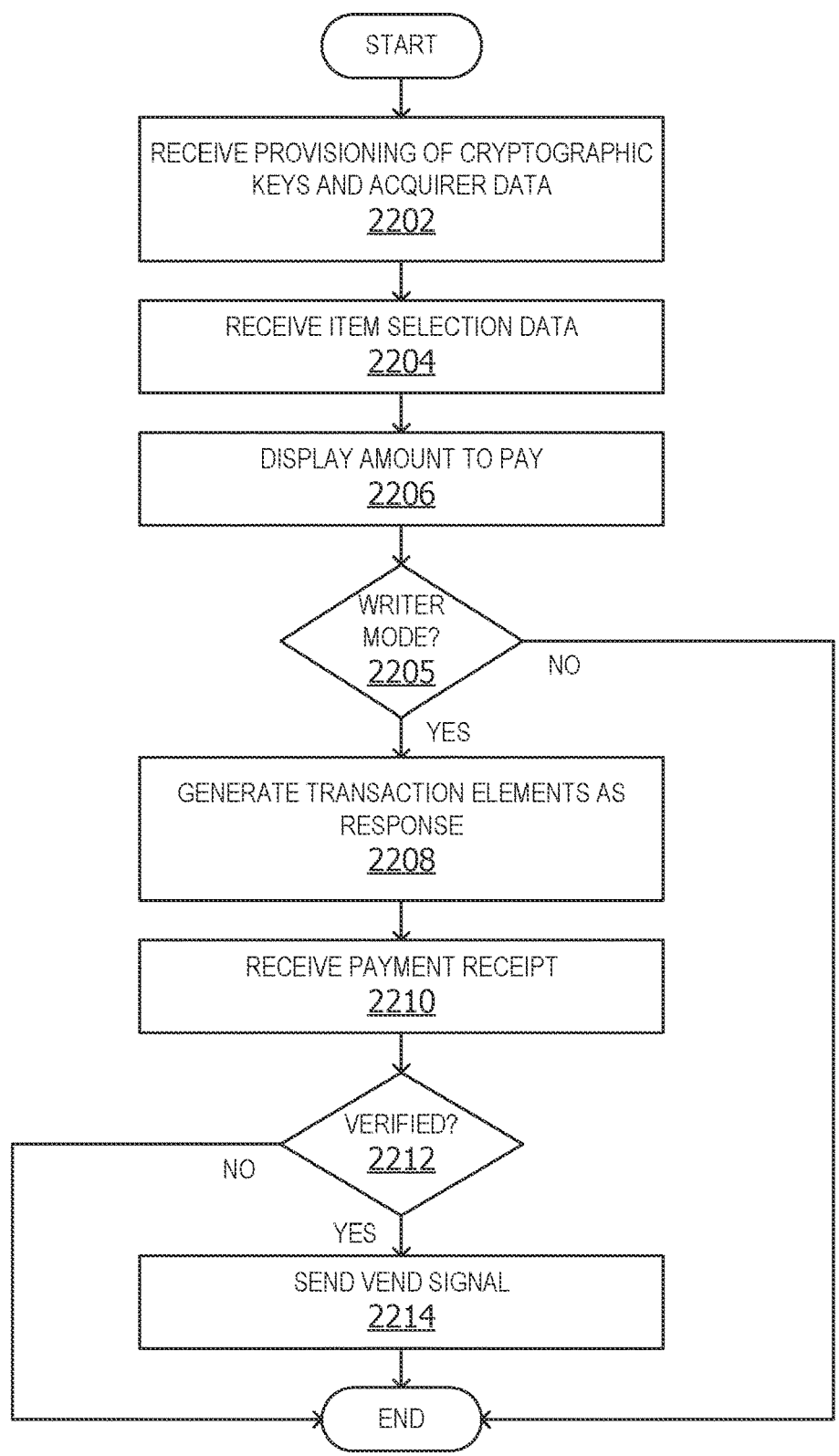
FIG. 22 is an exemplary flow chart 2200 illustrating operation of the IoT device and mobile user device acting as a cloud-based POS terminal during digital payment acceptance process.

FIG. 22 is an exemplary flow chart 2200 illustrating operation of the IoT device and mobile user device acting as a cloud-based POS terminal during digital payment acceptance process. The process begins by receiving provisioning of cryptographic keys and acquirer data at 2202. The item selection data is received from a set of controls on the vending machine. A display device on the vending machine displays an amount for the user to pay at 2206. A determination is made whether the payment acceptance module is in writer mode at 2205. The payment acceptance module is in writer mode where the mobile user device vending application is acting as a cloud-based POS terminal. If yes, the payment acceptance module generates transaction elements as a response at 2208. A payment receipt is received from the mobile user device at 2210. The smart chip server may encrypt the payment receipt. If so, the encrypted receipt is decrypted. The vend controller on the IoT device compares the receipt to the transaction data to determine if payment has been verified at 2212. If yes, the vend controller sends a vend signal to release the item or initiate the service requested by the user at 2214. The process terminates thereafter.

Figure 23:
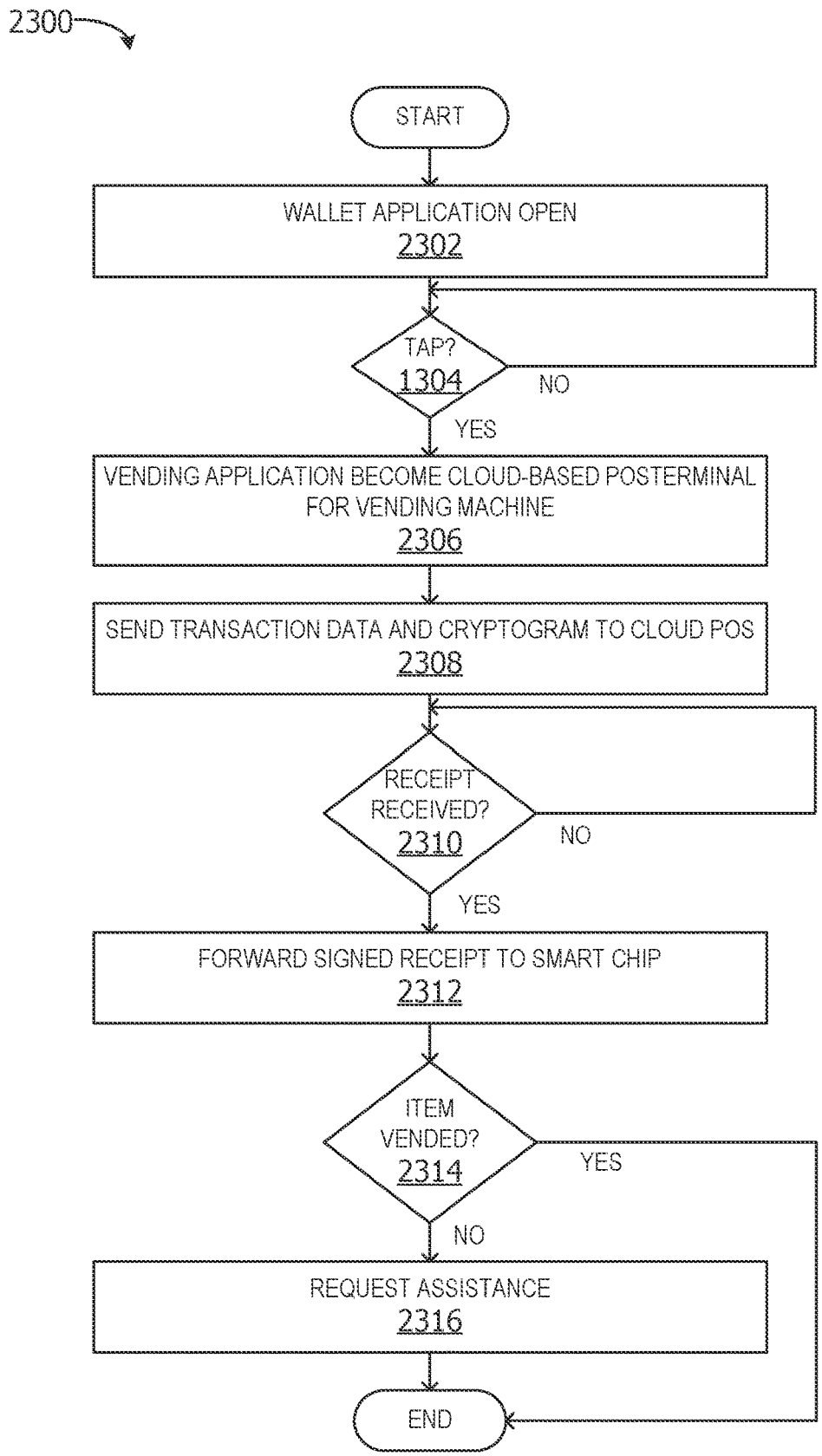
FIG. 23 is an exemplary flow chart 2300 illustrating operation of the mobile computing device communicatively coupled to the IoT device during cloud-based digital payment acceptance.

FIG. 23 is an exemplary flow chart 2300 illustrating operation of the mobile computing device communicatively coupled to the IoT device during cloud-based digital payment acceptance. The process begins with opening of a wallet application at 2302. If a user taps the appropriate area of the UI to make a digital payment using the wallet application at 2304, the vending application becomes a cloud-based POS terminal for the vending machine at 2306. Transaction data and a cryptogram is sent to the cloud POS from the mobile user device at 2308. If a receipt is received from the smart chip server at 2310, the signed receipt is forwarded to the smart chip on the vending machine at 2312. A determination is made whether the item is vended at 2314. If yes, the process terminates thereafter. If no, a request for customer assistance (RCA) can be made at 2316. The process terminates thereafter.

Figure 24:
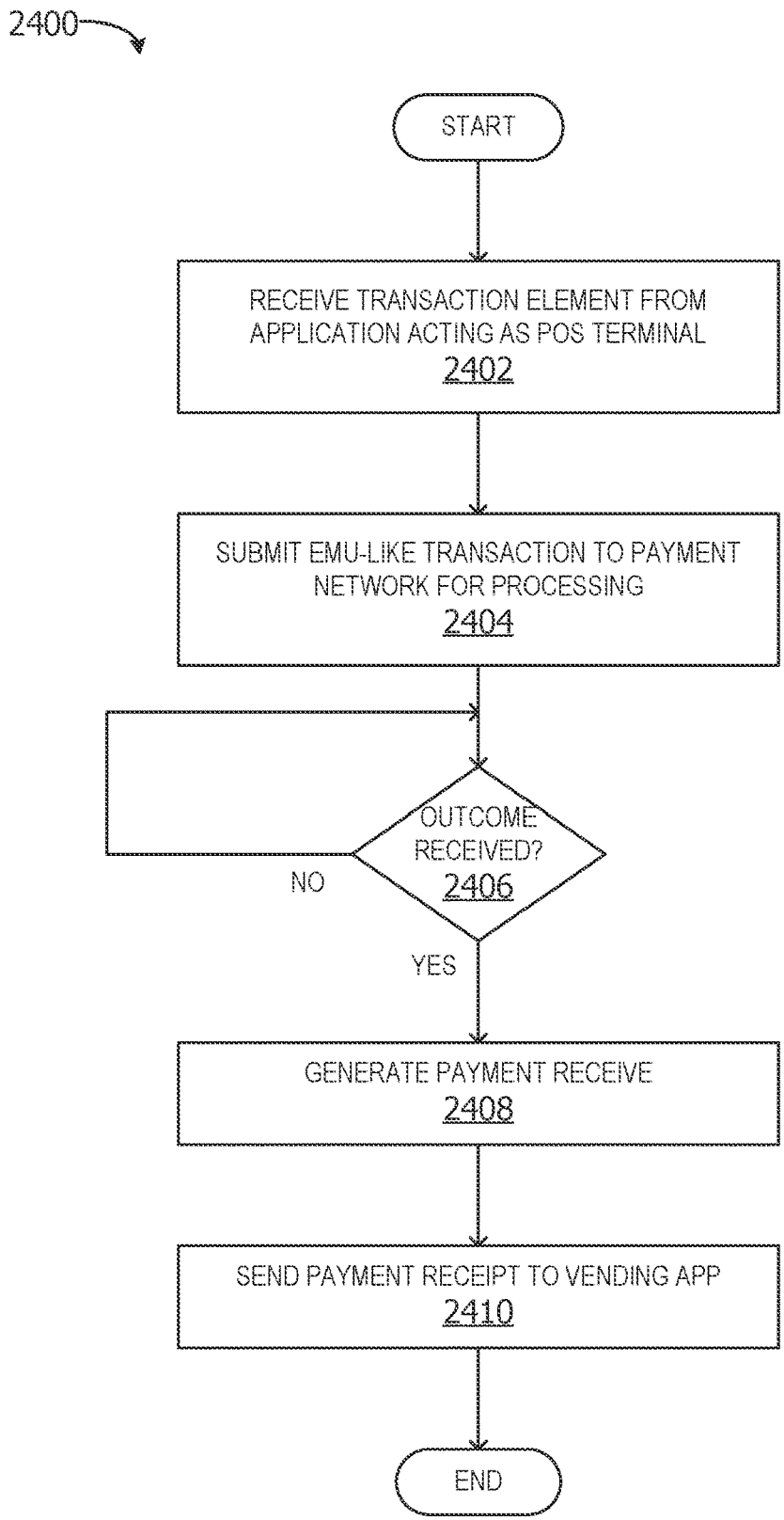
FIG. 24 is an exemplary flow chart 2400 illustrating operation of the cloud POS verifying digital payment transactions.

FIG. 24 is an exemplary flow chart 2400 illustrating operation of the cloud POS verifying digital payment transactions. Transaction elements are received from an application on the mobile user device acting as a cloud-based POS terminal at 2402. An EMV-like transaction is submitted to the payment network for processing at 2404. A determination is made whether an outcome is received at 2406. If yes, a payment receipt is generated by the smart chip server at 2408. The payment receipt is sent to the vending application on the mobile user device at 2410. The process terminates thereafter.

Figure 25:
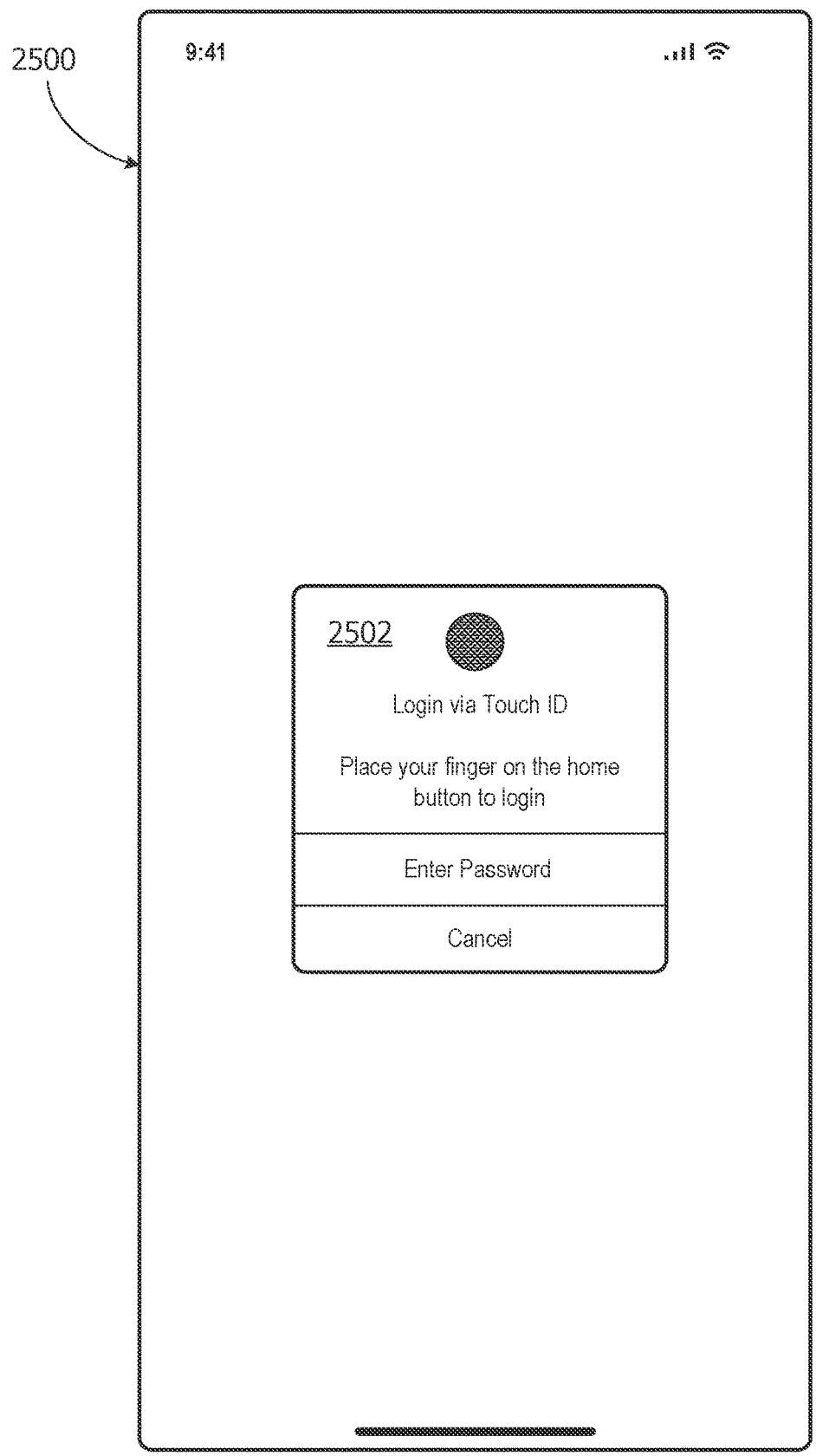
FIG. 25 is an exemplary UI 2500 associated with the mobile user device depicting a login screen.

FIG. 25 is an exemplary UI 2500 associated with the mobile user device depicting a login screen 2502. In this non-limiting example, the login screen 2502 associated with a wallet application and/or a vending application requests user login information and/or biometric information to authenticate a user.

Figure 26:
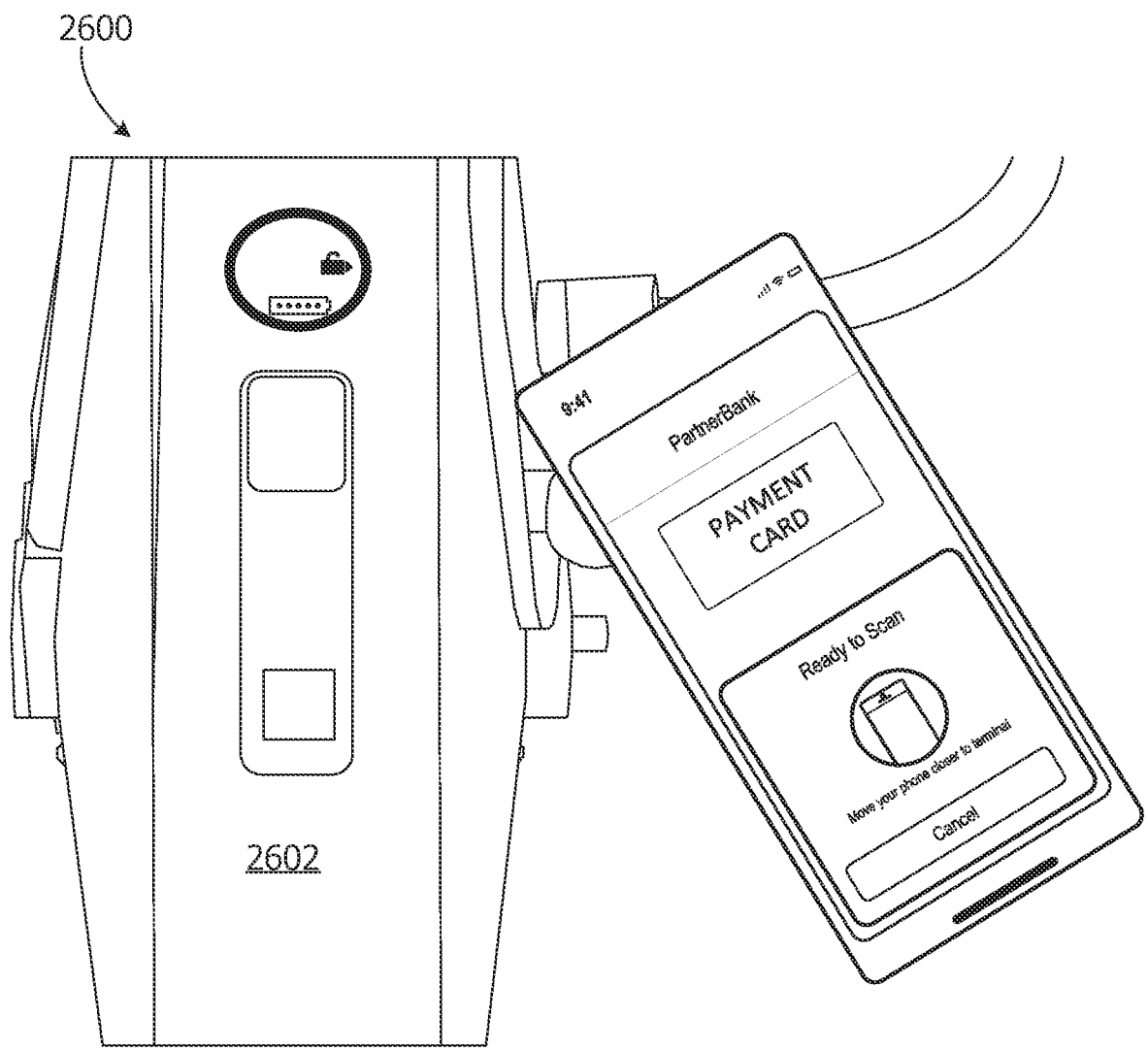
FIG. 26 is an exemplary UI 2600 associated with the mobile user device depicting an instruction to scan after a first NFC tap.

FIG. 26 is an exemplary UI 2600 associated with the mobile user device depicting an instruction to scan after a first NFC tap. After the user taps the vending application to initiate the cloud-based payment acceptance process, the UI indicates the mobile user device is ready to scan for transaction data from the IoT device (e.g., vending machine) 2602. The user can choose to cancel the payment transaction by pressing a "cancel" icon on the graphical user interface if desired.

Figure 27:
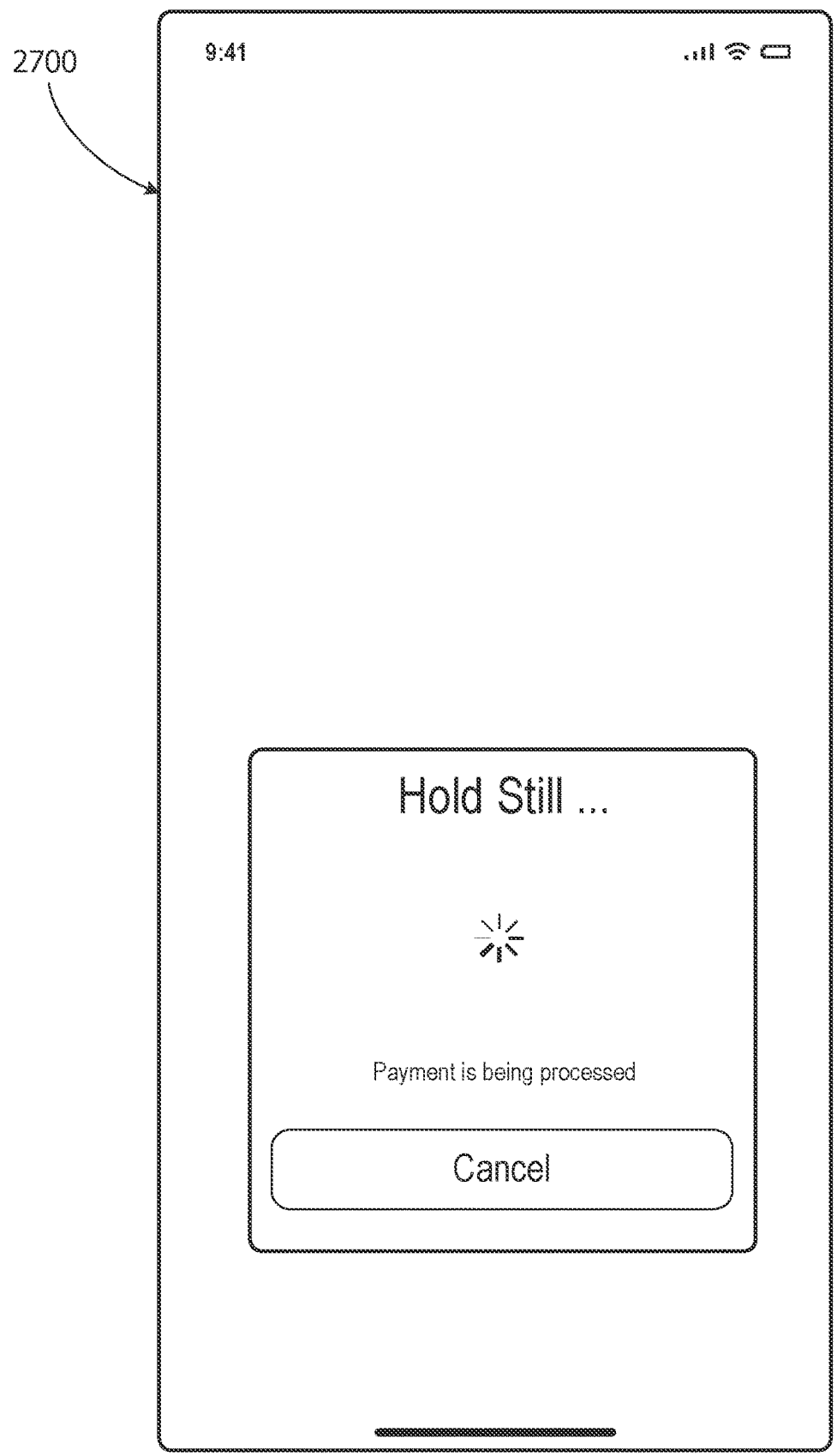
FIG. 27 is an exemplary UI 2700 associated with the mobile user device depicting an instruction to hold the mobile user device near the NFC device if the vending application needs more time.

FIG. 27 is an exemplary UI 2700 associated with the mobile user device depicting an instruction to hold the mobile user device near the NFC device if the vending application needs more time. In this example, the instruction to "hold still" indicates the system needs the user to hold the mobile user device near the NFC device for additional time while the cloud-based POS terminal is sending and/or receiving data from the IoT device and/or the smart chip server. In this non-limiting example, the user holds the mobile user device within proximity to the NFC device until the payment data is successfully transmitted to or from the mobile user device.

In an example, as the user holds the mobile device hosting the wallet application near the smart chip acceptance module, the wallet application communicates with the smart chip. The unlock service uses encryption keys and certificates obtained during onboarding to validate data it receives from the wallet application and the merchant. The unlock service creates a payment session for each particular transaction based on the credentials for each merchant and user. When the user opens the wallet application, in some examples, and taps an IoT device smart chip payment acceptance module, the wallet application automatically presents the merchant webpage within the wallet application or redirects the user to the merchant URL. The user utilizes the merchant webpage to select service options, such as, time, price, etc.

Figure 28:
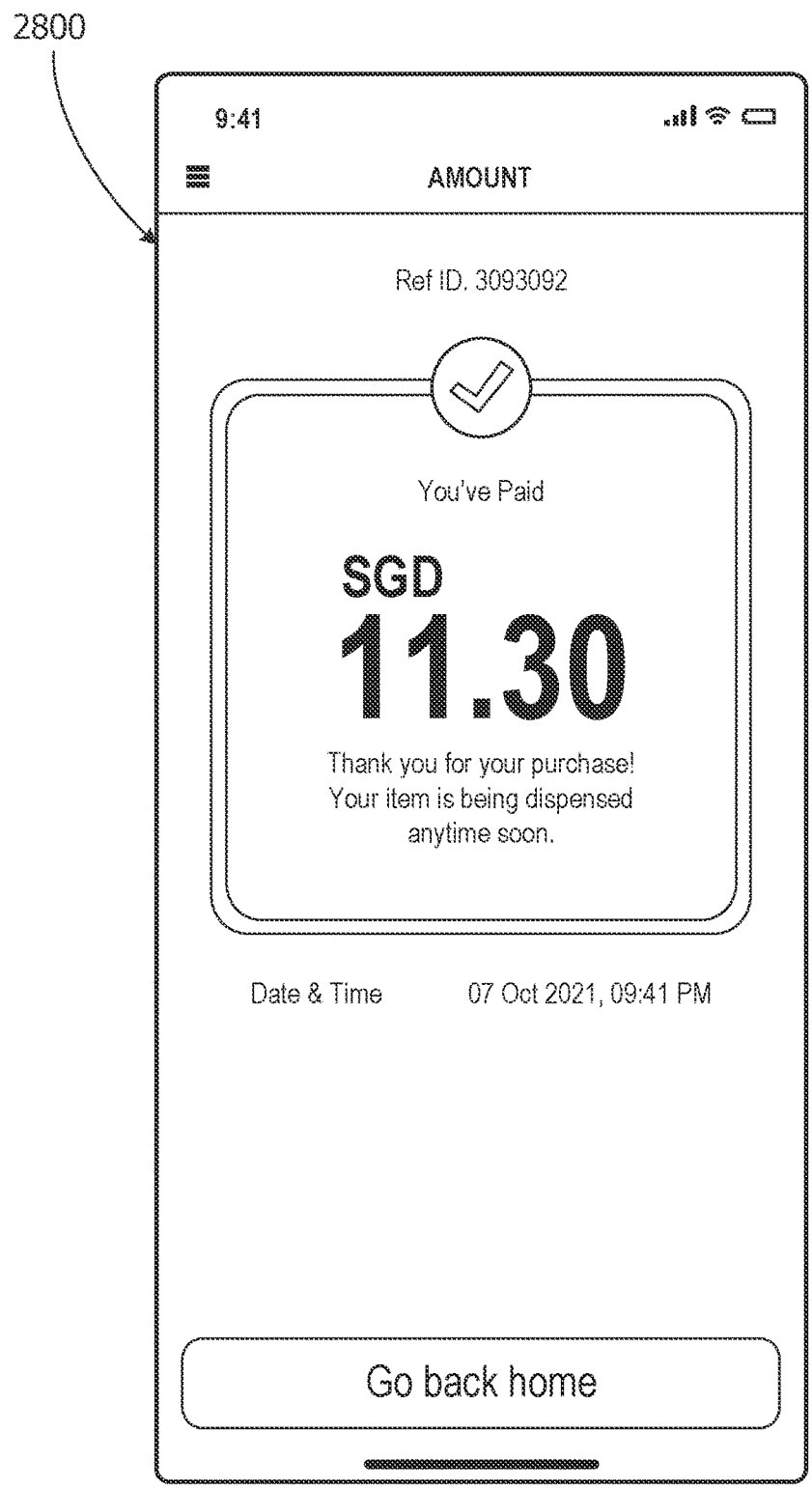
FIG. 28 is an exemplary UI 2800 associated with the mobile user device depicting a successful transaction notification.

FIG. 28 is an exemplary UI 2800 associated with the mobile user device depicting a successful transaction notification. In this non-limiting example, the UI message indicates successful payment transaction and payment acceptance by the system. After display of this message, the IoT device should proceed with dispensing the item and/or providing the requested service.

Figure 29:
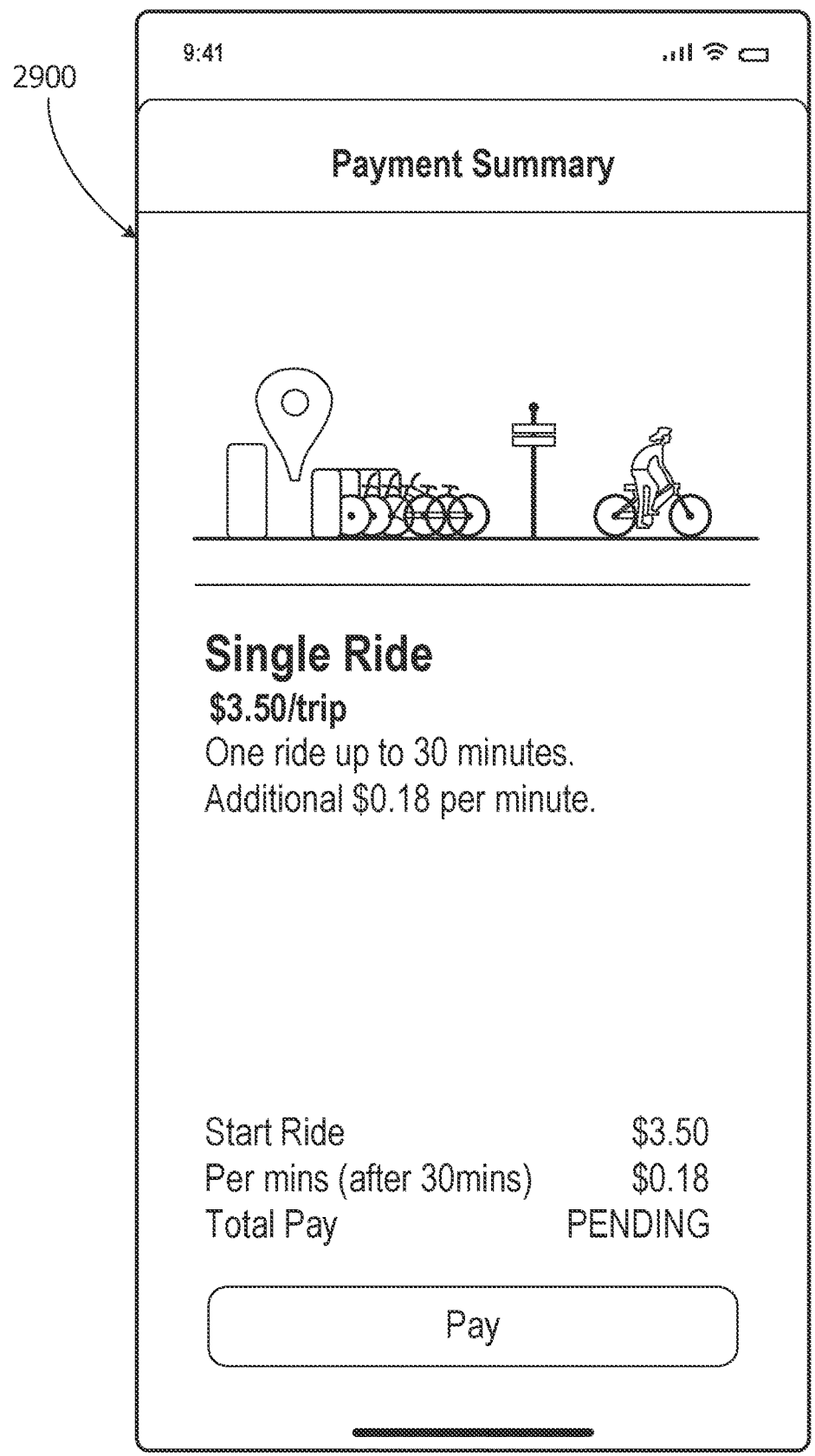
FIG. 29 is an exemplary UI 2900 associated with the mobile user device depicting a payment summary.

FIG. 29 is an exemplary UI 2900 associated with the mobile user device depicting a payment summary 2902. The payment summary 2902 can optionally include an amount to be paid, an identification of the item and/or requested service, as well as any other payment-related information. In this example, the user provides pre-authorization. The user authenticates and/or approves of the transaction prior to final authorization of payment.

Figure 30:
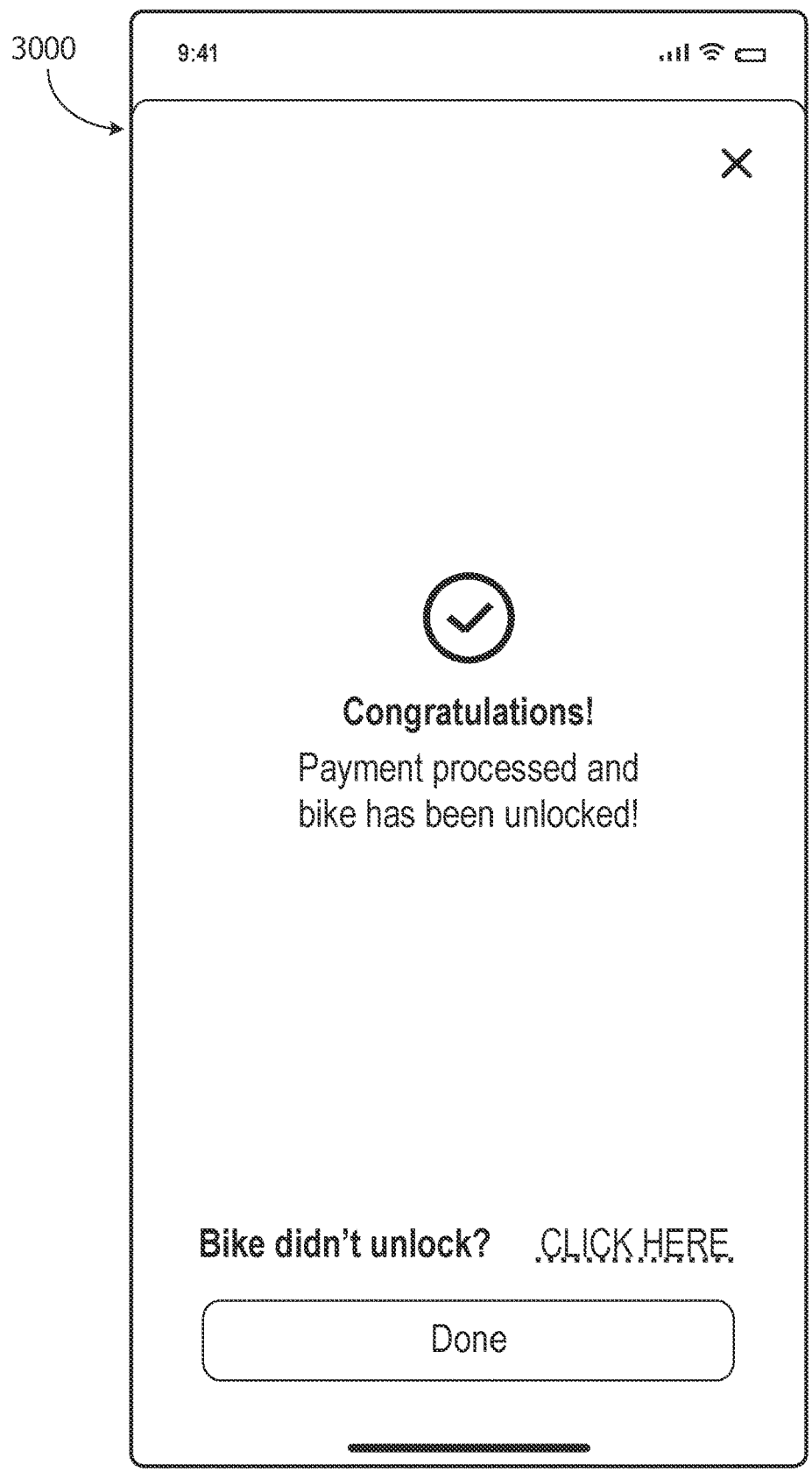
FIG. 30 is an exemplary UI 3000 associated with the mobile user device depicting a notification of successful digital payment processing and dispensing of the selected item.

FIG. 30 is an exemplary UI 3000 associated with the mobile user device depicting a notification of successful digital payment processing and dispensing of the selected item. In this non-limiting example, the notification indicates the requested item has been dispensed, unlocked, or otherwise made available to the user.

Figure 31:
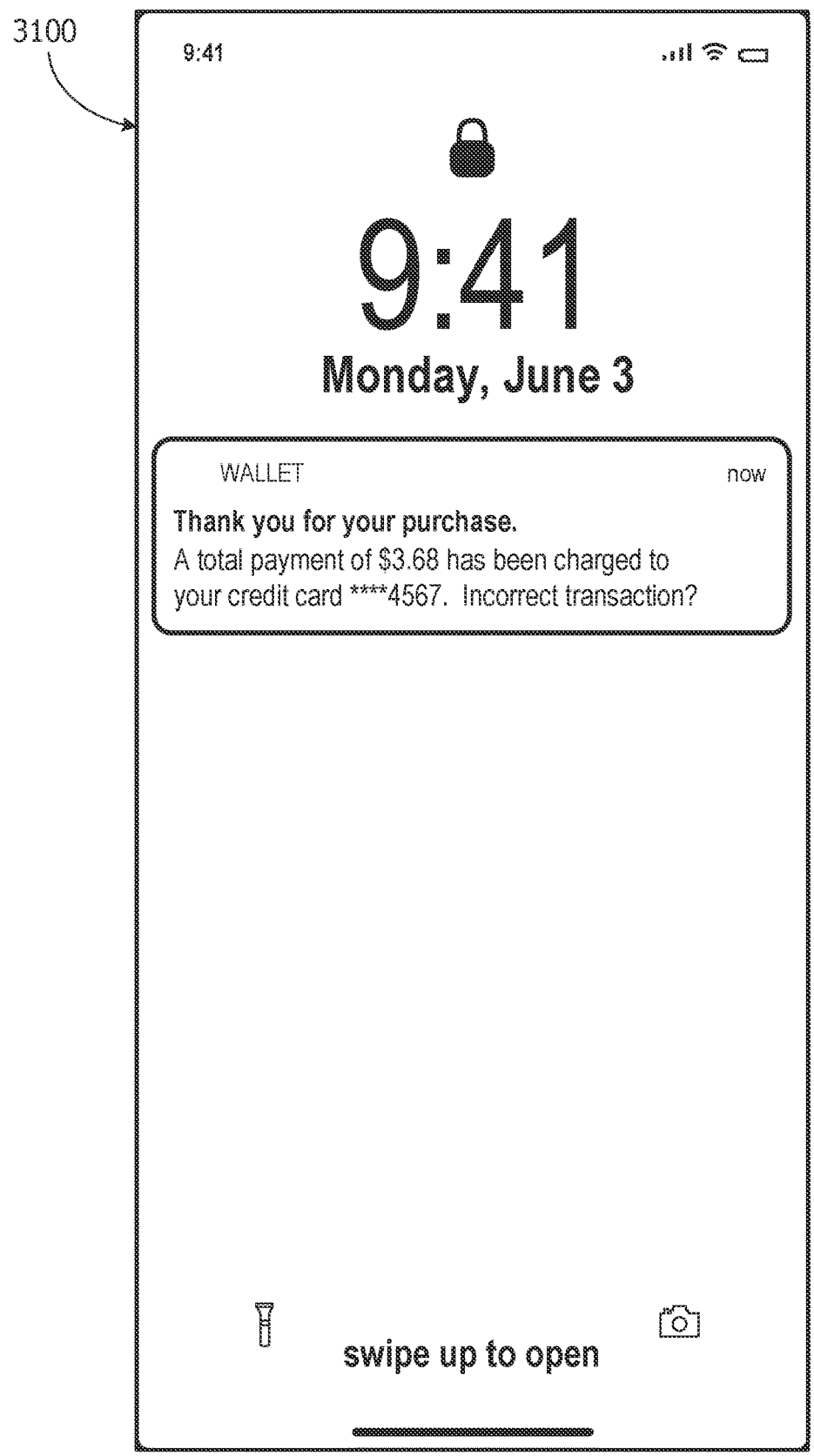
FIG. 31 is an exemplary UI 3100 associated with the mobile user device depicting final settlement on the wallet application.

FIG. 31 is an exemplary UI 3100 associated with the mobile user device depicting final settlement on the wallet application. The final settlement can include transaction related information, such as, but not limited to, time, date, item ID, total payment made, as well as any other additional information.

Figure 32:
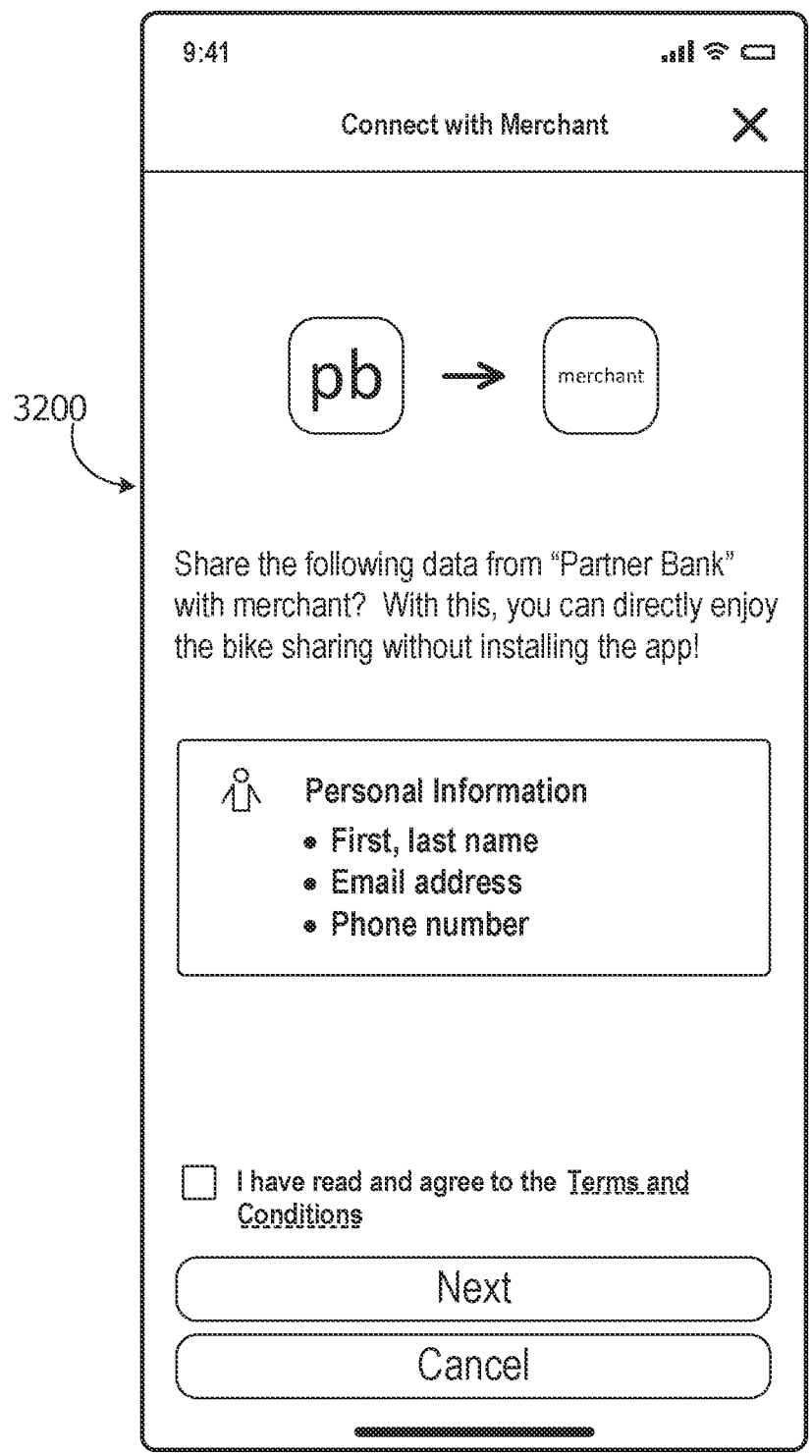
FIG. 32 is an exemplary UI 3200 associated with the mobile user device depicting a request for consent on sharing information with a merchant.

FIG. 32 is an exemplary UI 3200 associated with the mobile user device depicting a request for consent on sharing information with a merchant. In this example, the issuer (bank) requests consent from the user on sharing personal information with a merchant, such as, but not limited to, a merchant renting bicycles. In this example, the consent is only required the first time a user signs up for services from a new merchant.

Figure 33:
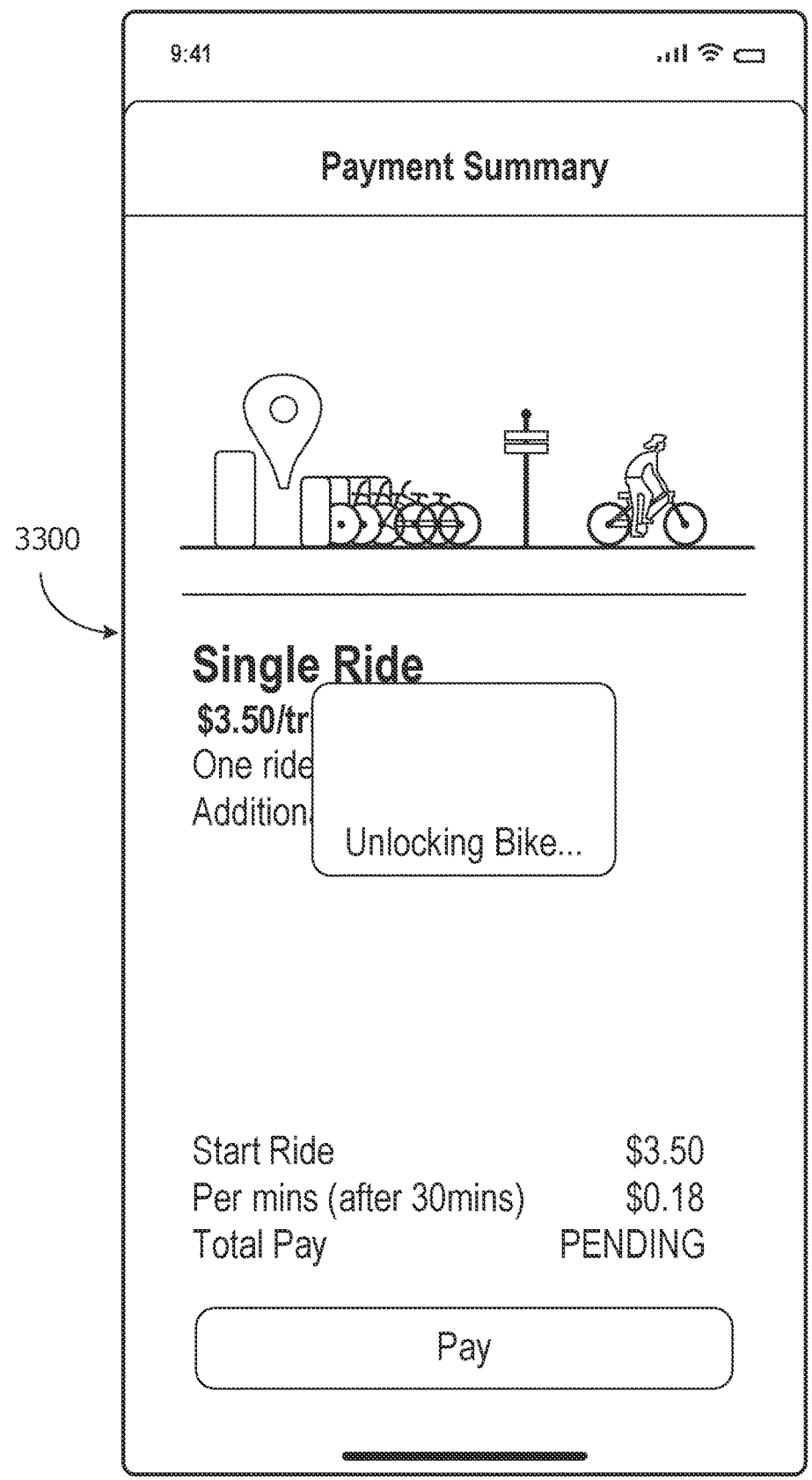
FIG. 33 is an exemplary UI 3300 associated with a mobile user device showing a payment summary and unlock notification.

FIG. 33 is an exemplary UI 3300 associated with a mobile user device showing a payment summary and unlock notification. In this example, after payment is successfully processed, the merchant server communicates directly with the bike to unlock it. No NFC/BLE is required in this process.

Figure 34:
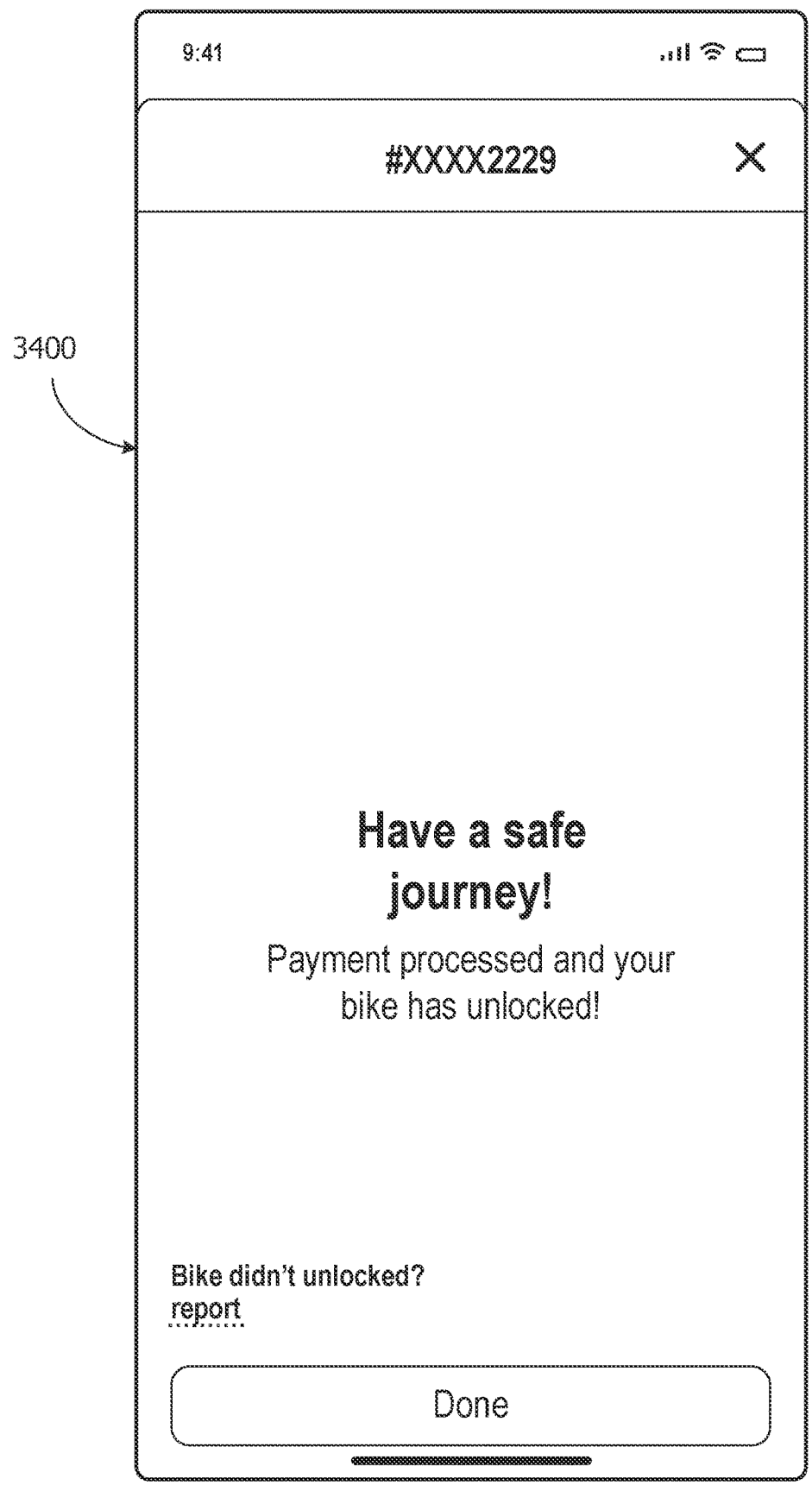
FIG. 34 is an exemplary UI 3400 associated with a mobile user device showing a success screen.

FIG. 34 is an exemplary UI 3400 associated with a mobile user device showing a success screen. The success screen is shown once the bike is unlocked. A report action is available if the bike fails to unlock. After the bike is unlocked, the user presses done to close the page and bring the user to the token connect registration. The user can register a merchant account via MDES token connect. With this feature, the user is not required to install the merchant vending application. The user can access the vending system to rent a bike or obtain other available services using the pop-up window to access the merchant webpage from inside the wallet application.

Figure 35:
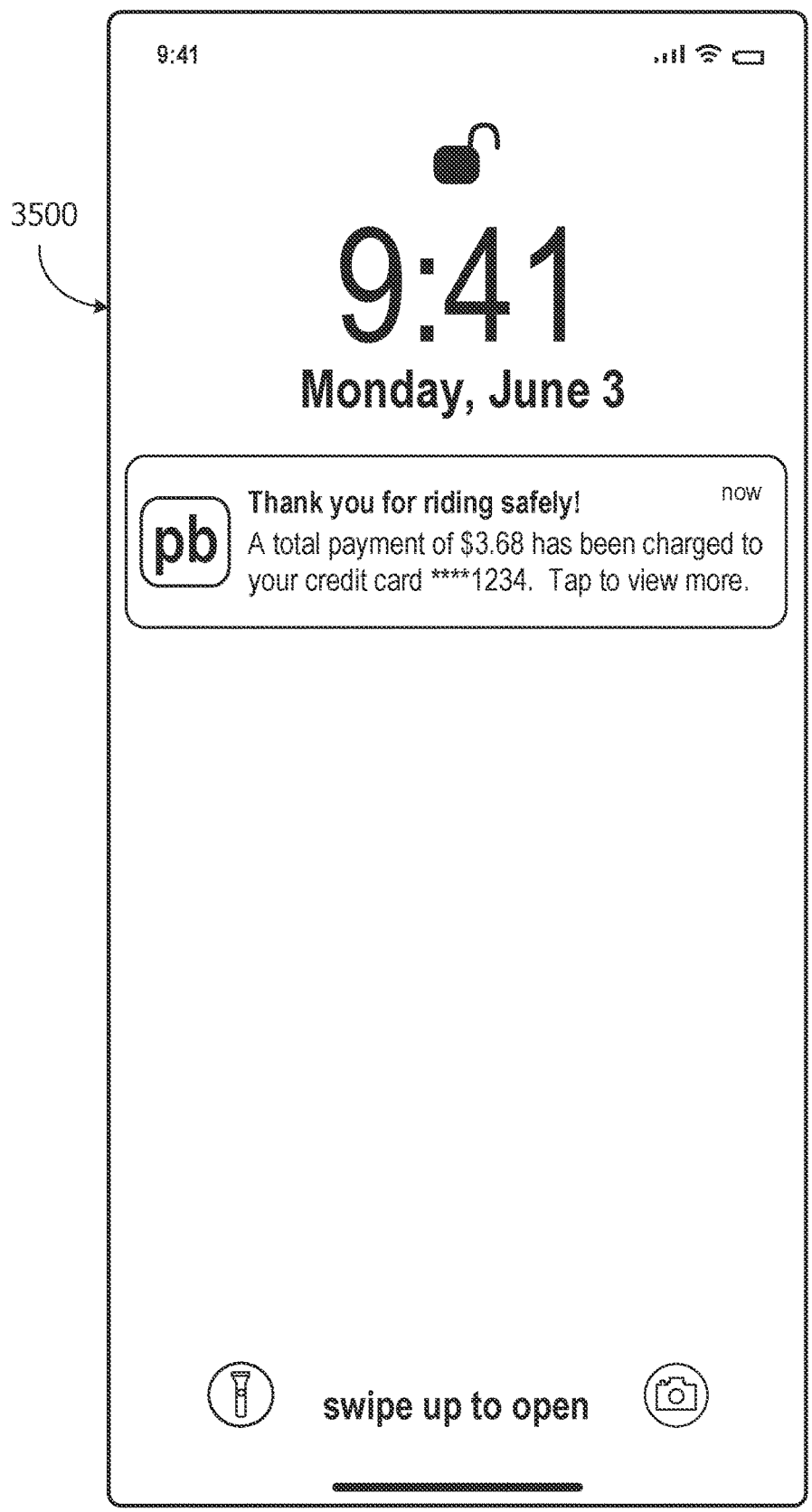
FIG. 35 is an exemplary UI 3500 associated with a mobile user device depicting another final settlement notification.

FIG. 35 is an exemplary UI 3500 associated with a mobile user device depicting another final settlement notification. In this example, tapping the notification shows the details of the transaction.

Figure 36:
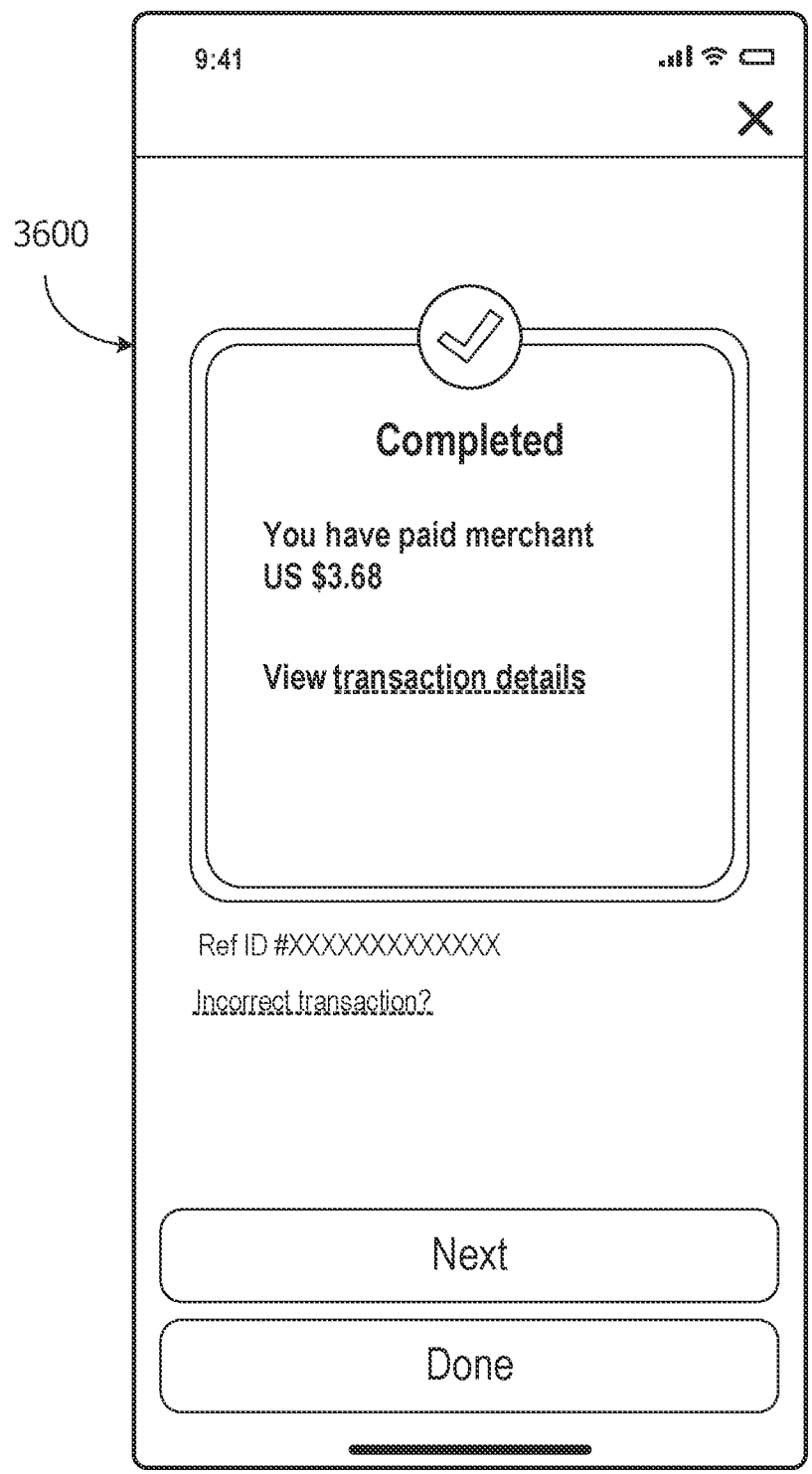
FIG. 36 is an exemplary UI 3600 associated with a mobile user device depicting a completed transaction screen is shown.

Turning to now FIG. 36, an exemplary UI 3600 associated with a mobile user device depicting a completed transaction screen is shown. If the user chooses "next" after viewing the transaction details inside the wallet application, the user is provided an entry point to register a merchant account inside the wallet application.

Figure 37:
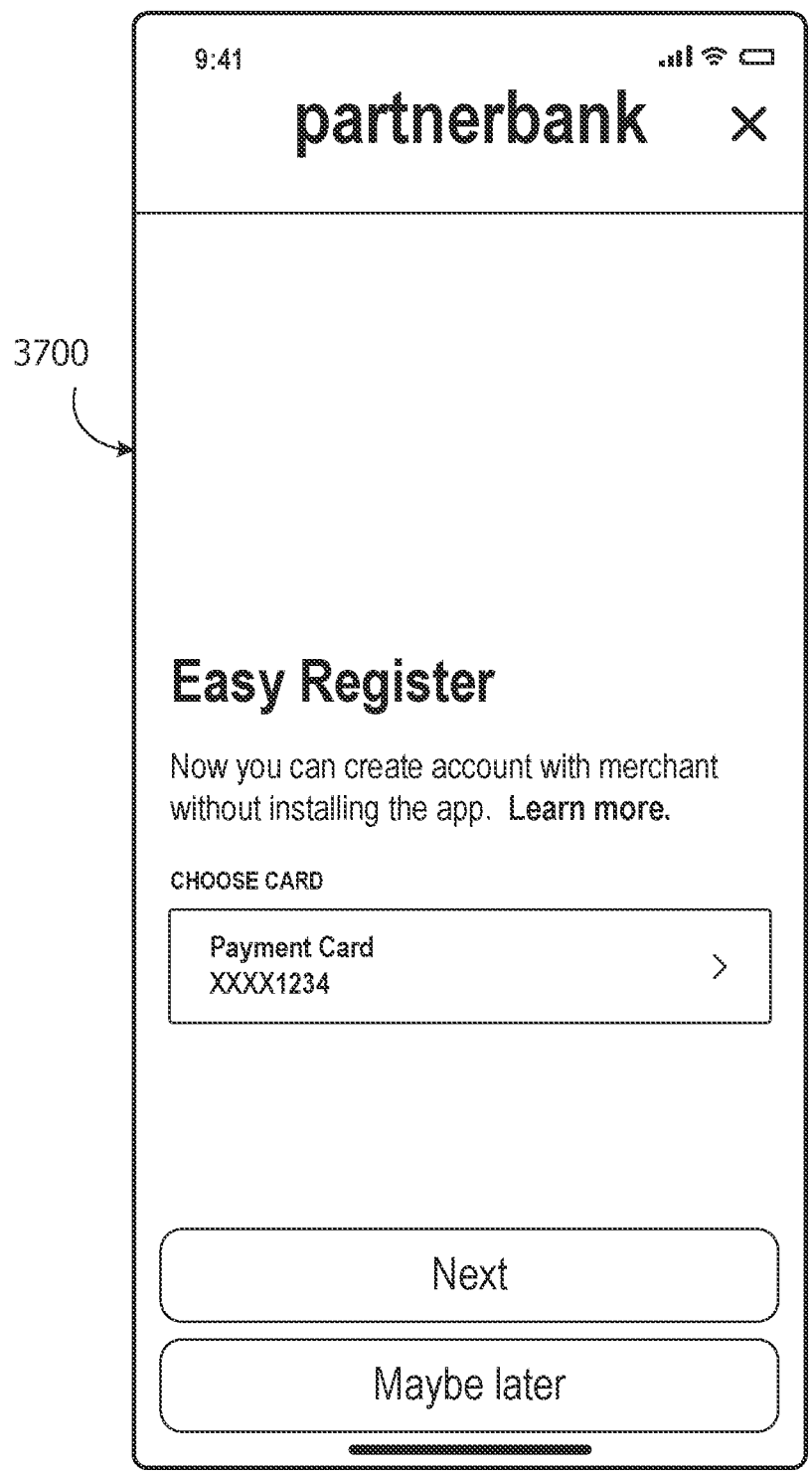
FIG. 37 is an exemplary UI 3600 associated with a mobile user device showing registration page.

FIG. 37 is an exemplary UI 3600 associated with a mobile user device showing registration page. The user can create an account with a merchant server without installing the merchant vending application on the mobile user device. Card selection is optionally pre-filled with the payment card that the user used on the last transaction with the merchant.

Figure 38:
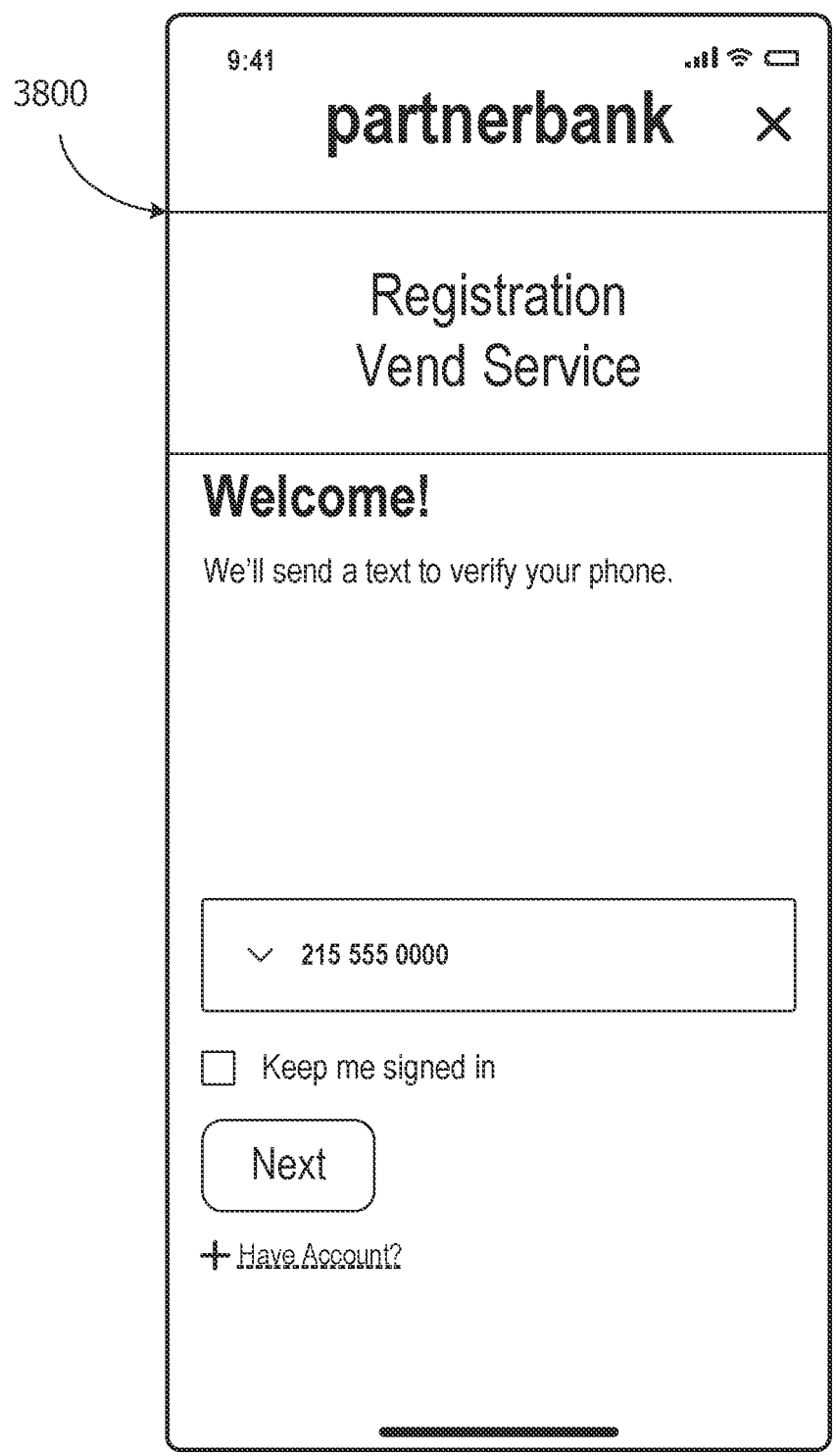
FIG. 38 is an exemplary UI 3800 associated with a mobile user device depicting a merchant webpage within a lightbox format.

FIG. 38 is an exemplary UI 3800 associated with a mobile user device depicting a merchant webpage within a lightbox format. The user can access the merchant webpage while still inside the wallet application. The merchant page is opened as a pop-up. The phone number, email address, and other information is optionally pre-filled. The merchant defines the onboarding process. During onboarding, the payment credentials for the user are transferred to the unlock service. The merchant's terms and conditions of service are presented to the user for review and acceptance within the lightbox.

Figure 39:
FIG. 39 is an exemplary UI 3900 associated with a mobile user device depicting a wallet application having a connected merchant account.

Referring not to FIG. 39, an exemplary UI 3900 associated with a mobile user device depicting a wallet application having a connected merchant account. Once the merchant account is created and a payment card is successfully connected, a link to the merchant webpage is visible inside the wallet application.

In some examples, the IoT device functions as a contactless EMV terminal, utilizing SDKs provided for the contactless EMV protocol. There is at least one shortwave communication channel available for communication by the IoT device terminal to a nearby mobile user device.

A payment token is provided to the terminal from the mobile user device for the contactless EMV transactions using single original equipment manufacturer (OEM) mobile merchant vending application integrated with cloud-based payments for obtaining payment tokens. This application also handles the exchange of EMV APDUs with the OEM terminal. In other examples, the OEM mobile application and wallet application (e.g., XPay) takes care of (e.g., last mile) EMV APDU data exchange with OEM terminal and hands off the data to the wallet application on the same mobile user device to obtain a payment token. The wallet application in other examples maintains payment token data and provides app-to-app integration points for requesting payment tokens.

The cloud POS in other examples delivers payment solutions to vending machines that have no Internet connectivity, which does not need a coin and/or notes acceptance slot. The system integrates with payment wallets having their APIs open to public.

In this manner, the system increases usability of vending machines while delivering consistent experience for users of different devices. The system promotes growth in business, and leverages existing technologies, such as, but not limited to, cloud POS. It is a low-cost system that enables new payment acceptance standard for payment acceptance in an absence of Internet connectivity.

Exemplary Operating Environment

Figure 40:
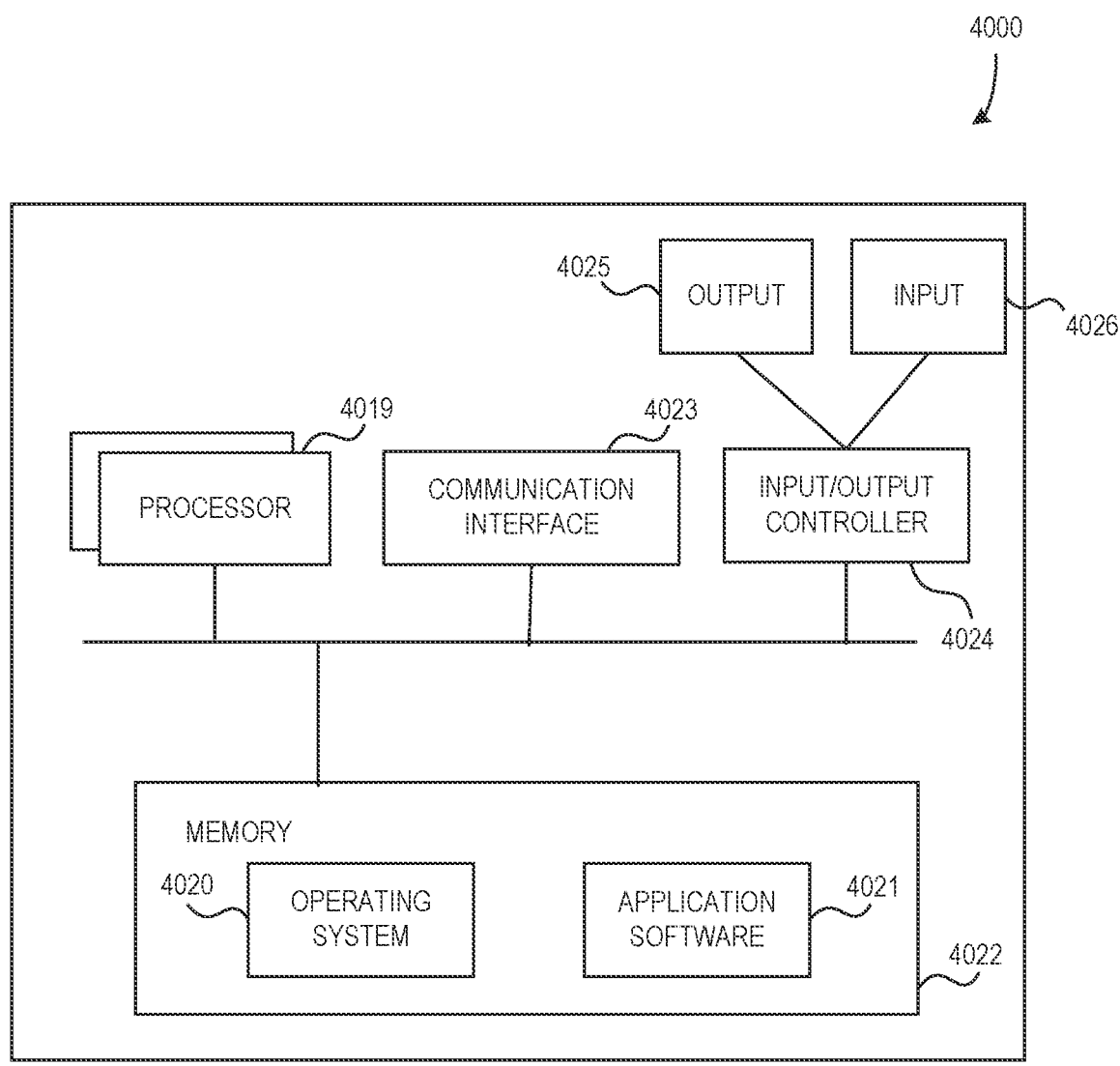
FIG. 40 illustrates a computing apparatus 4000 according to an embodiment as a functional block diagram.

The present disclosure is operable with a computing apparatus according to an embodiment as a functional block diagram of a computing apparatus 4000 in FIG. 40. In an embodiment, components of a computing apparatus 4000 may be implemented as a part of an electronic device according to one or more embodiments described in this specification. The computing apparatus 4000 comprises one or more processors 4019 which may be microprocessors, controllers, or any other suitable type of processors for processing computer executable instructions to control the operation of the electronic device. Alternatively, or in addition, the processor 4019 is any technology capable of executing logic or instructions, such as a hardcoded machine. Platform software comprising an operating system 4020 or any other suitable platform software may be provided on the apparatus 4000 to enable application software 4021 to be executed on the device.

Computer executable instructions may be provided using any computer-readable media that are accessible by the computing apparatus 4000. Computer-readable media may include, for example, computer storage media such as a memory 4022 and communications media. Computer storage media, such as a memory 4022, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus.

In contrast, communication media may embody computer readable instructions, data structures, program modules, or the like in a modulated data signal, such as a carrier wave, or other transport mechanism. As defined herein, computer storage device or computer storage media do not include communication media. Therefore, a computer storage medium should not be interpreted to be a propagating signal per se. Propagated signals per se are not examples of computer storage media. Although the computer storage medium (e.g., the memory 4022) is shown within the computing apparatus 4000, it will be appreciated by a person skilled in the art, that the storage may be distributed or located remotely and accessed via a network or other communication link (e.g., using a communication interface 2223).

The computing apparatus 4000 may comprise an input/output controller 4024 configured to output information to one or more output devices 4025, for example a display or a speaker, which may be separate from or integral to the electronic device. The input/output controller 4024 may also be configured to receive and process an input from one or more input devices 4026, for example, a keyboard, a microphone, or a touchpad. In one embodiment, the output device 4025 may also act as the input device. An example of such a device may be a touch sensitive display. The input/output controller 4024 may also output data to devices other than the output device, e.g., a locally connected printing device.

In some embodiments, a user may provide input to the input device(s) 4026 and/or receive output from the output device(s) 4025.

The functionality described herein can be performed, at least in part, by one or more hardware logic components. According to an embodiment, the computing apparatus 4000 is configured by the program code when executed by the processor 4019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein.

Additional Examples

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: send transaction data from a smart chip on the IoT device to a vending application on a mobile user device acting as a cloud-based POS terminal via a near-field communications device providing a short-range communication channel between a payment acceptance module of an IoT device and the mobile user device in response to a writer mode of the payment acceptance module; decrypt response data received from a smart chip server associated with a cloud POS via the vending application, the response data comprising an outcome of a cloud POS payment transaction; and generate a vend signal to release the at least one item or initiate the at least one automated service in response to the outcome indicating completion of the payment transaction.

One or more exemplary non-transitory computer readable storage media comprise computer-executable instructions for digital payment acceptance using cloud-based POS that, upon execution by a processor, cause the processor to at least: generate, by a smart chip, transaction data associated with a payment transaction for vending of at least one item or at least one automated service from a vend device; send the generated transaction data to a vending application on a mobile user device acting as a cloud-based POS terminal via a near-field communications device providing a short-range communication channel between a payment acceptance module of an IoT device and the mobile user device; receive an encrypted response generated by a smart chip server associated with a cloud POS, the response forwarded to the payment acceptance module by the vending application on the mobile user device; decrypt the response data to determine an outcome of a cloud POS payment transaction; and generate a vend signal to release the at least one item or initiate the at least one automated service in response to the outcome indicating completion of the payment transaction.

In an example scenario, a bike sharing system includes bicycles having bike locks that are not connected to the Internet. The bike locks carry a smart chip inside the bike or bike lock. A user uses their mobile device, such as a smart phone, to scan an NFC code and make a payment with a wallet application. After payment is complete, the smart chip payment acceptance module transmits an unlock (e.g., vend) signal to the bike lock. The mobile user device UI displays a payment complete (e.g., congratulations) message indicating the payment is processed and/or accepted and the bicycle lock is released (e.g., unlocked). When the user returns the bicycle, the user taps a merchant vending application to re-lock the bike lock and obtain final settlement. In this manner, the mobile user device enables an offline automatic vend device to connect to a cloud-based payment network using the mobile user device merchant vending application and digital wallet application.

In this bike sharing example, the bike lock can work online or offline. The payment acceptance module enables the user to use any digital wallet for transactions. A merchant-specific application is not required. The digital payments are secure, EMV-like transactions. The smart chip enables the mobile user device to mimic an NFC terminal to trigger the digital payment processing via the cloud POS without a network connection on the bike lock.

A rental bike with smart chip capability allows consumers with an issuer wallet application installed on a mobile user device to utilize the service without going through the onboarding process on the merchant vending application. This provides new customers a frictionless experience. It also expands the reach of the service to non-returning consumers that have an issuer wallet application installed on their mobile user device. The risk profile of the transaction is reduced using DSRP and biometric CDCVM on consumer's user device.

Many users today prefer contactless payment methods. However, EMV terminals for contactless payment can incur a lot of overhead. It is frequently impractical to install such devices on a vending machine or bicycle rental device, as the terminal and services associated with it would sometimes cost more than the bicycle itself. The non-EMV smart chip payment acceptance system provides the security features for EMV terminal without the overhead, for improved flexibility and decreased costs.

In some examples, during onboarding, the merchant enrolls the smart chip acceptance device. The unlock service assigns a smart chip terminal identifier (ID) and generates a key pair for the device and returns the public key to the device. The public key is stored securely (in secure enclave/hardware key store) within the payment acceptance module.

In other examples, the consumer can open their issuer wallet application and tap the payment acceptance module using the wallet application via NFC/connect using UWB on the smart chip terminal. The unlock service uses the terminal ID to create a payment session for this transaction. The unlock service returns the session ID as well as the merchant website URI, shown in light box within the issuer/wallet application. The URI contains the session ID as reference to the payment session, which is validated by the merchant. Once the consumer has selected from the list of goods/services available from the merchant to the consumer, the merchant can show a payment summary on the mobile user device via the wallet application or a downloaded merchant vending application on the device. On clicking checkout, the merchant calls the unlock service to initiate a DSRP credential request the wallet application. The wallet application performs credential verification via biometrics, PIN, or other credential verification method. The wallet application returns credentials to merchant/merchant's payment processor (non-PCI compliant merchant), which can be used to perform an authorization transaction in the payment network. If successful, the merchant can unlock their service to make the service available to the consumer. Once the services are consumed, that is, the consumer finished their ride, then the merchant notifies the unlock service, which in turn, notifies the consumer via the wallet in-app notification.

In the offline scenario, during onboarding, the merchant generates a key pair for each device and enrolls the smart chip acceptance device with the public key. The unlock service assigns a smart chip terminal ID to the smart chip payment acceptance module on the IoT device. The IoT device stores the public key for the device and returns the current public key to be stored securely (in secure enclave/hardware key store) within the device.

The transaction flow for the virtual EMV terminal enabled via the wallet application, payment acceptance module and unlock service is similar to EMV contactless, where the terminal provides parameters from the acquiring terminal or DSRP. On successful transaction, the unlock service updates the transaction counter on the device, encrypts it with the device's public key and signs it with the private key. On reception of the unlock payload, the payment acceptance module on the IoT device verifies the signature, decrypts the package, updates the transaction counter, and optionally updates the public key. The merchant server unlocks the service for customer.

Alternatively, or in addition to the other examples described herein, examples include any combination of the following:
- a proof-of-payment (POP) message including a signed receipt generated by the smart chip server, wherein the signed receipt indicates successful completion of the payment transaction between an issuer and an acquirer, wherein the POP message is included within the response data;
- a public encryption key associated with the smart chip server, wherein the smart chip server encrypts a proof-of-payment (POP) message using the public encryption key;
- a private encryption key associated with the payment acceptance module, wherein the payment acceptance module de-crypts a POP message using the private encryption key;
- a set of cryptographic keys provisioned to the IoT device by the smart chip server;
- the short-range communication channel comprises at least one of a NFC, BLE, True Sound, and UWB;
- a cryptographic key storage, wherein private keys, and public keys for a plurality of devices are stored on the smart chip server;
- calculating a total transaction amount for a given transaction;
- dividing the total transaction amount into two or more partial payments;
- performing two or more separate digital payment transactions associated with two or more mobile user devices to obtain the total transaction amount from two or more different users;
- reading, by the payment acceptance module, payment data from a digital wallet application associated with a mobile user device communicatively coupled to the payment acceptance module in response to the payment acceptance module in the reader mode;
- create a payment transaction based on transaction data obtained from an integrated merchant vending application associated with the digital wallet application on the mobile user device;
- wherein the payment transaction is a transaction to unlock an item or service associated with the vend device, and wherein the user creates the payment transaction via a portion of the integrated merchant vending application accessible within the digital wallet application in an absence of a downloaded version of a merchant vending application;
- transmit an unlock code to the mobile user device or a merchant server upon receiving a signed receipt generated by an unlock service indicating completion of the payment transaction;
- the unlock code triggers the vend device to release the item or unlock the automated service associated with the vend device when provided to the vend device;
- wherein the vend device is a micro-mobility rental device including the payment acceptance module;
- create a payment session for the payment transaction associated with the vend device in the online mode, the payment session comprising a session identifier (ID);
- redirect a user to a merchant webpage within the digital wallet application enabling the user to select service options associated with the payment transaction available from the merchant;
- trigger a digital secure remote payment (DSRP) request to an issuer application;
- perform customer device cardholder verification method (CDCVM) biometric authentication of user to authorize payment via the digital wallet application; and
- present a portion of a merchant webpage within a lightbox inside the digital wallet application on the mobile user device, wherein a user selects transaction parameters using functionality provided by the portion of the merchant webpage in an absence of a merchant vending application on the mobile user device.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for reading payment data from a digital wallet application associated with a mobile user device communicatively coupled to the payment acceptance module in response to the payment acceptance module in the reader mode; generating transaction data associated with a payment transaction for vending of at least one item or at least one automated service from a vend device, the payment acceptance module in the writer mode sends the generated transaction data to a vending application on a mobile user device acting as a cloud-based POS terminal; transmitting the transaction data from the payment acceptance module to the mobile user device and receives an encrypted response data generated by a smart chip server associated with a cloud POS, the response data forwarded to the payment acceptance module by the vending application on the mobile user device, the response data comprising an outcome of a cloud POS payment transaction; and decrypting the response data to determine the outcome and send a vend signal to release the at least one item or initiate the at least one automated service in response to the outcome indicating completion of the payment transaction.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for digital payment acceptance, the system comprising:
    a smart chip powered payment acceptance module, associated with a vend device, communicatively coupled to a mobile user device of a user via a near-field communications device providing a short-range communications channel, the mobile user device hosting a digital wallet application, the short-range communication channel providing communications between the mobile user device and the payment acceptance module in an online mode or an offline mode, wherein the digital wallet application is an application associated with a digital wallet linked to a user payment account provided by an issuer;
    at least one processor; and
    at least one computer readable medium storing computer-executable instructions, which, when executed by the at least one processor, cause the at least one processor to:
        receive, from the digital wallet application, via the short-range communication channel, payment data for vending of at least one item or initiating at least one automated service associated with the vend device;
        using the payment data, generate payment transaction data and send the generated payment transaction data to a merchant vending application accessible by integrated with the digital wallet application without being downloaded as a separate application and operating as a cloud-based point-of-sale (POS) terminal that provides a secure virtual Europay, Mastercard, Visa (EMV) terminal, wherein the secure virtual EMV terminal forwards the payment transaction data to an unlock service running on a cloud server, the unlock service obtaining digital secure remote payment (DSRP) credentials from an acquirer payment service provider, wherein the payment transaction data is data of a transaction to unlock the item or the automated service associated with the vend device, and
        provide an unlock code to the vend device upon receiving a signed receipt generated by the unlock service based on obtaining the DSRP credentials, the unlock code indicating a completion of the payment transaction, wherein the unlock code triggers the vend device to release the item or unlock the automated service associated with the vend device.

2. The system of claim 1, wherein:
    the payment acceptance module in the offline mode having a reader mode and a writer mode, in the reader mode, the payment acceptance module reads payment data from the digital wallet application, and
    in the writer mode, the payment acceptance module sends the generated payment transaction data to the merchant vending application.

3. The system of claim 1, further comprising:
    a public encryption key associated with a smart chip server, wherein:
        the smart chip server encrypts a proof-of-payment (POP) message using the public encryption key, the POP message indicates successful completion of the payment transaction between an issuer and an acquirer, and
        the POP message is included within response data received at the mobile user device from an issuer.

4. The system of claim 1, further comprising a private encryption key stored on the payment acceptance module in the offline mode, wherein the payment acceptance module decrypts a POP message using the private encryption key.

5. The system of claim 1, wherein the vend device is a micro-mobility rental device including the payment acceptance module.

6. The system of claim 1, wherein the at least one processor is further caused to:
    create a payment session for the payment transaction associated with the vend device in the online mode, the payment session comprising a session identifier (ID);
    redirect the user to a merchant webpage viewable from within the digital wallet application, thereby enabling the user to select service options associated with the payment transaction available from a merchant;
    trigger a digital secure remote payment (DSRP) request to an issuer application; and
    perform customer device cardholder verification method (CDCVM) biometric authentication of the user to authorize payment via the digital wallet application.

7. The system of claim 1, wherein the at least one processor is further caused to present a portion of a merchant webpage within a lightbox displayed in a window by the digital wallet application on the mobile user device, wherein a user selects transaction parameters using functionality provided by the portion of the merchant webpage.

8. A computerized method for digital payment acceptance comprising:
    receiving from a digital wallet application, by a smart chip powered payment acceptance module associated with a vend device, via a short-range communication channel, payment data for vending of at least one item or initiating at least one service associated with the vend device, the digital wallet application being an application associated with a digital wallet linked to a user payment account provided by an issuer and being hosted by a mobile user device, the short-range communication channel providing communications between the mobile user device and the payment acceptance module, in an online mode or an offline mode;

using the payment data, generating, by the payment acceptance module, payment transaction data;

sending, via a short-range communication channel, the generated payment transaction data to a merchant vending application integrated with the digital wallet application without being downloaded as a separate application and operating as a cloud-based point-of-sale (POS) terminal that provides a secure virtual Europay, Mastercard, Visa (EMV) terminal, wherein the secure virtual EMV terminal forwards the payment transaction data to an unlock service running on a cloud server, the unlock service obtaining digital secure remote payment (DSRP) credentials from an acquirer payment service provider, wherein; the payment transaction data is data of a transaction to unlock the item or the service associated with the vend device and, providing an unlock code to the vend device upon receiving a signed receipt generated by the unlock service based on obtaining the DSRP credentials, the unlock code indicating a completion of the payment transaction, wherein the unlock code triggers the vend device to release the item or unlock the service associated with the vend device.

9. The method of claim 8 wherein the payment transaction is a transaction to unlock the item or service associated with the vend device; and the method further comprises transmitting an unlock code to the mobile user device or a merchant server upon receiving a signed receipt generated by an unlock service indicating completion of the payment transaction, the unlock code causing the vend device to release the at least one item or unlock the at least one service associated with the vend device when the unlock code is provided to the vend device.

10. The method of claim 8, further comprising reading, by the payment acceptance module, payment data from a digital wallet application associated with a mobile user device communicatively coupled to the payment acceptance module in response to the payment acceptance module being in a reader mode.

11. The method of claim 8, further comprising displaying a portion of a merchant webpage within a lightbox displayed in a window by the digital wallet application on the mobile user device, wherein a user selects transaction parameters using functionality provided by the portion of the merchant webpage.

12. The method of claim 8, further comprising:
creating a payment session for the payment transaction associated with the vend device in an online mode, the payment session comprising a session identifier (ID);
redirecting a user to a merchant webpage viewable from within a digital wallet application, thereby enabling the user to select service options associated with the payment transaction available from a merchant;
triggering a digital secure remote payment (DSRP) request to an issuer application; and
performing customer device cardholder verification method (CDCVM) biometric authentication of the user to authorize payment via the digital wallet application.

13. The method of claim 8, further comprising:
calculating a total transaction amount for a given transaction;
dividing the total transaction amount into two or more partial payments; and
performing two or more separate digital payment transactions associated with two or more mobile user devices to obtain the total transaction amount from two or more different users.

14. One or more non-transitory computer storage devices having computer-executable instructions for digital payment acceptance that, upon execution by a processor, cause the processor to at least:
receive from a digital wallet application, by a smart chip powered payment acceptance module associated with a vend device, via a short-range communication channel, payment data for vending of at least one item or initiating at least one service from the vend device, the digital wallet application being an application associated with a digital wallet linked to a user payment account provided by an issuer and being hosted by a mobile user device, the short-range communication channel providing a short-range communication between a payment acceptance module of the vend device and the mobile user device;
using the payment data, generate payment transaction data and send the generated payment transaction data to a merchant vending application integrated with the digital wallet application without being downloaded as a separate application and operating as a cloud-based point-of-sale (POS) terminal that provides a secure virtual Europay, Mastercard, Visa (EMV) terminal, wherein the secure virtual EMV terminal forwards the payment transaction data to an unlock service running on a cloud server, the unlock service obtaining digital secure remote payment (DSRP) credentials from an acquirer payment service provider, wherein
the payment transaction data is data of a transaction to unlock the item or the service associated with the vend device, and
provide an unlock code to the vend device upon receiving a signed receipt generated by the unlock service based on obtaining the DSRP credentials, the unlock code indicating a completion of the payment transaction, wherein the unlock code triggers the vend device to release the item or unlock an automated service associated with the vend device.

15. The one or more computer storage devices of claim 14, wherein the DSRP credentials indicate completion of the payment transaction, including a signed receipt generated by the the unlock service indicating successful completion of the payment transaction between an issuer and an acquirer.

16. The one or more computer storage devices of claim 14, wherein the computer-executable instructions, upon execution by a processor, further cause the processor to at least read payment data from a digital wallet application associated with a mobile user device communicatively coupled to the payment acceptance module in response to the payment acceptance module being in reader mode.

17. The one or more computer storage devices of claim 15, wherein the payment acceptance module having a reader mode and a writer mode,
in the reader mode, the payment acceptance module reads payment data from the digital wallet application, and
in the writer mode, the payment acceptance module sends the generated payment transaction data to the merchant vending application.

18. The one or more computer storage devices of claim 17, wherein the vend device is a micro-mobility rental device including the payment acceptance module.

19. The one or more computer storage devices of claim 14 further comprising a private encryption key stored on the payment acceptance module in an offline mode, wherein the payment acceptance module decrypts a POP message using the private encryption key.

20. The one or more computer storage devices of claim 14, wherein the processor is further caused to present a portion of a merchant webpage within a lightbox displayed in a window by the digital wallet application on the mobile user device, wherein a user selects transaction parameters using functionality provided by the portion of the merchant webpage.

* * * * *